United States Patent
Zhang et al.

(10) Patent No.: US 11,810,321 B2
(45) Date of Patent: *Nov. 7, 2023

(54) METHODS AND SYSTEMS FOR MULTIPLAYER TAGGING USING ARTIFICIAL INTELLIGENCE

(71) Applicant: NEX Team Inc., San Jose, CA (US)

(72) Inventors: Qi Zhang, Tseung Kwan O (HK); Ian Smith, Mountain View, CA (US); Long Mak, Shatin (HK); Keng Fai Lee, Cupertino, CA (US); Wing Hung Chan, Kowloon (HK)

(73) Assignee: NEX Team Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,757

(22) Filed: Oct. 7, 2021

(65) Prior Publication Data
US 2022/0027632 A1    Jan. 27, 2022

Related U.S. Application Data

(63) Continuation of application No. 17/008,923, filed on Sep. 1, 2020, now Pat. No. 11,157,742.
(Continued)

(51) Int. Cl.
*G06T 7/73* (2017.01)
*G06T 7/11* (2017.01)
(Continued)

(52) U.S. Cl.
CPC .......... *G06T 7/73* (2017.01); *G06F 18/23213* (2023.01); *G06F 18/24147* (2023.01);
(Continued)

(58) Field of Classification Search
CPC ............ G06K 9/00724; G06K 9/6223; G06K 9/6276; G06T 7/11; G06T 7/73;
(Continued)

(56) References Cited

U.S. PATENT DOCUMENTS

| 7,094,164 B2 | 8/2006 | Marty et al. |
| 9,254,432 B2 | 2/2016 | Ianni et al. |

(Continued)

OTHER PUBLICATIONS

Lu et al: "Learning to track and identify players from broadcast sports videos", IEEE, 2013 (Year: 2013).*
(Continued)

*Primary Examiner* — Ruiping Li
(74) *Attorney, Agent, or Firm* — American Patent Agency PC; Daniar Hussain; Stephen M. Hou

(57) ABSTRACT

Methods and systems for image clustering are described, and include first receiving a plurality of images from a video of a game. Next, determining a first feature vector of a first player from the plurality of images by inputting the plurality of images to an artificial intelligence (AI)-based process. Next, dividing the plurality of images into a first subset of images and a second subset of images based on the first feature vector. Next, receiving a first identifier tagging the first player in a first image of the first subset. Finally, identifying a second player in a second image in the second subset by propagating the first identifier of the first subset, based on a distance measure associated with the first feature vector from the artificial intelligence (AI)-based process. Running on a mobile computing device, the method allows multiplayer tagging to be easily performed in almost any environment.

20 Claims, 42 Drawing Sheets

Related U.S. Application Data

(60) Provisional application No. 62/895,700, filed on Sep. 4, 2019.

(51) Int. Cl.

| | |
|---|---|
| *G06N 20/00* | (2019.01) |
| *G06T 7/90* | (2017.01) |
| *G06V 20/40* | (2022.01) |
| *G06V 40/20* | (2022.01) |
| *G06F 18/23213* | (2023.01) |
| *G06F 18/2413* | (2023.01) |
| *G06V 10/762* | (2022.01) |
| *G06V 10/764* | (2022.01) |

(52) U.S. Cl.
CPC ............... *G06N 20/00* (2019.01); *G06T 7/11* (2017.01); *G06T 7/90* (2017.01); *G06V 10/763* (2022.01); *G06V 10/764* (2022.01); *G06V 20/42* (2022.01); *G06V 40/23* (2022.01); *G06T 2207/10016* (2013.01); *G06T 2207/20021* (2013.01); *G06T 2207/20081* (2013.01); *G06T 2207/20084* (2013.01); *G06T 2207/30221* (2013.01)

(58) Field of Classification Search
CPC ............. G06T 7/90; G06T 2207/10016; G06T 2207/20021; G06T 2207/20081; G06T 2207/20084; G06T 2207/30221; G06T 7/20; G06N 20/00; G06N 3/0454; G06N 3/08

See application file for complete search history.

(56) References Cited

U.S. PATENT DOCUMENTS

| | | | |
|---|---|---|---|
| 2013/0095961 A1 | 4/2013 | Marty et al. | |
| 2016/0339297 A1 | 11/2016 | Hohteri et al. | |
| 2017/0132470 A1 | 5/2017 | Sasaki et al. | |
| 2018/0189971 A1 | 7/2018 | Hildreth | |
| 2018/0301169 A1* | 10/2018 | Ricciardi | G11B 27/036 |

OTHER PUBLICATIONS

Lu & Tan: "Unsupervised clustering of dominant scenes in sports video", 2003. (Year: 2003).*

Min Xu, et al., "Event Detection in Basketball Video Using Multiple Modalities," ICICS-PCM 2003, Dec. 15-18, 2003, IEEE, Singapore.

Wei-Lwun Lu, et al., "Learning to Track and Identify Players from Broadcast Sports Videos," IEEE Transactions on Pattern Analysis and Machine Intelligence 35 (7), Jul. 2013.

Yun Liu, et al., "A New Method for Shot Identification in Basketball Video," Journal of Software 6 (8), Aug. 2011, DOI 10.4304/jsw.6.8.1468-1475.

Hua-Tsung Chen, et al., "Physics-based ball tracking and 3D trajectory reconstruction with applications to shooting location estimation in basketball video," J. Vis. Commun. Image R., 20 (3): 204-216, 2009, DOI 10.1016/j.jvcir.2008.11.008.

Francesco Cricri, et al., "Salient Event Detection in Basketball Mobile Videos," Proc. IEEE Int'l Symp. Multimedia, 2014, pp. 63-70, DOI 10.1109/ISM.2014.67.

Roland Leser, et al., "Local Positioning Systems in (Game) Sports," Sensors 2011, 11, 9778-9797, DOI 10.3390/s111009778.

Huang-Chia Shih, "A Survey on Content-aware Video Analysis for Sports," IEEE Transactions on Circuits and Systems for Video Technology 99 (9), Jan. 2017.

Vikedo Terhuja, "Automatic Detection of Possessions and Shots from Raw Basketball Videos," Master's Thesis, Presented Dec. 3, 2015, Oregon State University, US.

Standz by Zepp, Last accessed Aug. 13, 2018 Available at http://gadgetsandwearables.com/2017/05/30/zepp-basketball/ and at http://www.zepp.com/en-us/standz/.

Noah Basketball (NOAHLytics/MyNoah V3), Last accessed Aug. 13, 2018 Available at http://www.noahbasketball.com.

Hoop Tracker, Last accessed Aug. 13, 2018, Available at https://www.youtube.com/watch?v=HS9VYIzJsyI.

ShotTracker, Last accessed Aug. 13, 2018, Available at http://www.spongecoach.com/best-basketball-training-app/.

Wilson Smart Basketball, Last accessed Aug. 13, 2018, Available at https://www.theverge.com/2015/9/17/9347039/wilson-x-connected-smart-basketball.

* cited by examiner

700

| ‹ Explore | Profile | Edit |

50 shots #1 ›

Longest FT streak
54 shots #1 ›

Show More

✌ Personal Records

| | Overall | FT | 3PT |
| Best Performance | 94% 116/123 | 94% 116/123 | 84% 21/26 |
| Longest Streak | Overall 54 | FT 54 | 3PT 12 |
| Most Shots Made | Nov 14, 2017 | | 116 |
| Most Shot Attempts | Jan 16, 2018 | | 134 |

≣ Activities

12 Practices
Last session: Jan 16, 2018  ›

| Explore |
|---|

| Leaderboards | Players |
|---|---|

Longest 3PT streak
Longest streak of made threes in a session
1st Place   Isaac White   25

Longest FT streak
Longest streak of made free throws in a session
1st Place   Colin Wan   54

Longest overall streak
Longest streak of made shots made in a session
1st Place   Colin Wan   54

Best 25 3PT shots
Most makes in a 25 shot three point sequence
1st Place   Michael Humphrey   25

Best 25 PT shots
Most makes in a 25 shot free throw sequence

FIG. 9

○ COMPUTED 3D COORDINATES OF BALLS

✕ FITTED FREE-FALL QUADRATIC CURVE

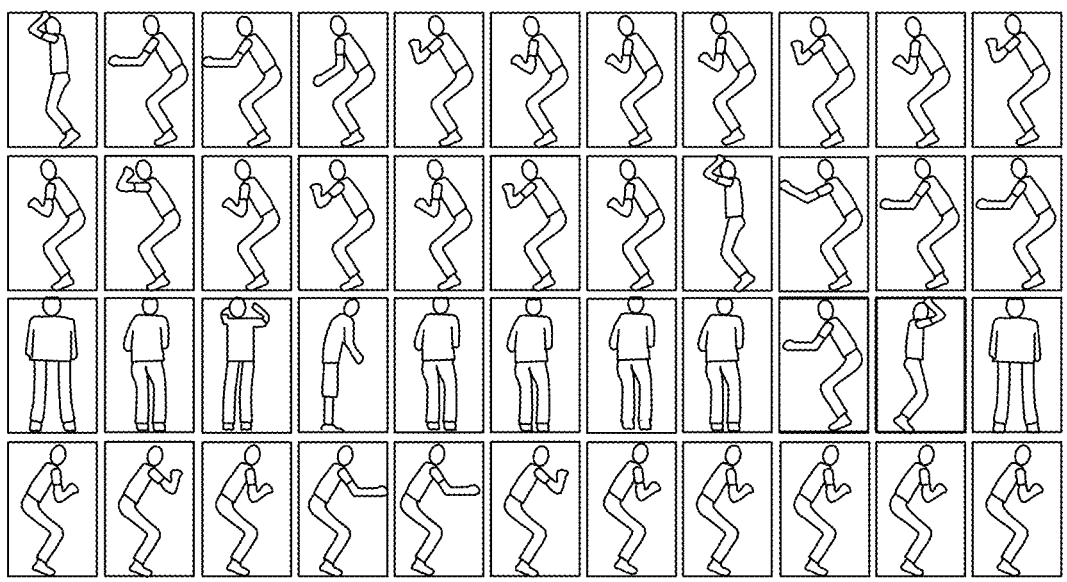
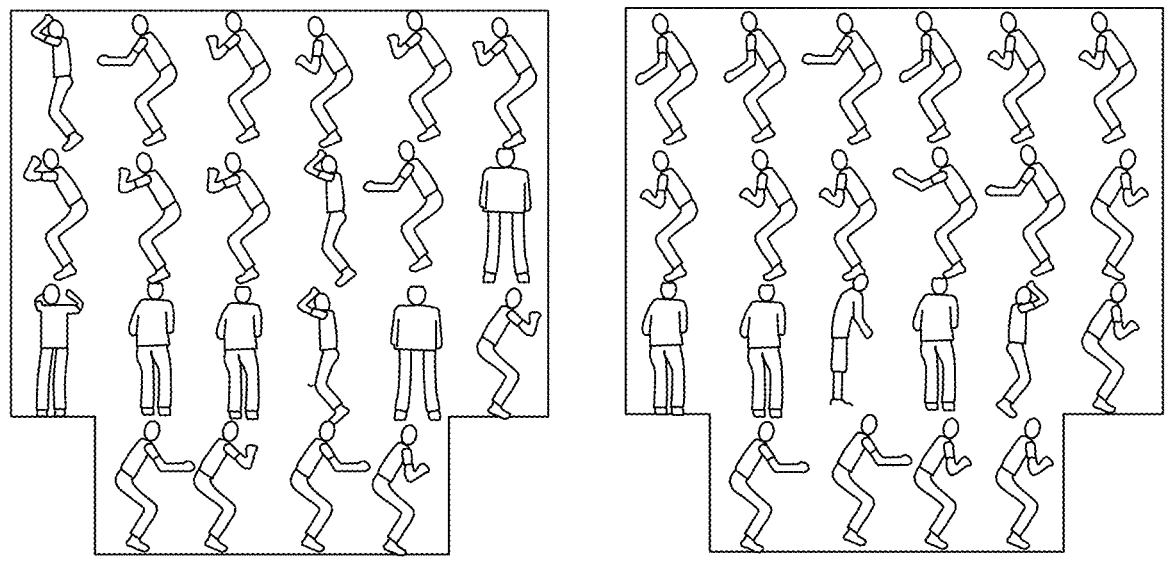
FIG. 22

METHODS AND SYSTEMS FOR MULTIPLAYER TAGGING USING ARTIFICIAL INTELLIGENCE

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is further related to U.S. Ser. No. 16/109,923, filed on 23 Aug. 2018, entitled "Methods and Systems for Ball Game Analytics with a Mobile Device", and is also related to U.S. Ser. No. 16/424,287, filed on 28 May 2019, entitled "Methods and Systems for Generating Sports Analytics with a Mobile Device", the entire disclosures of all of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of mobile device video analytics, and pertain particularly to methods and systems for generating analytics of videos captured with a mobile device having a camera for video capture.

BACKGROUND OF THE INVENTION

The statements in this section may serve as a background to help understand the invention and its application and uses, but may not constitute prior art.

Modern computing technology has brought in a new era of rapid real-time analysis of sports activities. Whether it's a viewer watching a game for leisure, a coach analyzing plays to adapt to the opposing team's strategy, or a general manager compiling data sets across multiple games to optimize player retention strategies, real-time analysis enables thorough quantitative game analysis by granting the viewer instantaneous access to statistical data of every single play. Sport analytics have seen uses in applications such as broadcasting, game strategizing, and team management, yet real-time analytic systems for mass mainstream usage is still complex and expensive. Real-time tracking technology based on image recognition often requires use of multiple high-definition cameras mounted on top of a game area or play field for capturing visual data from multiple camera arrays positioned at multiple perspectives, calibration for different environments, and massive processing power in high-end desktop and/or server-grade hardware to analyze the data from the camera arrays. Accurate tracking of key events and key players throughout the game, such as identifying locations and results of shot attempts, and differentiating among multiple players to recognize the player making the shot attempt, requires vast resources including expensive equipment with complicated setups that prevent mass adaptation of both real-time and off-line sports analytic systems implemented with low-cost, general-purpose hardware having small form factors.

Therefore, in view of the aforementioned difficulties, there is an unsolved need to easily and accurately detect key events in ball game plays including individual practices and team games, to track relevant shot attempts and locations, identify the ball and players, understand their motions, generate play analytics, and provide relevant tracking and analytical results to viewers in an efficient manner. In addition, it would be an advancement in the state of the art of ball shot and game play analysis to render real-time game plays with high visual fidelity, and to automatically understand different ball courts and perform self-calibration with minimal user input, while maintaining minimal delay and data transfer overheads, such that the entire system can be implemented on a single mobile computing device, such as a smartphone or a tablet.

It is against this background that various embodiments of the present invention were developed.

BRIEF SUMMARY OF THE INVENTION

Methods and systems are provided for mobile device-based real-time detection, analysis and recording of multi-player tagging for analytics generation.

In some embodiments, a method for image clustering is described. The method can include receiving a plurality of images from a video of a game; determining a first feature vector of a first player from the plurality of images by inputting the plurality of images to an artificial intelligence (AI)-based process; dividing the plurality of images into a first subset of images and a second subset of images based on the first feature vector; receiving a first identifier tagging the first player in a first image of the first subset; and identifying a second player in a second image in the second subset by propagating the first identifier of the first subset, based on a distance measure associated with the first feature vector from the artificial intelligence (AI)-based process.

In another embodiment, the determination of the feature vector further includes performing pose estimation on the plurality of images in order to determine one or more colors associated with pixels of the first player in the plurality of images. In one embodiment, the AI-based process comprises a person re-identification technique. In another embodiment, t e AI-based process is selected from the group consisting of a deep neural network, a Siamese/triplet-loss neural network, and a direct low-level image feature extraction technique. In one embodiment, the AI-based process is further based on a location information associated with the first player or the second player obtained by at least one of a pose-estimation technique, an image-segmentation technique, and an object-detection technique. In another embodiment, the first identifier tagging the first player in the first image is determined based on a clustering process, the clustering process including at least one of a k-means, an affinity propagation, and a density-based spatial clustering of applications with noise (DBSCAN). In one embodiment, the tagging the first player in the first image can include receiving a user input selecting the first player via a user interface (UI). In another embodiment, the propagating the identifier of the first subset can include propagating the identifier of the first subset using a clustering process. In one embodiment, the dividing the plurality of images into the first subset of images and the second subset of images includes determining the first subset of images based on a second feature vector determined from a second plurality of images selected from the first plurality of images.

In some embodiments, a non-transitory computer-readable medium storing computer-executable instructions is described, which, when executed by a processor, cause the processor to perform operations for image clustering. The operations can include operations to receive a plurality of images from a video of a game; determine a first feature vector of a first player from the plurality of images by inputting the plurality of images to an artificial intelligence (AI)-based process; divide the plurality of images into a first subset of images and a second subset of images based on the first feature vector; receive a first identifier tagging the first player in a first image of the first subset; and identify a second player in a second image in the second subset by propagating the first identifier of the first subset, based on a distance measure associated with the first feature vector from the artificial intelligence (AI)-based process.

In various embodiments, a device for image clustering is described. The device can include at least one memory device that stores computer-executable instructions and at least one processor configured to access the at least one memory device. The at least one processor is configured to execute the computer-executable instructions to receive a plurality of images from a video of a game; determine a first feature vector of a first player from the plurality of images by inputting the plurality of images to an artificial intelligence (AI)-based process; divide the plurality of images into a first subset of images and a second subset of images based on the first feature vector; receive a first identifier tagging the first player in a first image of the first subset; and identify a second player in a second image in the second subset by propagating the first identifier of the first subset, based on a distance measure associated with the first feature vector from the artificial intelligence (AI)-based process.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 7 is a screen capture of a detailed chart showing personal records by the player in FIG. 6, according to one embodiment of the present invention;

FIG. 9 is a screen capture of a leaderboard showing best performances among multiple players, according to one embodiment of the present invention;

FIG. 22 is a diagram showing exemplary player clusters for player identification, according to some embodiments of the present invention;

DETAILED DESCRIPTION OF THE INVENTION

Figure 1:
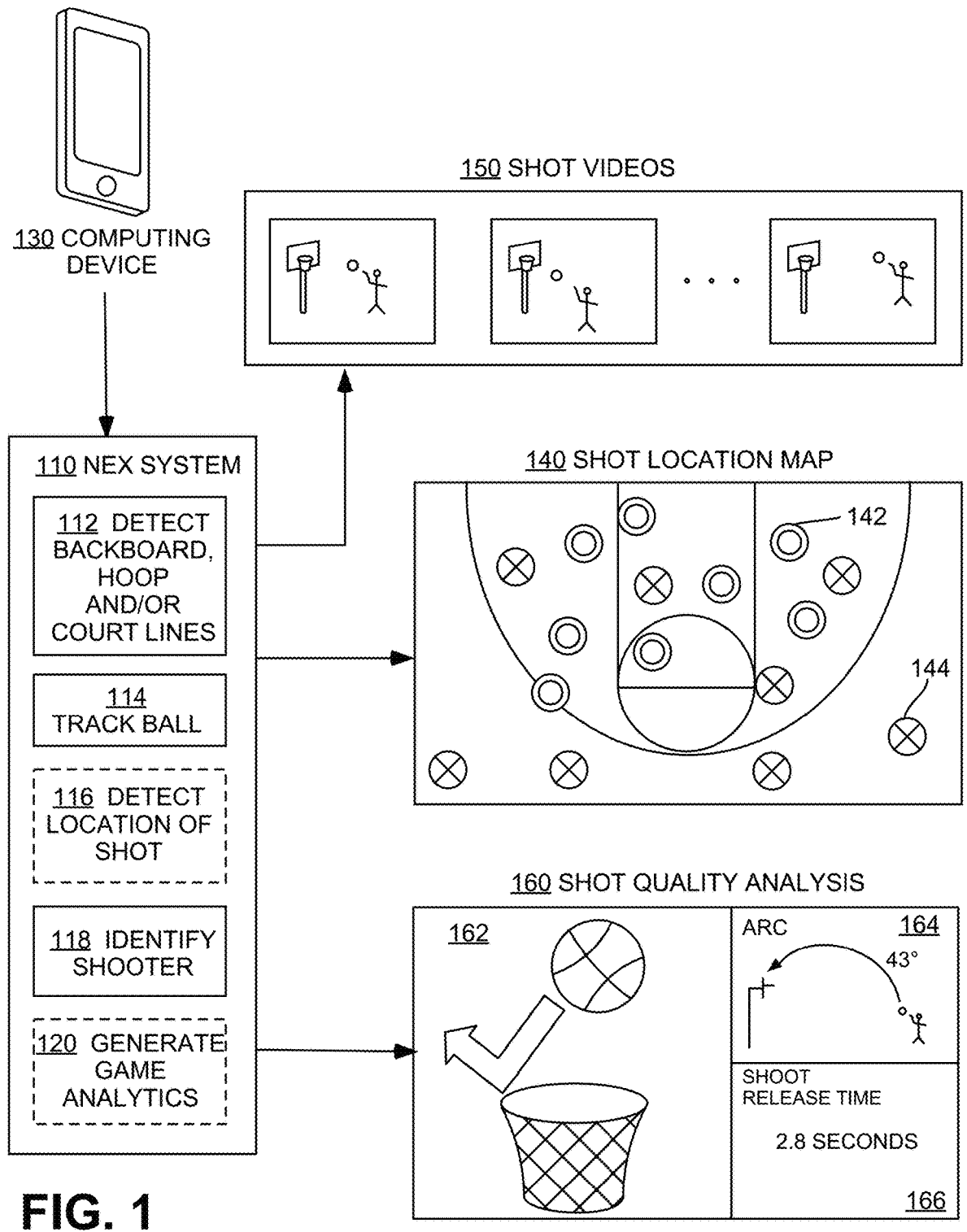
FIG. 1 is an architectural overview of a mobile device-based system used to generate game recordings and game analytics, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features.

Accordingly, this description of the invention is set forth without any loss of generality to, and without imposing limitations upon the invention.

Broadly, embodiments of the present invention relate to real-time analysis of sports games, and pertain particularly to methods and systems for ball game analysis using personal computing devices, such as smartphones and tablets. It would be understood by persons of ordinary skill in the art that the terms "game" and "game play" in this disclosure refer to not only competitive activities involving opposing teams, but also individual and group practice or drilling activities. In other words, embodiments of the present invention may be used for capturing and analyzing shot attempts and other aspects of ball sport activities, as long as there is at least one player present on the play field being recorded. In addition, it would be clear to one of ordinary skill in the art that embodiments of the present invention may also be applied to soccer, baseball, football, hockey, and many other types of ball sports, where a "goal" refers to an area, basket, or other structure towards or into which players attempt to throw or drive a ball, puck, or a similar object to score points.

More specifically, some embodiments of the present invention relate to image clustering which includes determining a plurality of images from a video of a game, the video captured by a camera on a mobile device, wherein at least one image of the plurality of images is segmented from a video frame of the video; determining a feature vector of a player from the at least one image; dividing the images into a first subset and a second subset based on the feature vector; tagging a first player in a first image of the first subset with an identifier, where the identifier differentiates the images in the first subset to a plurality of players; and identifying a second player in a second image in the second subset by propagating the identifier of the first subset, based on a distance measure associated with the feature vector. Their operations can be performed, at least in part, by a computing device, such as smartphone, a laptop, a tablet, and/or the like. Each step of the game analysis processes as disclosed herein may be performed in real-time or in an off-line fashion, automatically, or upon user request. In some embodiments, one or more of the steps are optional.

Unlike conventional computer vision-based real-time sports analysis systems that may require several high-resolution cameras mounted on top of or sidelines of a ball field and the use of high-end desktop or server hardware, embodiments of the present invention allow users to perform real-time analysis of ball sport games with a single mobile device such as a smartphone, a tablet, a laptop, or smart glasses. In various embodiments, computer vision techniques such as image registration, motion detection, background subtraction, object tracking, 3D reconstruction techniques, cluster analysis techniques, camera calibration techniques such as camera pose estimation and sensor fusion, and modern machine learning techniques such as convolutional neural network (CNN), are selectively combined to perform high accuracy analysis in real-time on a mobile device. The limited computational resources in a mobile device may present some challenges. For instance, some examples can include the fact that a smartphone's limited CPU processing power can be heat-sensitive. CPU clock rate can be reduced by the operating system (OS) whenever the phone heats up. Also, when a system consumes too much memory, it can get terminated by the operating system (OS). The amount of battery use that the analytics system consumes can be a factor to minimize, otherwise the limited battery on a smartphone may not last a predetermined threshold duration (e.g., the duration of a whole game).

The mobility of and flexibility in mounting a mobile device enables capturing a shot from any angle. Embodiments of the present invention can be used in different ball courts or fields, indoor or outdoor setting, under varying lighting conditions. Embodiments of the present invention may also be able to understand any typical ball court with minimal or no user input, support flexible placement of the mobile device, and be resilient to vibration or accidental movements.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

Outline of Figures

Before presenting addition disclosure, a brief summary of the figures is provided for clarity and readability. In particular, FIG. 1 is an architectural overview of a mobile device-based system used to generate game recordings and game analytics. FIGS. 2-9 show representative screen capture diagrams of an application that records video of a game including both unsuccessful and successful shot attempts, and displays game analytics results of game performance and statistics associated with both players and teams of the game.

Figure 14A:
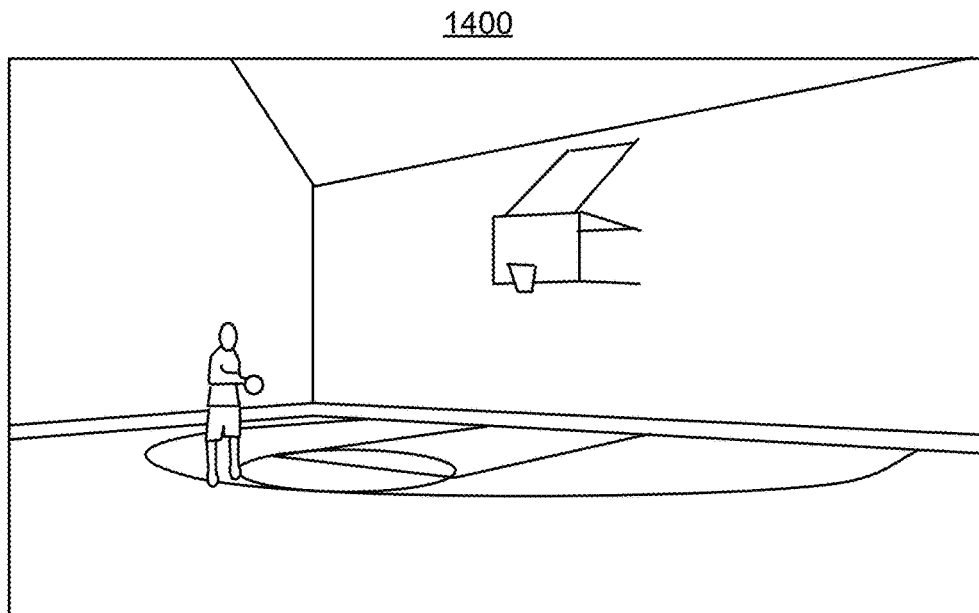
FIG. 14A is an illustrative camera frame for region of interest (ROI) identification, according to some embodiments of the present invention.
Figure 14B:
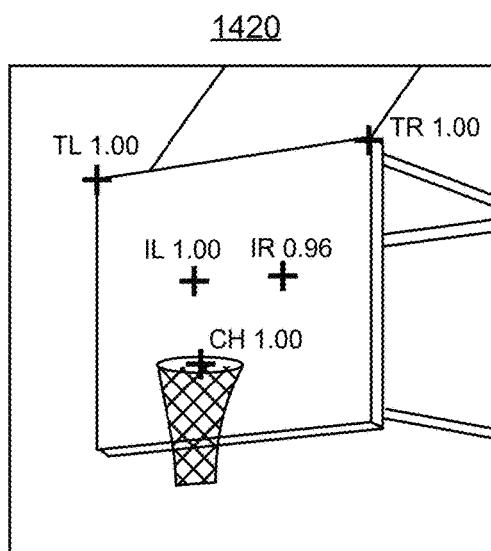
FIG. 14B is an illustrative backboard ROI with detected backboard key points, according to some embodiments of the present invention.
Figure 14C:
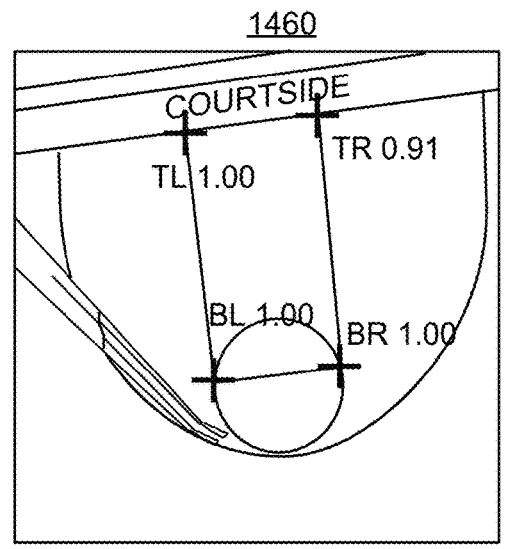
FIG. 14C is an illustrative rectified court with detected court key points, according to some embodiments of the present invention.
Figure 15:
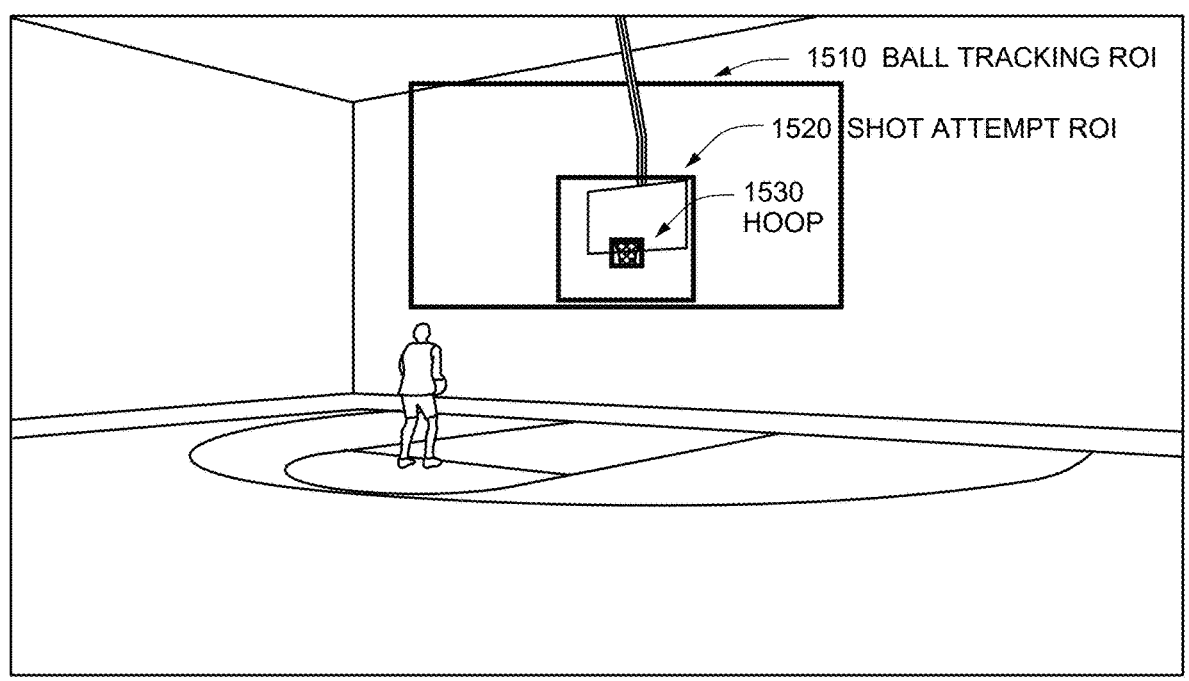
FIG. 15 is an illustrative screen capture showing several identified ROIs, according to some embodiments of the present invention.

FIGS. 10-13 variously show flow diagrams of processes for shot attempt detection and analysis, shot quality analysis, and game area detection. FIG. 14 shows various diagrams associated with the identification and analysis of regions of interest (ROIs) associated with a game area, while FIG. 15 shows an application screen illustrating example identified ROIs.

Figure 16:
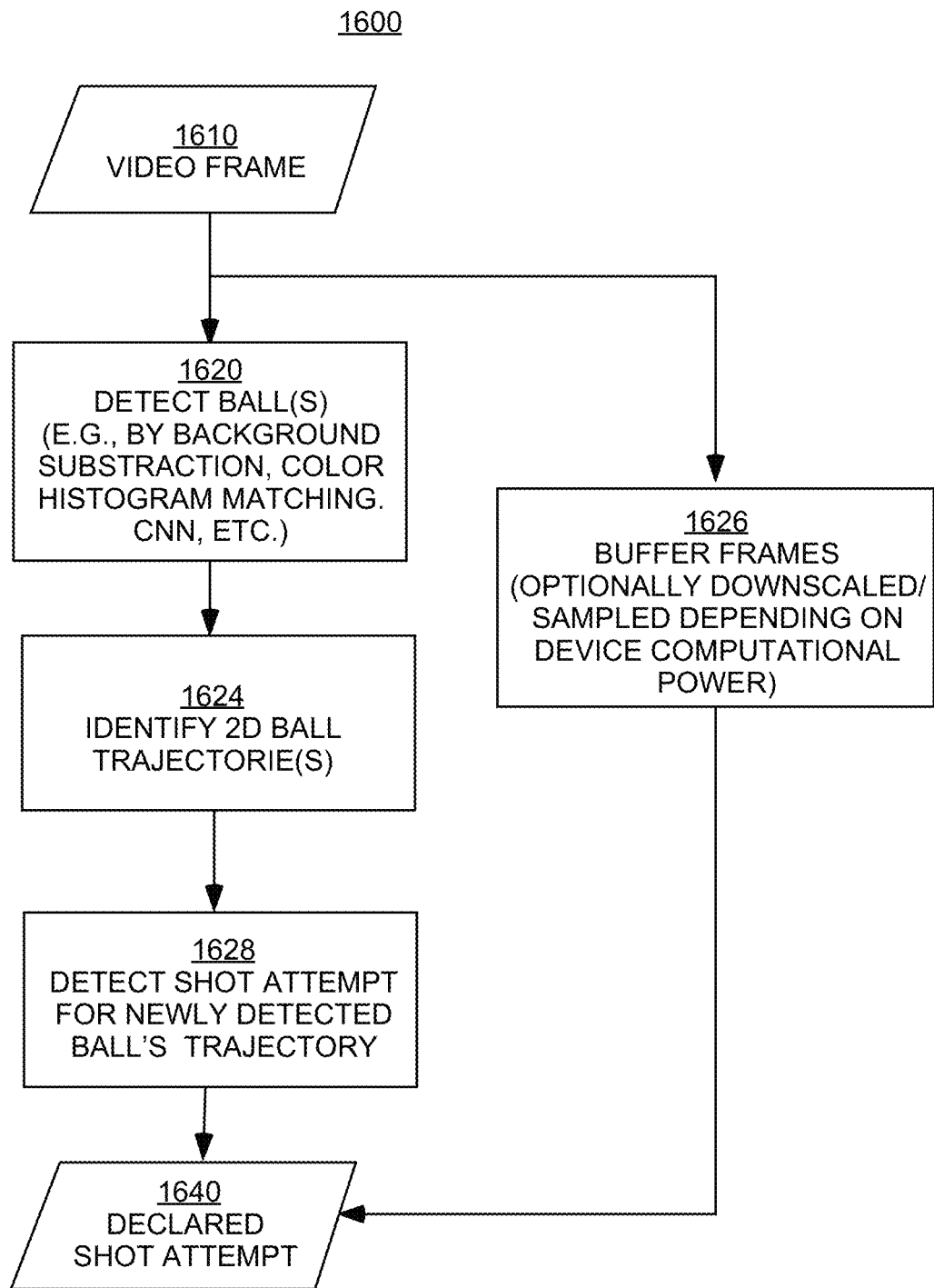
FIG. 16 is a flow diagram of a process for ball tracking, frame buffering, and initial shot attempt detection, according to some embodiments of the present invention.
Figure 17:
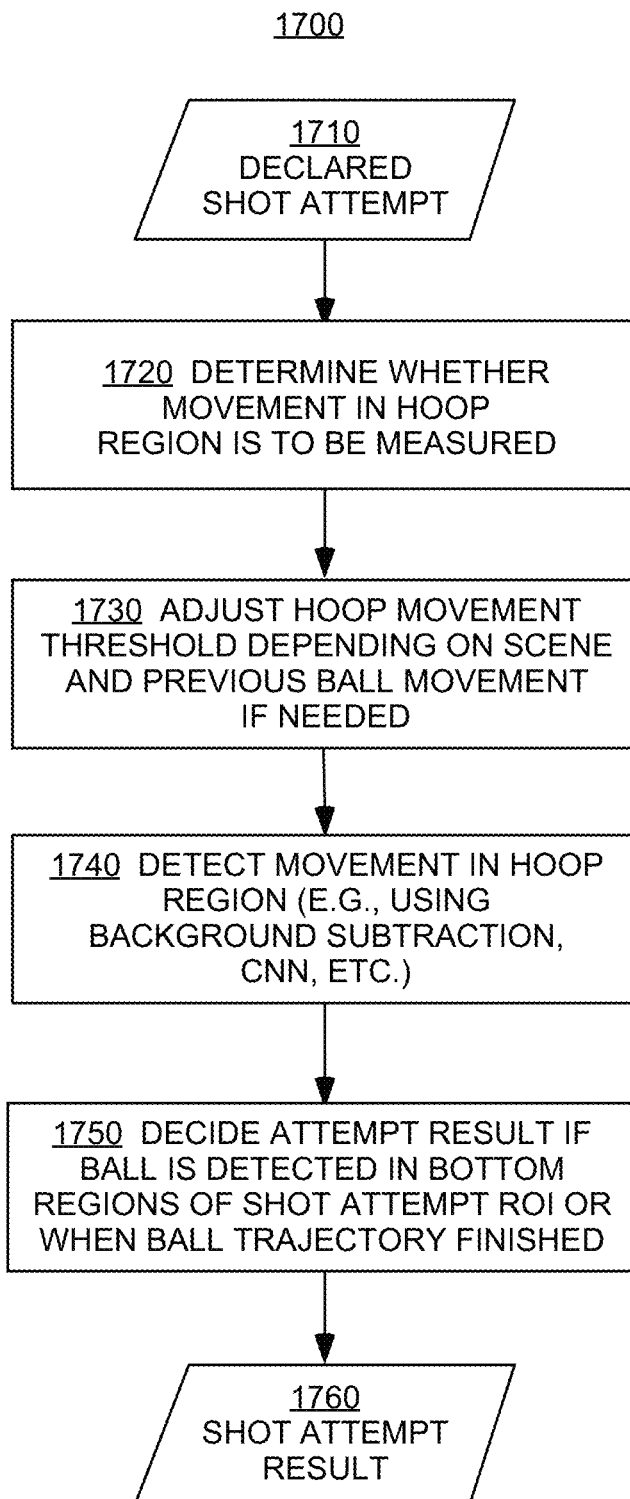
FIG. 17 is a flow diagram of a process for shot attempt result determination, according to some embodiments of the present invention.
Figure 18:
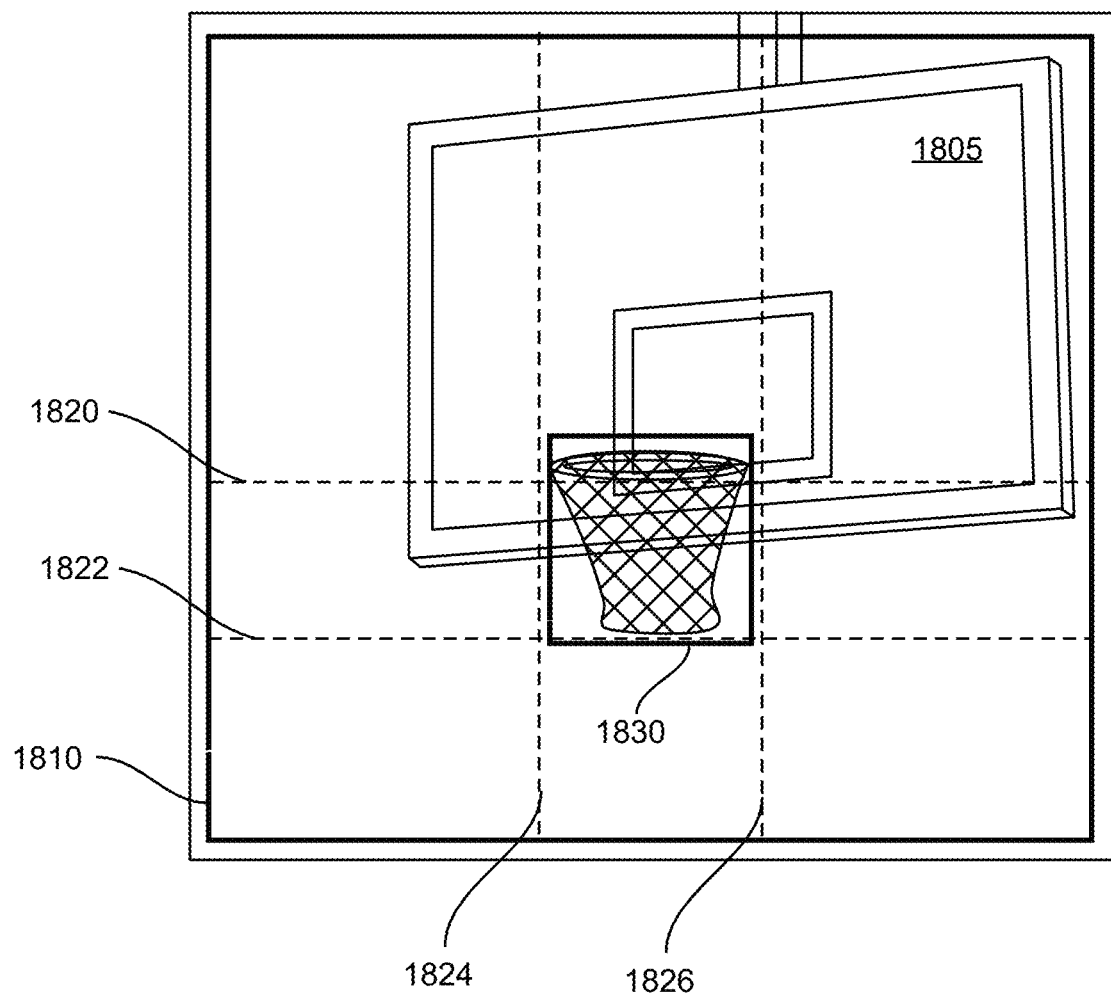
FIG. 18 is a diagram illustrating ROIs for shot attempt detection, according to some embodiments of the present invention.
Figure 19:
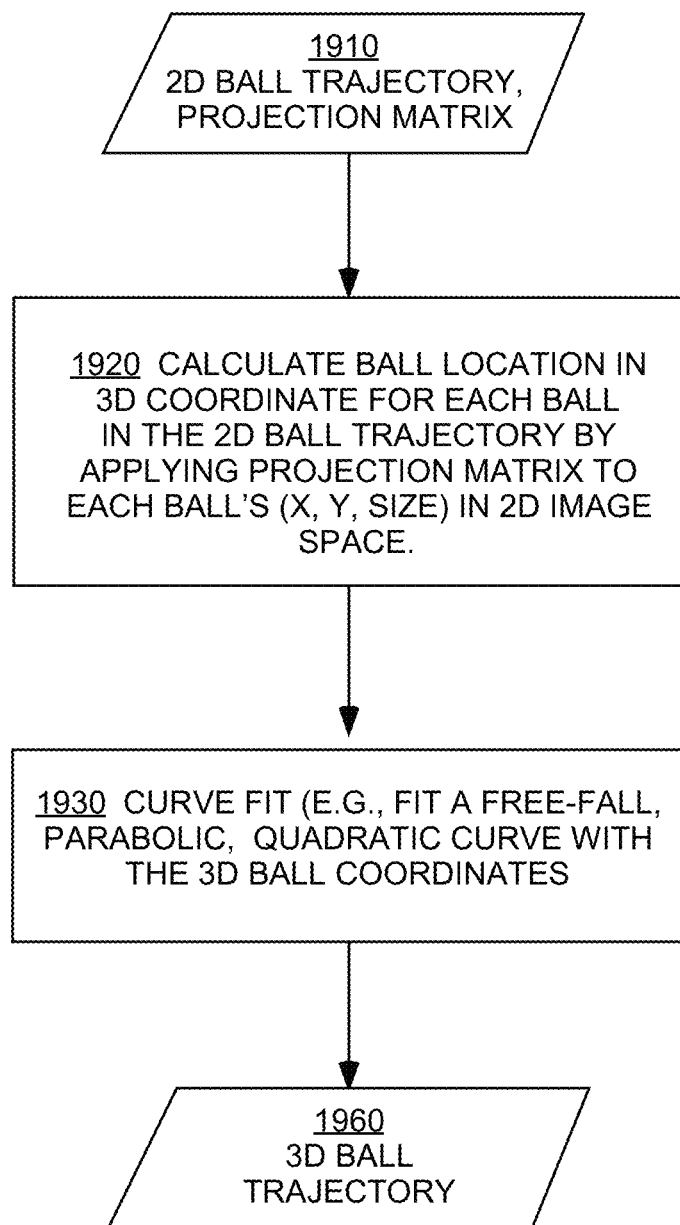
FIG. 19 is a flow diagram of a process for constructing a 3D ball trajectory, according to some embodiments of the present invention.

FIGS. 16-18 show flow diagrams of processes for ball tracking, frame buffering, initial shot attempt detection, shot attempt result determination, and associated ROIs for shot attempt detection. FIGS. 19 and 20 show flow diagram and views associated with 3D ball trajectory construction. FIGS. 21-24 show flow diagram and view associated with player tracking, exemplary player clusters for player identification, and a process for detecting potential shooters, shot attempts, and respective shooting locations. FIGS. 25-29 show screen captures of a game analytics system upon initialization, real-time recordings of a successful shot attempt, result charts for the game, and game statistics tables.

Figure 30:
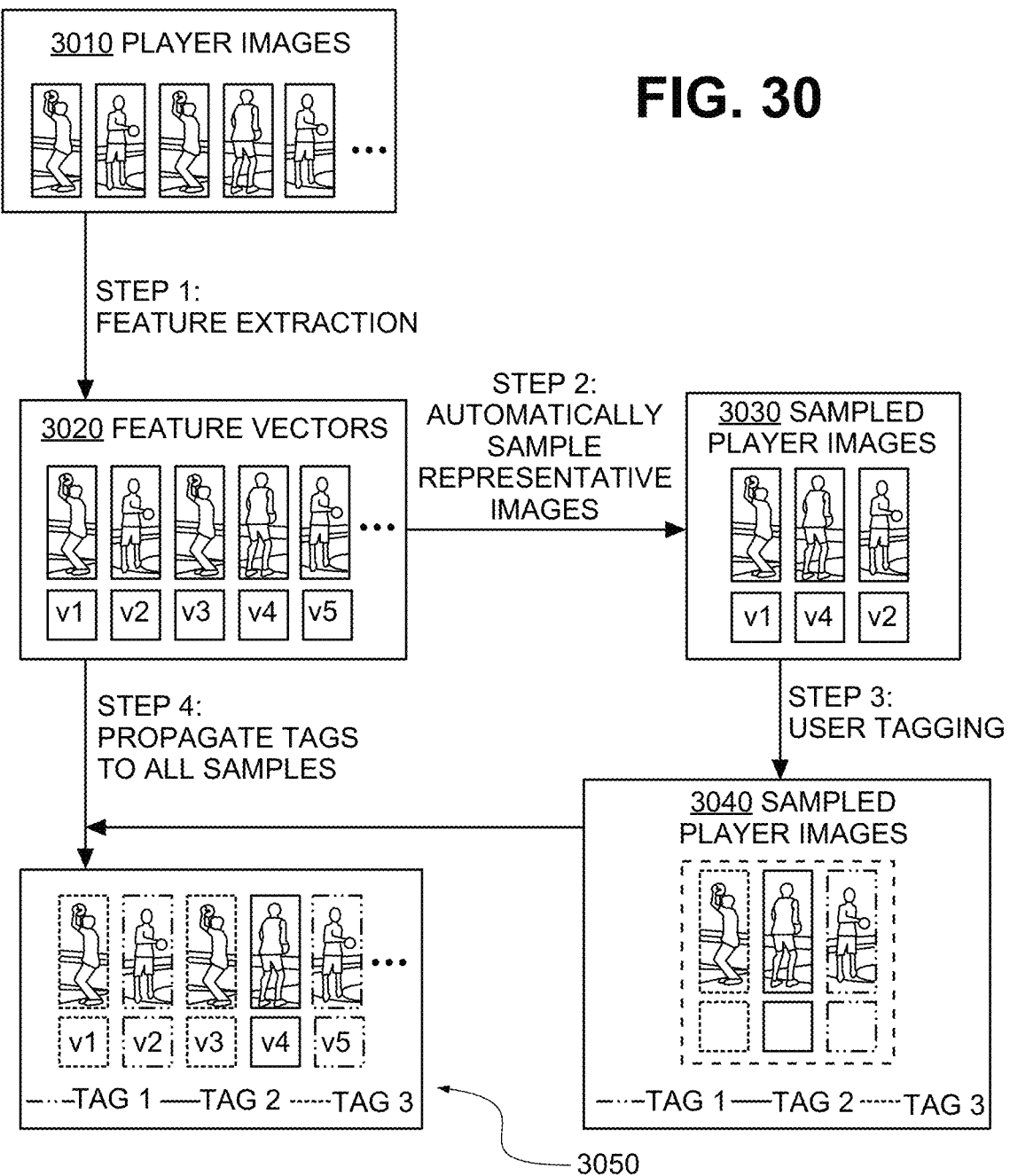
FIG. 30 is an illustrative diagram of a process for player clustering by multiplayer tagging, according to some embodiments of the present invention.
Figure 31A:
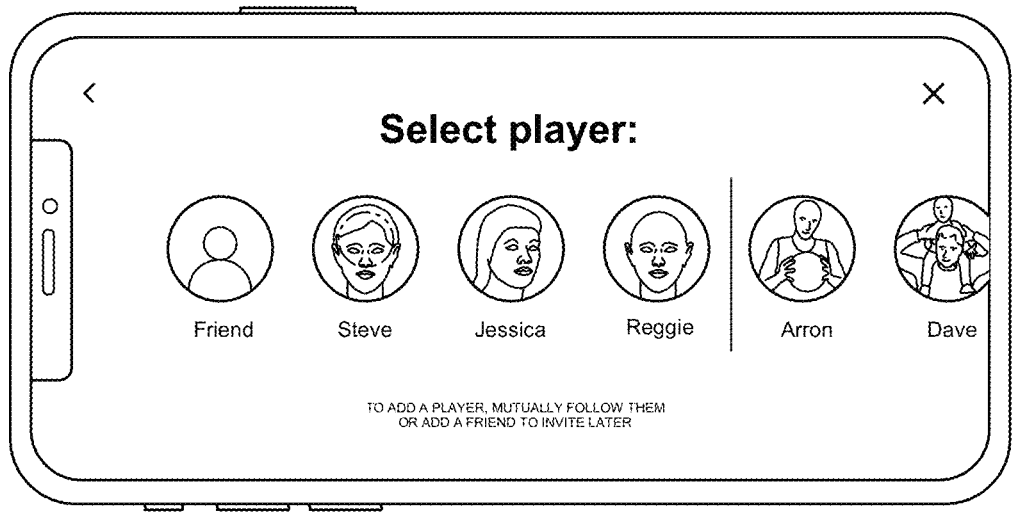
FIG. 31A shows a diagram representing an exemplary screen of an application running on a mobile computing device, in which a player can be selected for game analytics generation, according to some embodiments of the present invention.
Figure 31B:
FIG. 31B shows a diagram representing an exemplary screen of an application running on a mobile computing device, in which at least one player can be selected as making a shot attempt for game analytics generation, according to some embodiments of the present invention.
Figure 31C:
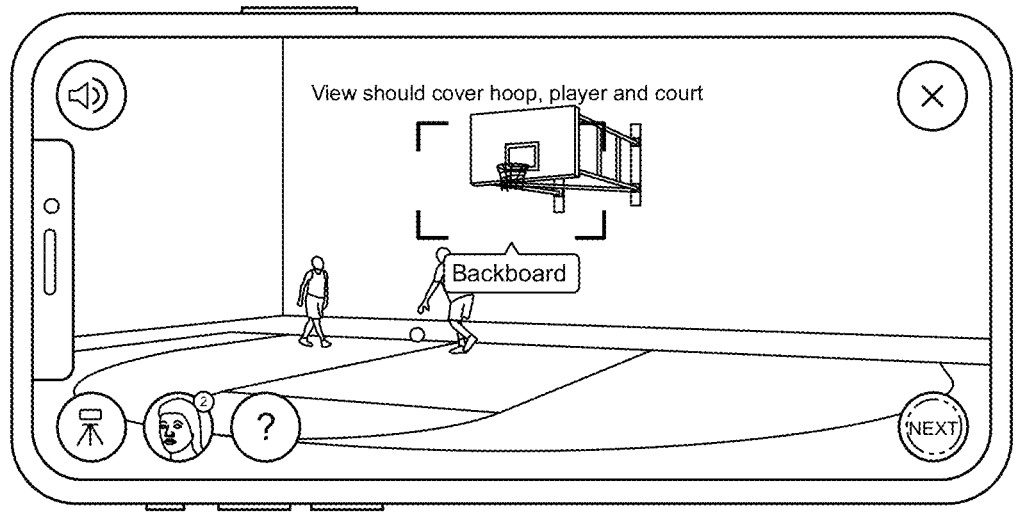
FIG. 31C shows a diagram representing an exemplary screen of an application running on a mobile computing device, in which the application indicates to the user that the view captured by the camera needs to cover the goal, players, and game area, according to some embodiments of the present invention.
Figure 31D:
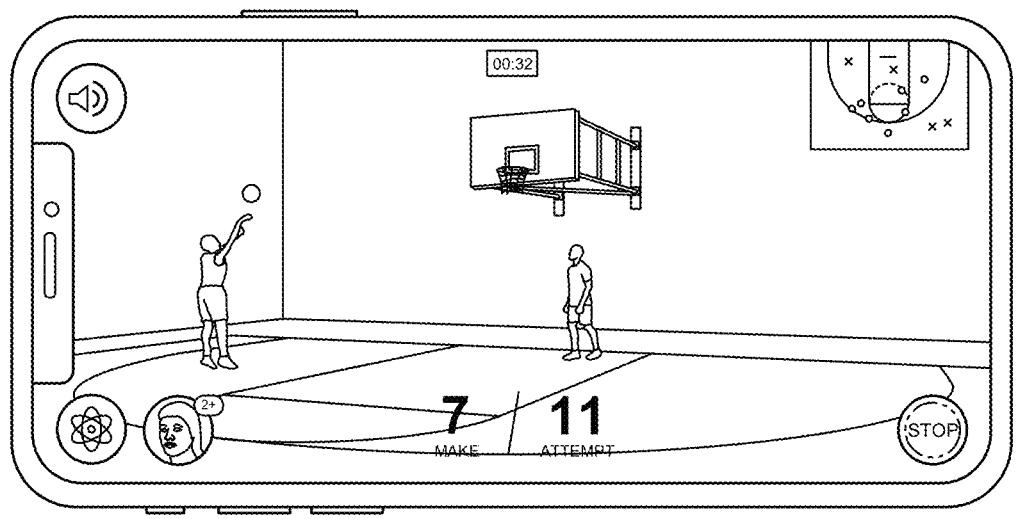
FIG. 31D shows a diagram representing an exemplary screen of an application running on a mobile computing device, in which two players playing a game are recorded and the application shows the number of shot attempts and goals made as part of the game analytics generation, according to some embodiments of the present invention.
Figure 31E:
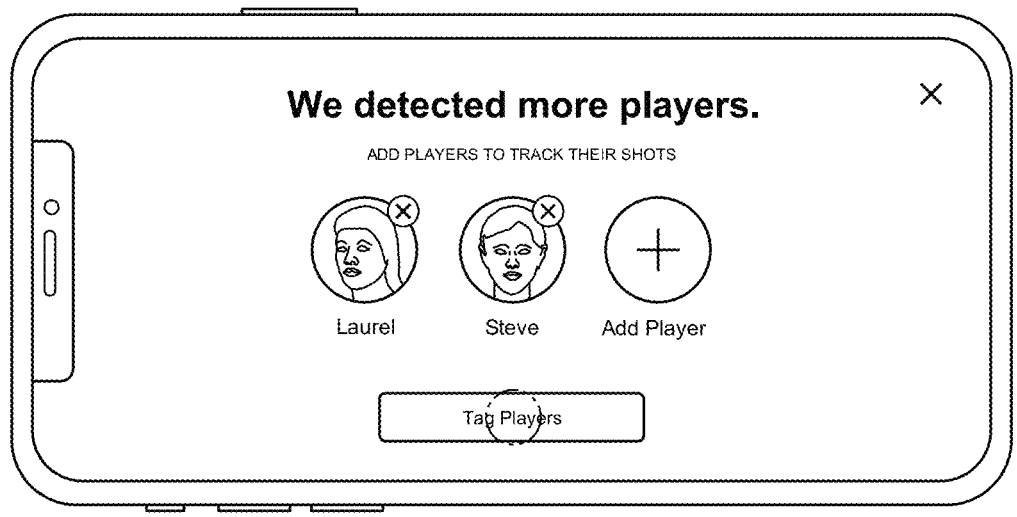
FIG. 31E shows a diagram representing an exemplary screen of an application running on a mobile computing device, in which additional players are detected by the disclosed systems and the application allows the user to select and tag the detected users for game analytics generation, according to some embodiments of the present invention.
Figure 31F:
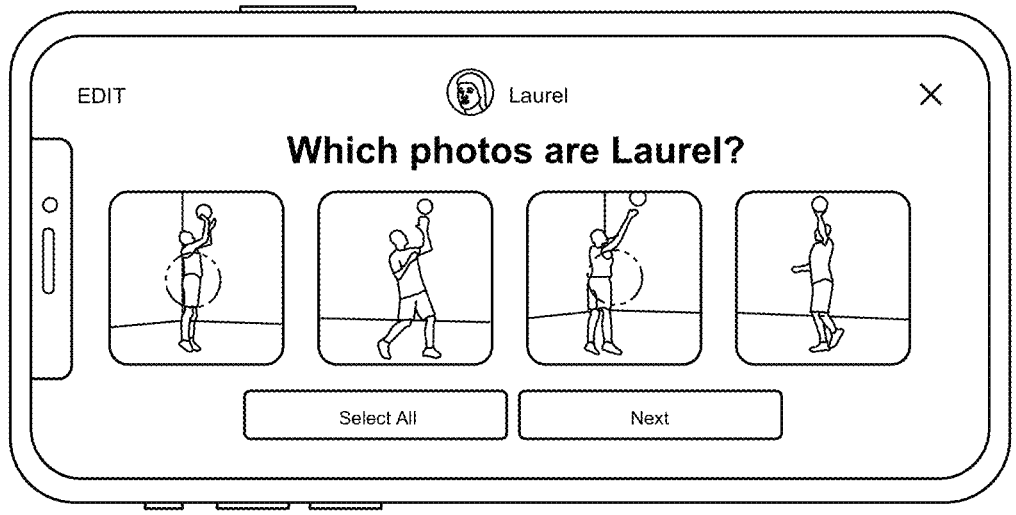
FIG. 31F shows a diagram representing an exemplary screen of an application running on a mobile computing device, in which the application shows the user various photos (e.g., four photos) of the players playing a game in order for the user to select given photos (e.g., two photos) that correspond to a given player and thereby train the disclosed systems and improve player identification and tracking accuracy, according to some embodiments of the present invention.
Figure 31G:
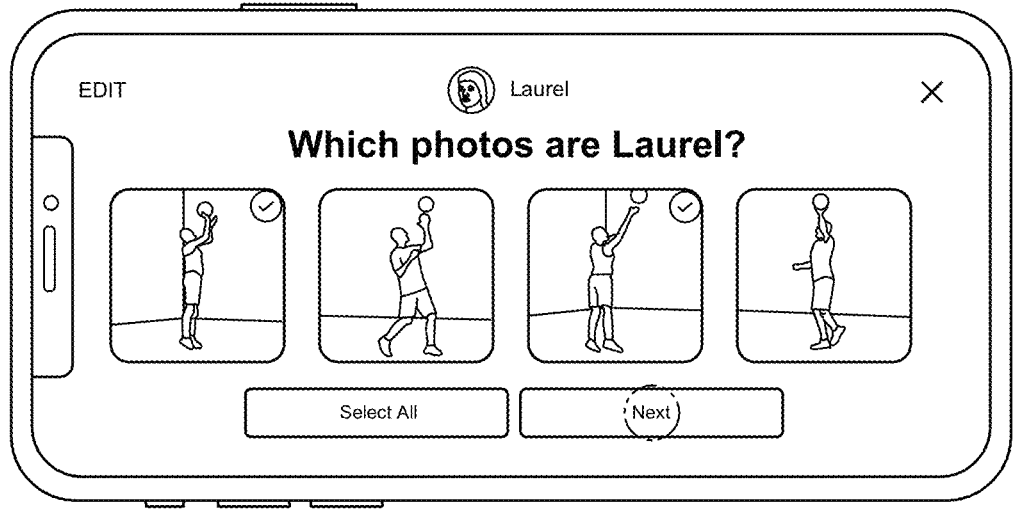
FIG. 31G shows a diagram representing an exemplary screen of an application running on a mobile computing device, in which the application shows the user various photos (e.g., four photos) of the players playing a game and the disclosed system preselects a subsection (e.g., two photos) of the photos corresponding to a given player (e.g., Laurel) for the user to confirm and thereby train the disclosed systems and improve player identification and tracking accuracy, according to some embodiments of the present invention.
Figure 31H:
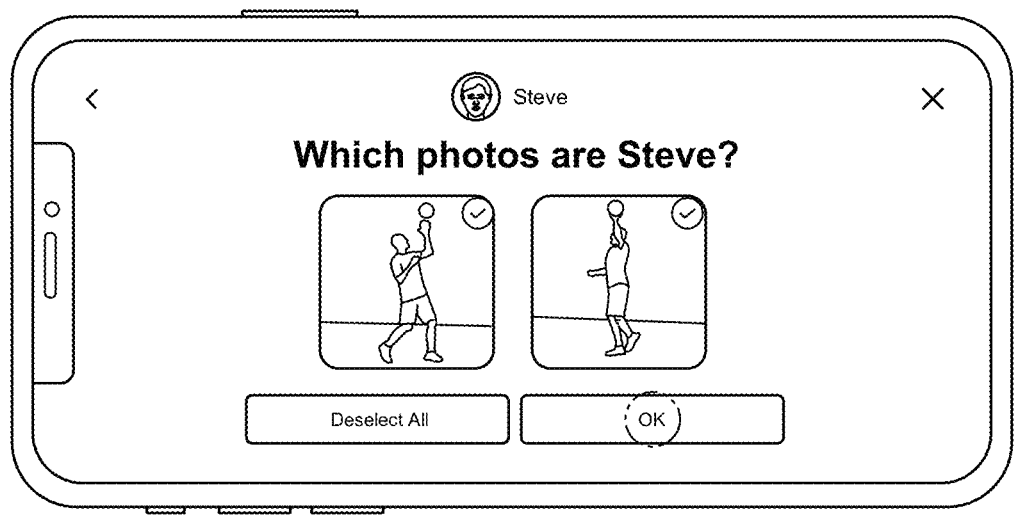
FIG. 31H shows another diagram representing an exemplary screen of an application running on a mobile computing device, in which the application shows the user photos (e.g., two photos) of the players playing a game and the disclosed system pre-selects the photos corresponding to a given player (e.g., Steve) for the user to confirm and thereby train the disclosed systems and improve player identification and tracking accuracy, according to some embodiments of the present invention.
Figure 31J:
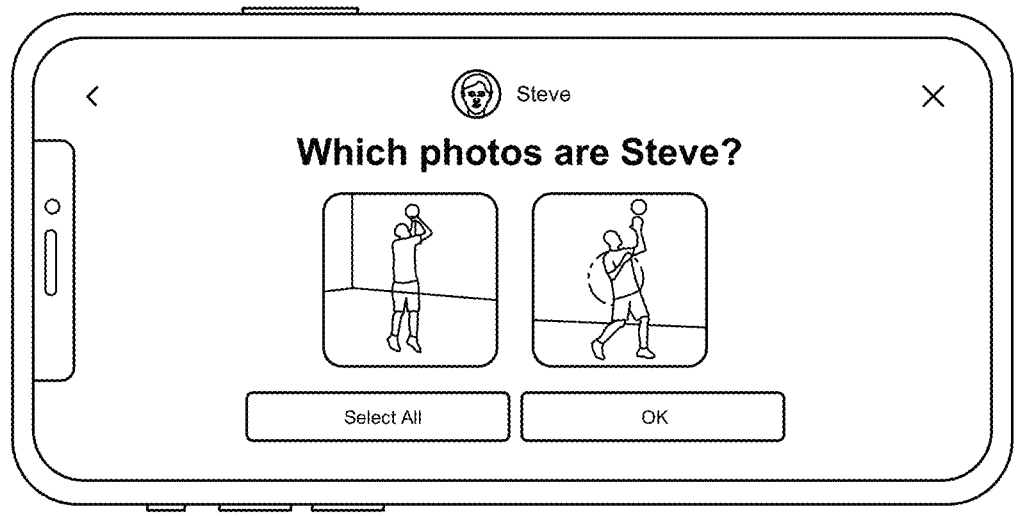
FIG. 31J shows a diagram representing an exemplary screen of an application running on a mobile computing device, in which the application shows the user various photos (e.g., four photos) of the players playing a game for the user to select a given player manually and thereby train the disclosed systems and improve player identification and tracking accuracy, according to some embodiments of the present invention.
Figure 31K:
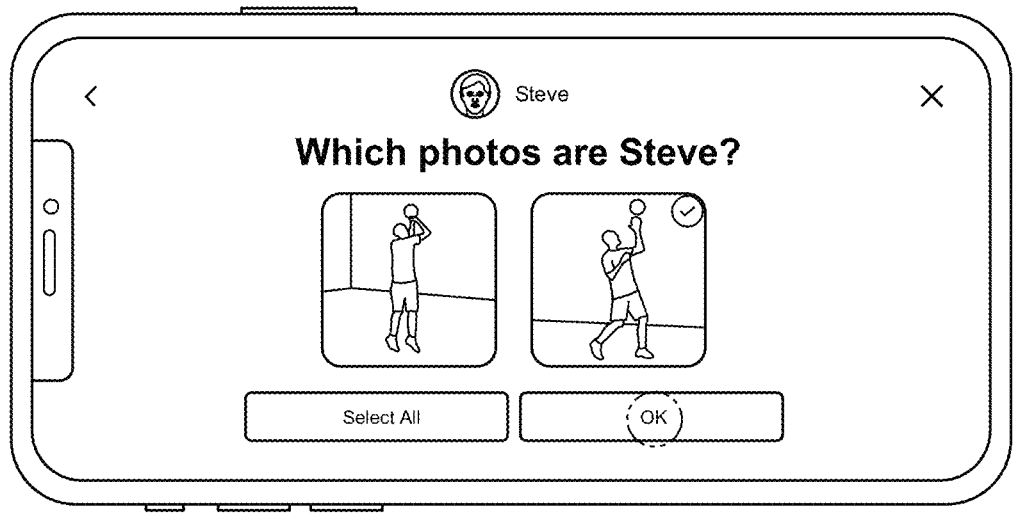
FIG. 31K shows a diagram representing an exemplary screen of an application running on a mobile computing device, in which the disclosed systems add an identifying mark to the player selected by the user as depicted in FIG. 31J, according to some embodiments of the present invention.
Figure 31L:
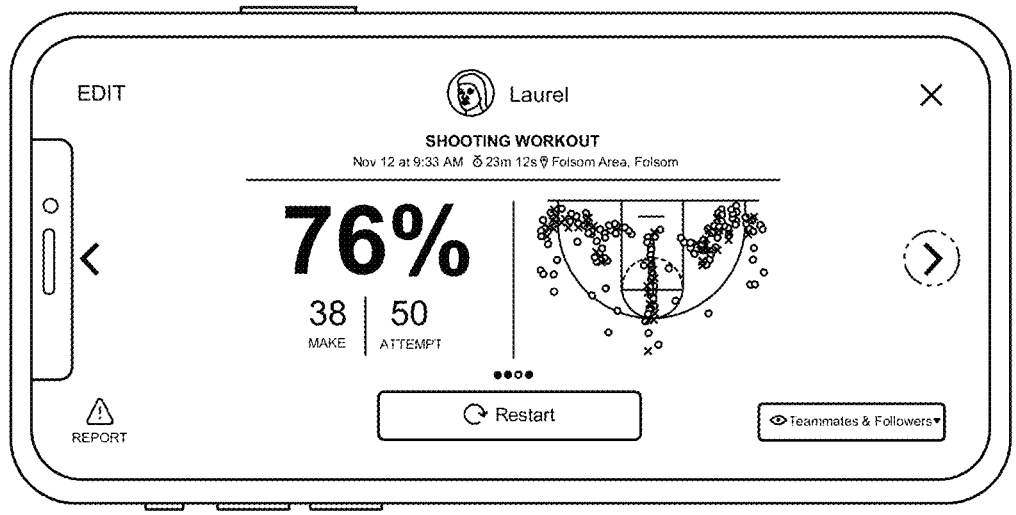
FIG. 31L shows a diagram representing an exemplary screen of an application running on a mobile computing device, in which the game analytics and statistics associated with a first player (e.g., Laurel) of a game is displayed, according to some embodiments of the present invention.
Figure 31M:
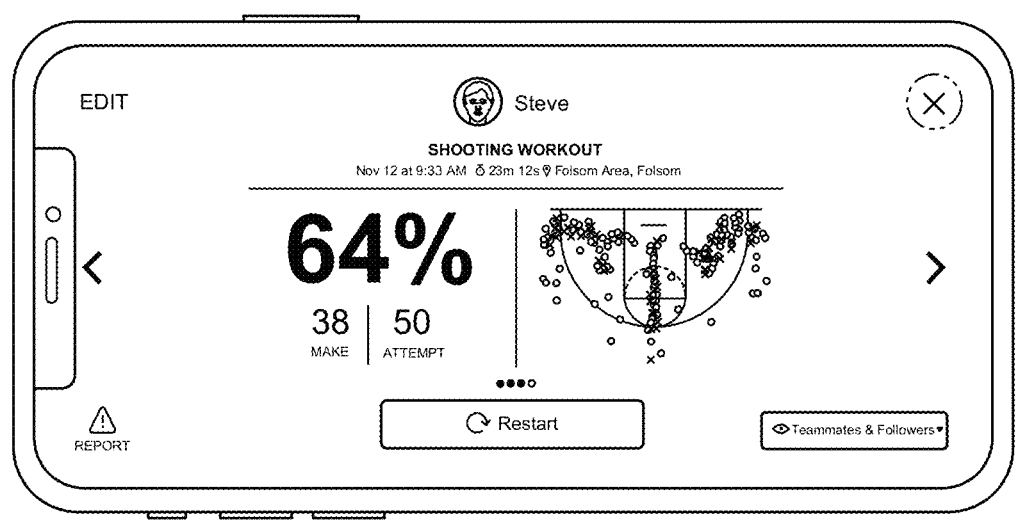
FIG. 31M shows a diagram representing an exemplary screen of an application running on a mobile computing device, in which the game analytics and statistics associated with a second player (e.g., Steve) of a game is displayed, according to some embodiments of the present invention.
Figure 32:
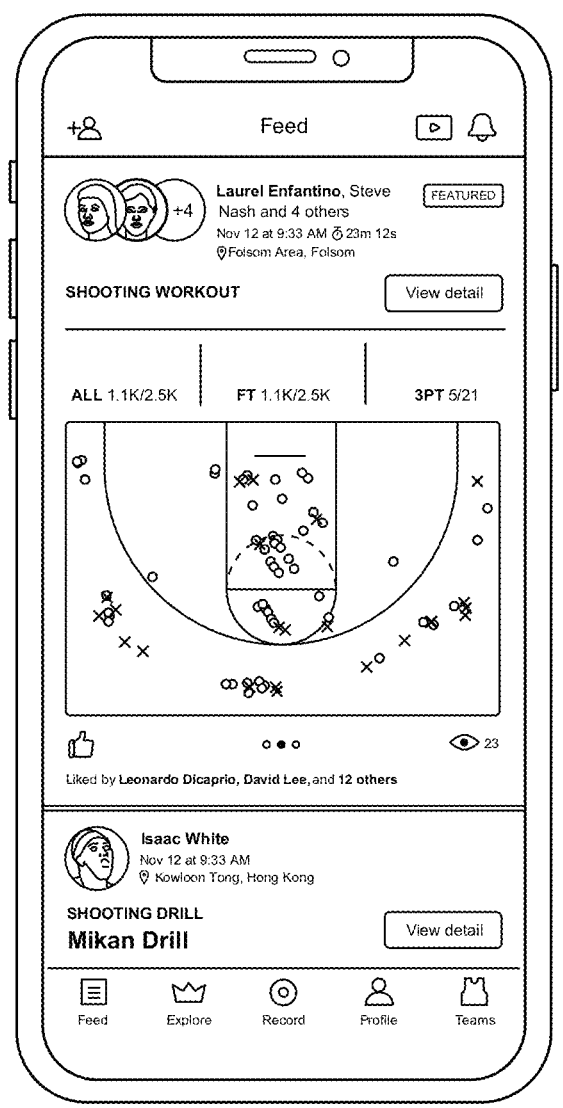
FIG. 32 shows a diagram representing an exemplary application running on a mobile computing device, in which multiple avatars are shown for a multiplayer workout in a feed card, according to some embodiments of the present invention.
Figure 33:
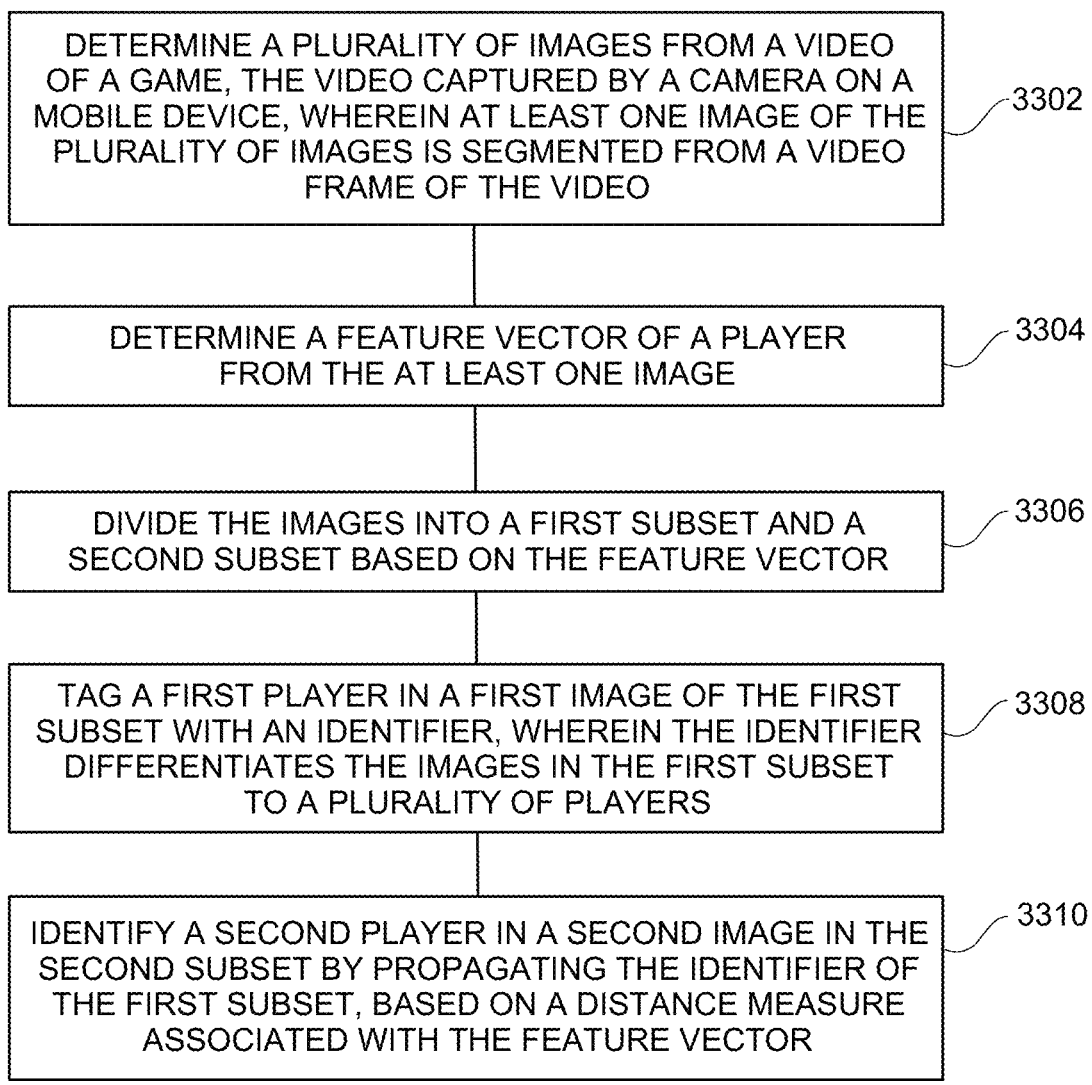
FIG. 33 is a sample flow diagram illustrating a process for image clustering showing one embodiment of the present invention.
Figure 34:
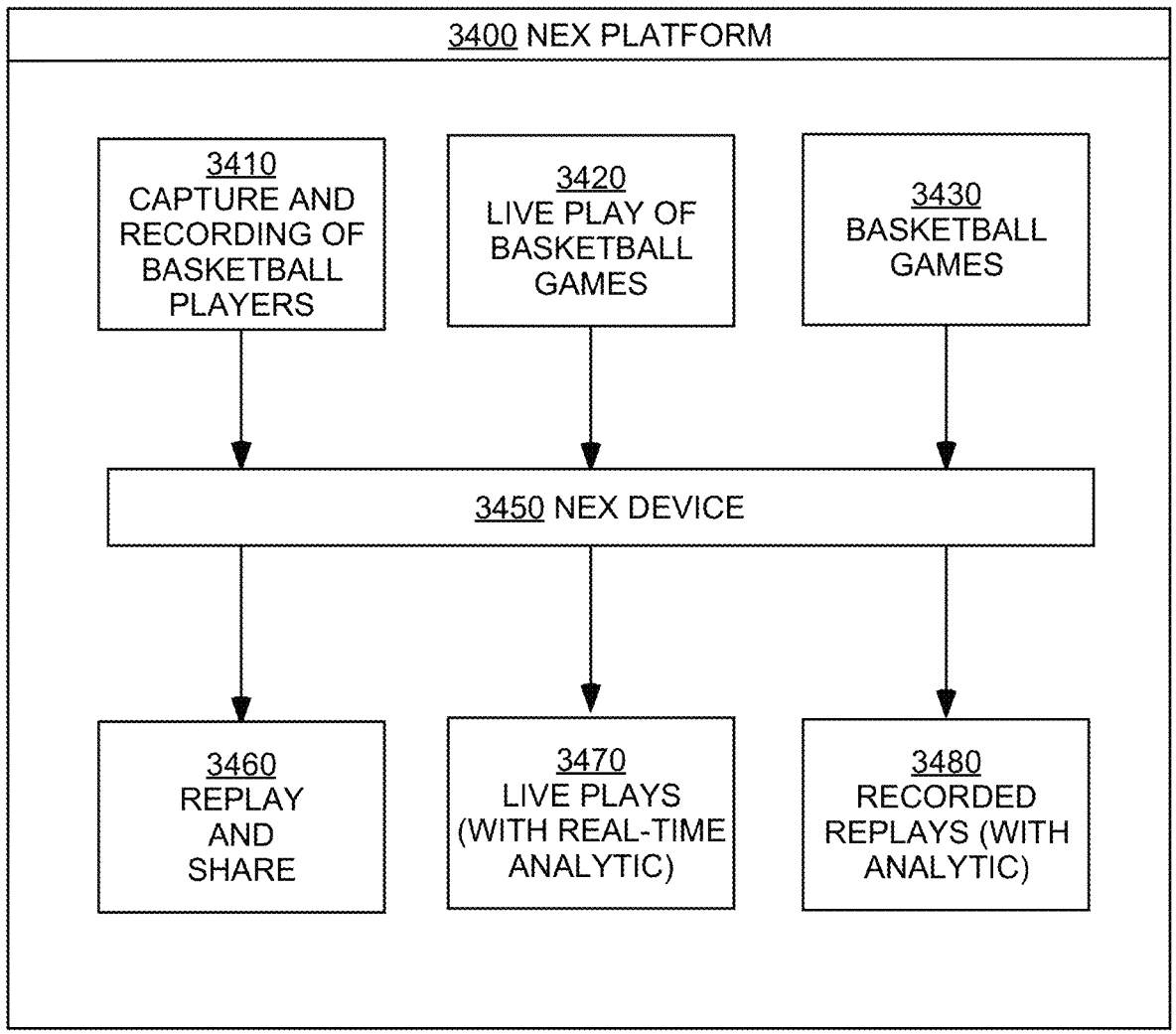
FIG. 34 is a schematic diagram illustrating a NEX platform, according to one embodiment of the present invention.
Figure 35:
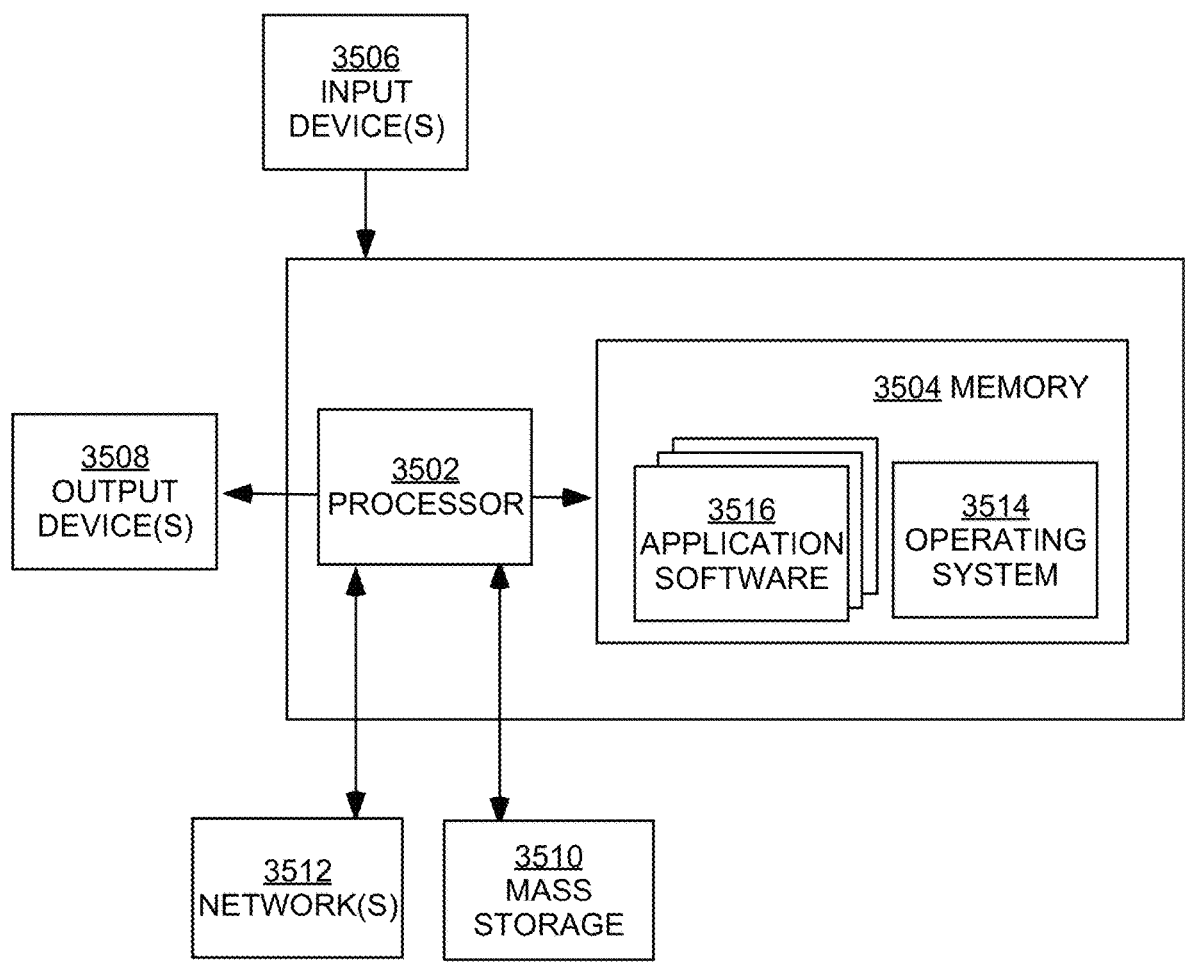
FIG. 35 is a schematic diagram of a computing device in which the present invention may be utilized, according to some embodiments of the present invention.

FIGS. 30-32 represent figures that include some of the embodiments associated with systems and methods for player image clustering for multiplayer sports games. In particular, FIG. 30 shows an example process diagram for player clustering by multiplayer tagging, while FIGS. 31A-M show exemplary screens of an application running on a mobile computing device in which players can be selected for game analytics generation and game analytics can be shown. FIG. 32 shows a screen on the application in which multiple avatars can be displayed for a multiplayer workout in a feed card. FIG. 33 is a sample flow diagram illustrating a process for image clustering showing one embodiment of the present invention. Finally, FIG. 34 is a schematic diagram illustrating a NEX platform and FIG. 35 is a schematic diagram of a computing device in which the present invention may be utilized.

Overview and Context

FIG. 1 shows a schematic diagram 100 for practicing one embodiment of the present invention. More specifically, FIG. 1 is an architectural overview of a computing device-based system for generating game recordings and game analytics. A computing device 130 comprises at least one camera for capturing various image and video footage 150 of game actions, and may implement a NEX system 110 for generating game analytics such as a shot location map 140 and shot analytics 160. Exemplary computing devices include, but are not limited to, dedicated or general-purpose hardware, desktop computers, and mobile devices such as smartphones, tablets, laptops, smart watches, and the like. In some embodiments, computing device 130 is used for image capturing alone, such as with a point-and-shoot camera or a high-end single-lens reflex camera, while NEX system 110 is implemented separately in a connected hardware system. In other words, NEX system 110 may be implemented directly on computing device 130, or may be implemented in software or hardware connected to computing device 130. In some embodiments, NEX system 110 is a distributed system, where detection, tracking, and analysis services such as 112, 114, 116, 118, and 120 are implemented on physically or logically separate devices. In some embodiments, one or more portions of NEX system 110 may be hosted in the cloud. In yet some other embodiments, more than one instances of NEX system 110 may be networked, for example, to provide game analytics for a competitive game, where two mobile devices are utilized to capture two virtually or physically opposing goals and two halves of a ball court or to provide cross-verification of the analysis results and to facilitate opposing game plays.

Exemplary processes performed by NEX system 110 includes retrieving game recordings or shot videos 150 recorded by computing device 130 from local memory or from a remote database. Generally, "receipt," "retrieval," or "access" to or of a video recording refers to the actions of performing read and/or write operations to the saved video content in memory, with or without explicit graphical displays on a display device such as a touch screen. In some embodiments, NEX system 110 may also perform one or more of Step 112 detecting backboard, hoop, and/or court lines, Step 114 tracking one or more balls, optional Step 116 detecting shot location, Step 118 identifying a shooter, and Step 120 generating game analytics, where game analytics data may be based on shot attempt results and locations, and in the form of additional graphical and/or numerical data. In addition, NEX system 110 may split a game recording into per-shot segments of individual shot attempts (shown in FIG. 2), provide a bird-eye view 140 of the basketball court showing shot attempt locations derived from foot positions of players making the shot attempts, and perform shot quality analysis 160 including whether a shot has been a swish or not, a shot attempt result 162 on whether the shot attempt has been a make or a miss, miss reason, shot release time 166, and shot arc 164 at which the shot has been attempted.

Illustrative Analytics and Outputs

Without first getting into implementation details, this section provides a series of screen captures illustrating outputs that may be generated by various embodiment of the present invention, including game analytics, shot analytics, player-based statistics, and many others.

Figure 2:
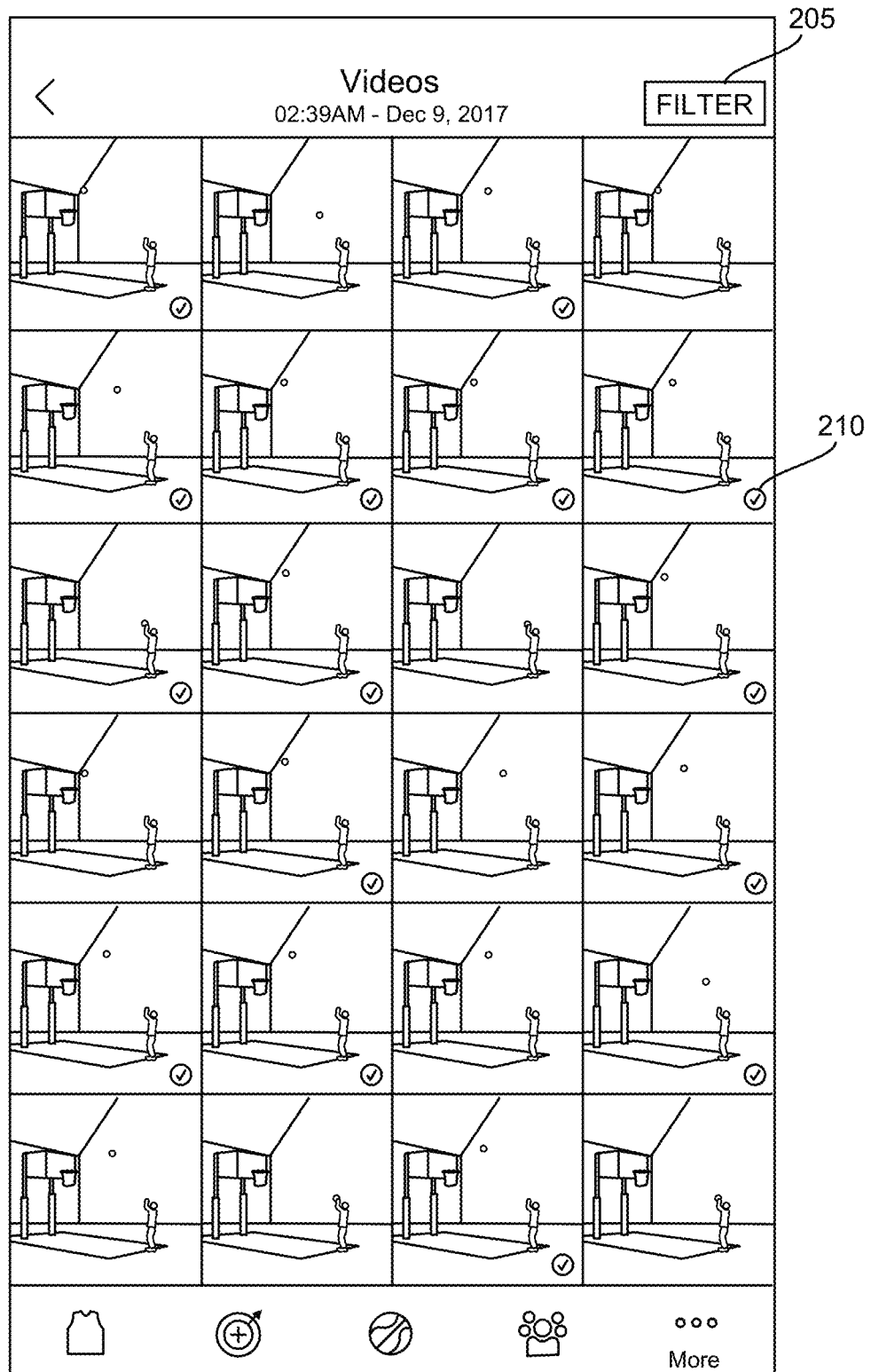
FIG. 2 is an exemplary list of videos of shot attempts, according to one embodiment of the present invention.

FIG. 2 is an exemplary list 200 of thumbnails or icons representing video clips or segments of individual basketball shot attempts detected by the NEX system, according to one embodiment of the present invention. In this disclosure, a shot attempt is the act of a player attempting to make a shot towards a field goal. For example, in FIG. 2, each shot attempt is the act of a player throwing a basketball towards a basketball hoop and thus attempting to make a shot. The result of a shot attempt may be a make or a miss, indicating a successful or unsuccessful shot. A successful shot attempt result may be combined with a detected foot location of the player making the shot attempt when the basketball left the player's hands to determine a score achieved by the shot. In other exemplary ball games such as a soccer game, a shot attempt is similarly the act by a player kicking or heading a soccer ball towards a net.

In some embodiments, each video segment includes only one identified shot attempt, obtained by analyzing a real-time or on-demand recording. The recording may be split into individual video clips each covering a duration from a player initiating a shot to when the result of the shot (make or miss) is identified. In some embodiments, the recording may be split into individual video clips covering a duration including one or more passes and a subsequent shot attempt made. In some embodiments, the list of video clips shown in FIG. 2 may be filtered, either during the clip generation process, or over the display screen via an icon 205, according to pre-defined or user-selected criteria such as player name, make or miss, player location when attempting the shot, free throws (FTs), three-point field goals (3PTs), rebounds (RBs) and the like. For example, in this embodiment, checkmarks such as 210 are shown at the right bottom corner of the thumbnail of each video clip to indicate whether a shot attempt has been successful. Similarly, abbreviations may be provided on each thumbnail to indicate the player making the shot attempt; the video clips may be ordered chronologically or in a user-specified order such as first by player then by shot attempt results or shot scores.

Figure 3:
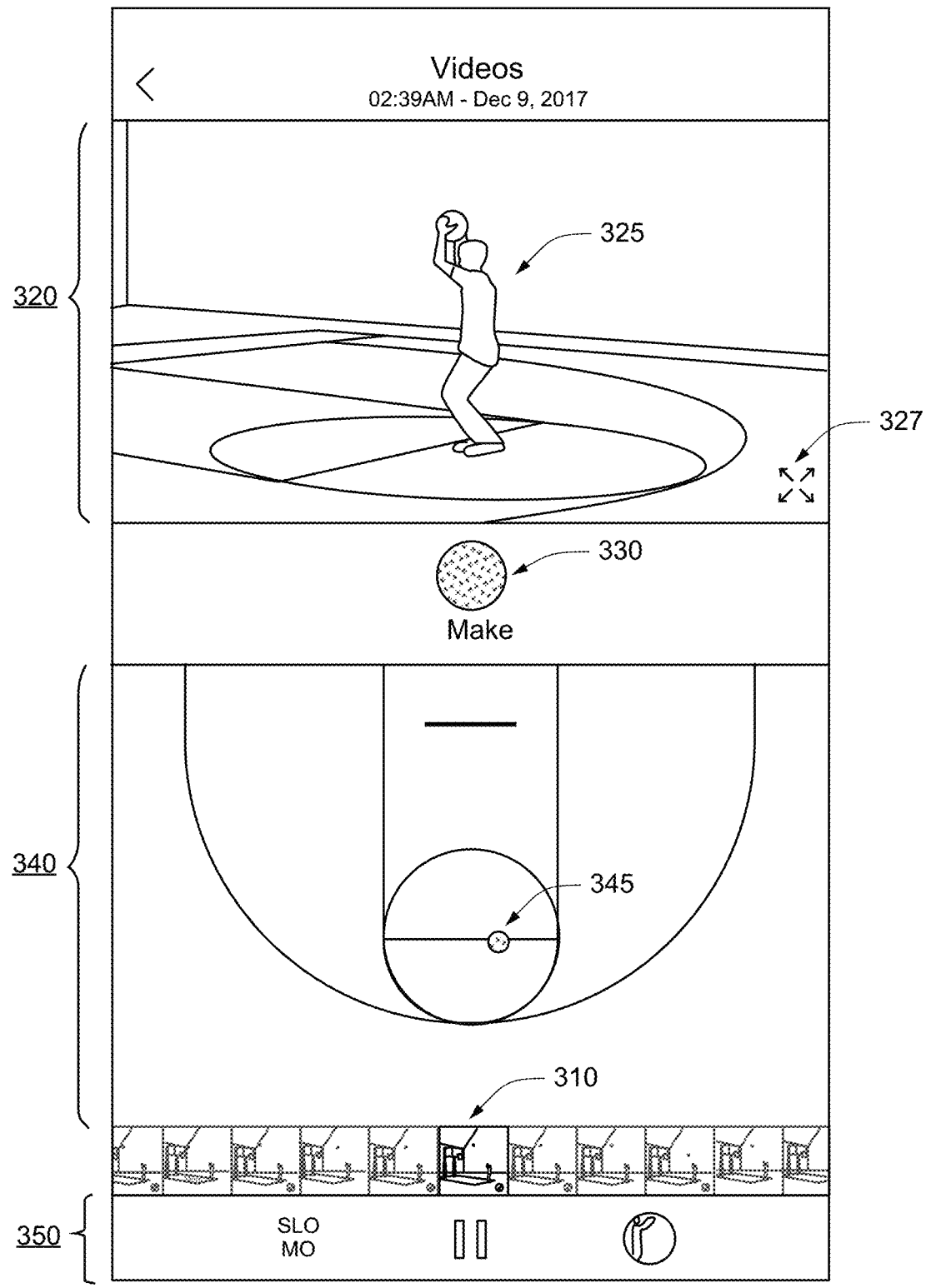
FIG. 3 shows a screen capture of an exemplary video of a successful shot attempt selected from the list in FIG. 2, according to one embodiment of the present invention.

FIG. 3 shows a screen capture 300 of an exemplary video clip 310 of a shot attempt selected from the list of video clips in FIG. 2, according to one embodiment of the present invention. With information such as shooter foot location and video segment trimming locations detected from an original input video recording, a per-shot attempt video playback experience with shooter-zoom and slow motion is made possible. Window 320 shows a view zoomed over a player 325, with a zoom control 327. The video clip may also be played, or paused, optionally in slow-motion via control icons shown in window 350. Based on collected make or miss information, a continuous shot streak video may also be generated, automatically or upon user request, where one or more dribbling, passing, and shot attempts may be included. In addition, in this example shown in FIG. 3, the shot attempt has been successful, as indicated by a circle 330. Foot position of the player when making the shot attempt is drawn correspondingly as a dot 345 on a bird-eye view diagram 340 of the court, relative to the court lines. In some embodiments, an unsuccessful or missed shot attempt may be labeled with a cross on the bird-eye view of the court.

Figure 4:
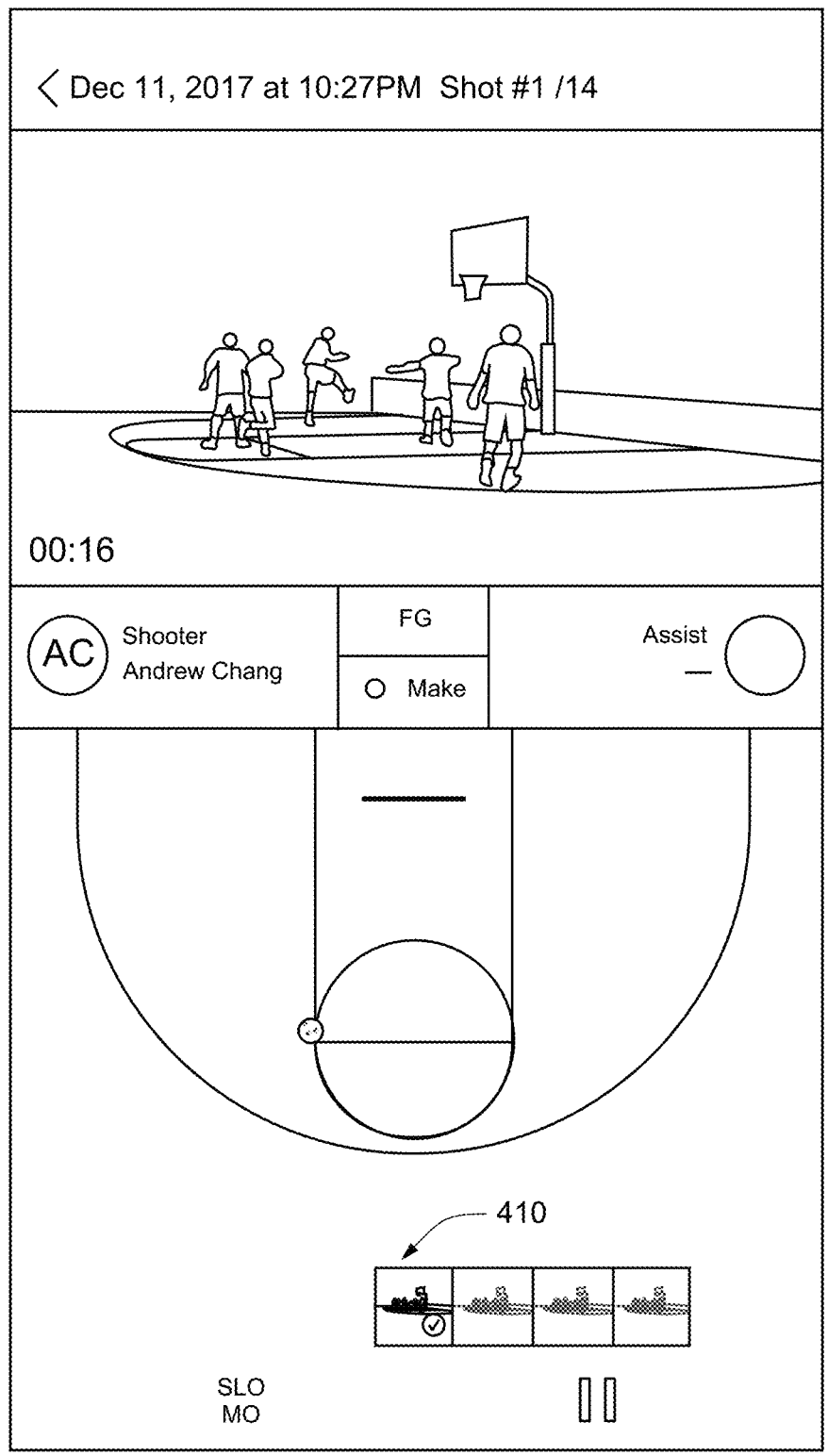
FIG. 4 is a screen capture showing an exemplary video of another successful shot attempt, according to one embodiment of the present invention.

Similarly, FIG. 4 is another screen capture 400 showing an exemplary video clip 410 of another successful shot attempt out of four shot attempts detected from an input video recording, according to one embodiment of the present invention. In this example, more than one player is present on the court. To distinguish the player who has made a detected shot attempt in the video clip, each player may be automatically identified based on player features such as facial features, poses, body sizes, shirt colors, jersey types and the like. More details of player identification and tracking processes are provided in reference to FIGS. 21 and 22. Alternatively, the NEX system may allow prior player name and/or feature input for one or more of the players, and each player may see his or her own practice statistics after a session. The NEX system may use information collected for each shot attempt to suggest statistics such as make or miss, shooter location, and shooter identity. In addition, a user may input other game features or statistics such as identities of the shooter, assister and rebounder, or for particular basketball positions such as point guard, forward, and center.

Figure 5:
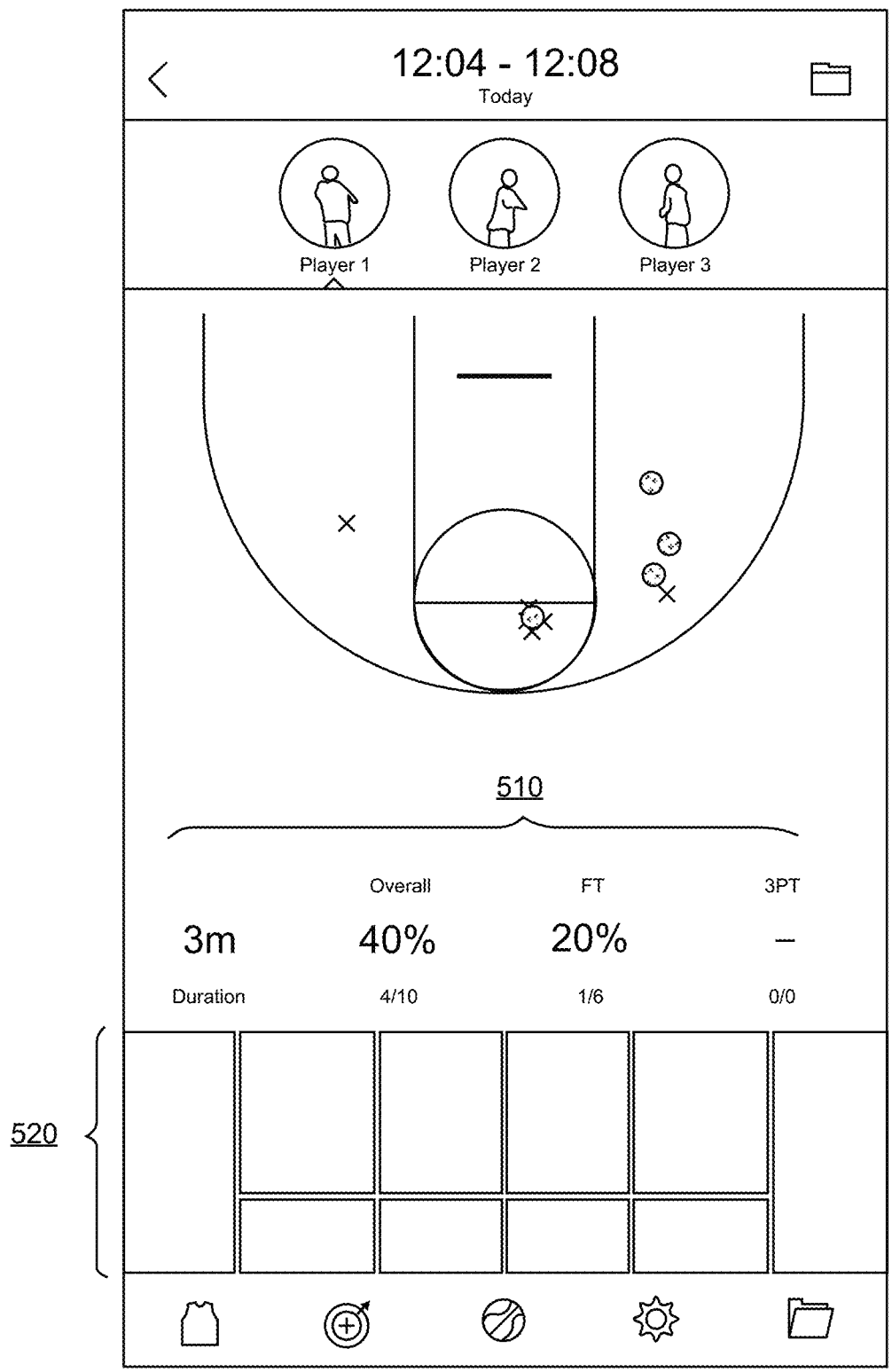
FIG. 5 is a screen capture of a result diagram showing game performance by a selected player, according to one embodiment of the present invention.

FIG. 5 is a screen capture 500 of a result chart showing game performance by a selected player, according to one embodiment of the present invention. In this example, three players have been identified, with Player 1 selected for result display. Locations of both made and missed shots have been drawn on the court diagram, using dots and crosses to indicate shot attempt results. In addition, make and miss statistics 510 are displayed, with 40% success over the entire duration of a 3-minute session, and 20% free throw success. In some embodiments, shot locations for different players may be displayed simultaneously, with each player labeled with a different color or marker shape. In addition, a bottom window 520 may display shot attempt result statistics in different regions of the basketball court.

Figure 6:
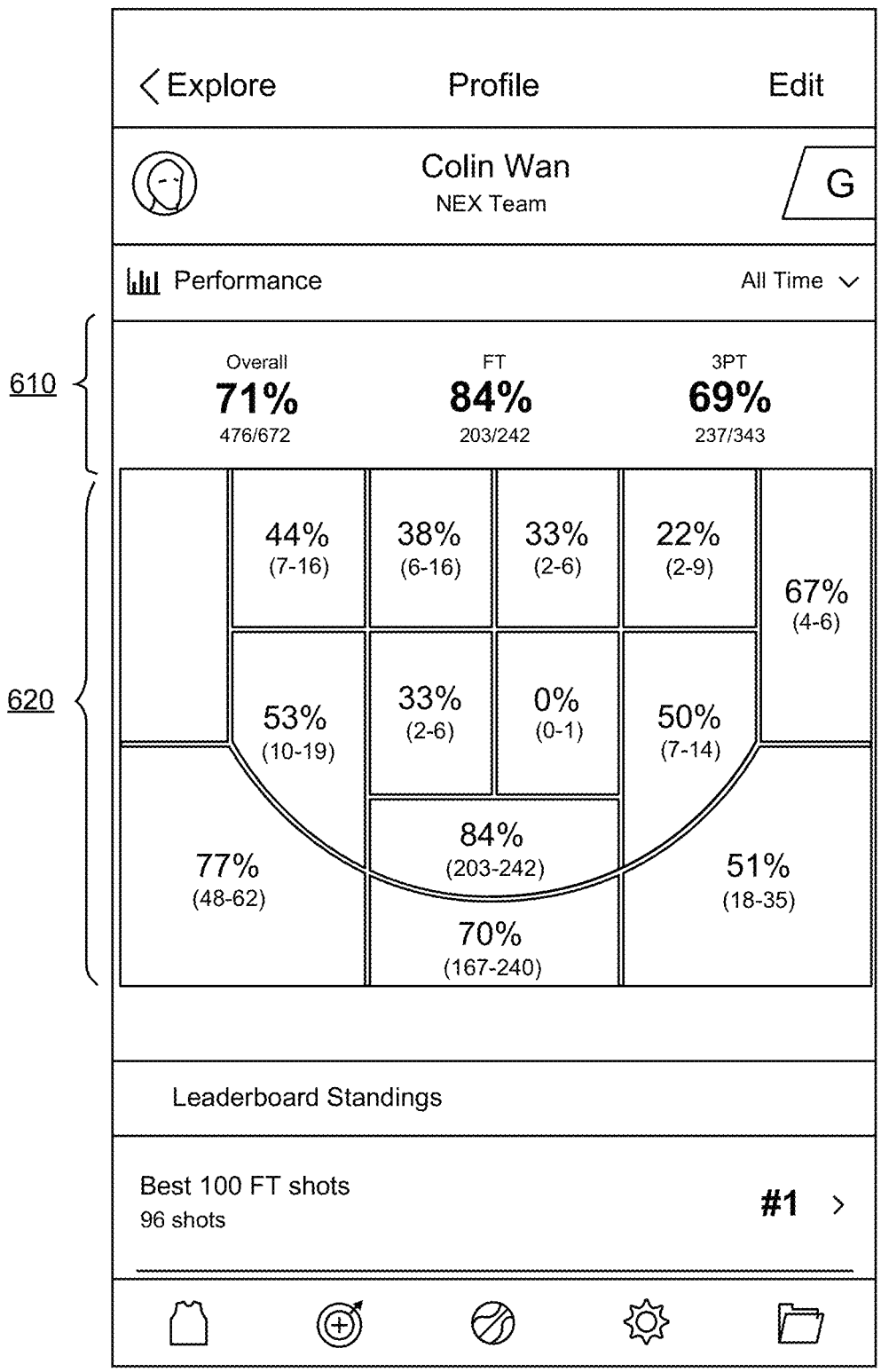
FIG. 6 is a screen capture of a detailed result chart and diagram showing game performance by a player, according to one embodiment of the present invention.

FIG. 6 is another screen capture 600 of a detailed result chart and diagram showing game performance by a player Colin Wan, according to one embodiment of the present invention. In this example, shot statistics or performance of the player Colin Wan collected over all time is displayed, both as total percentages 610, and within different areas on the court, as illustrated by window area 620, for example, to show various shot attempt success rates within each area.

FIG. 7 is a screen capture 700 of an additional detailed chart showing personal records by the player Colin Wan, according to one embodiment of the present invention. In implementations on a mobile device such as a smartphone, game statistics may be displayed on the screen in a scrollable fashion, with FIG. 7 accessible by scrolling up FIG. 6.

Figure 8:
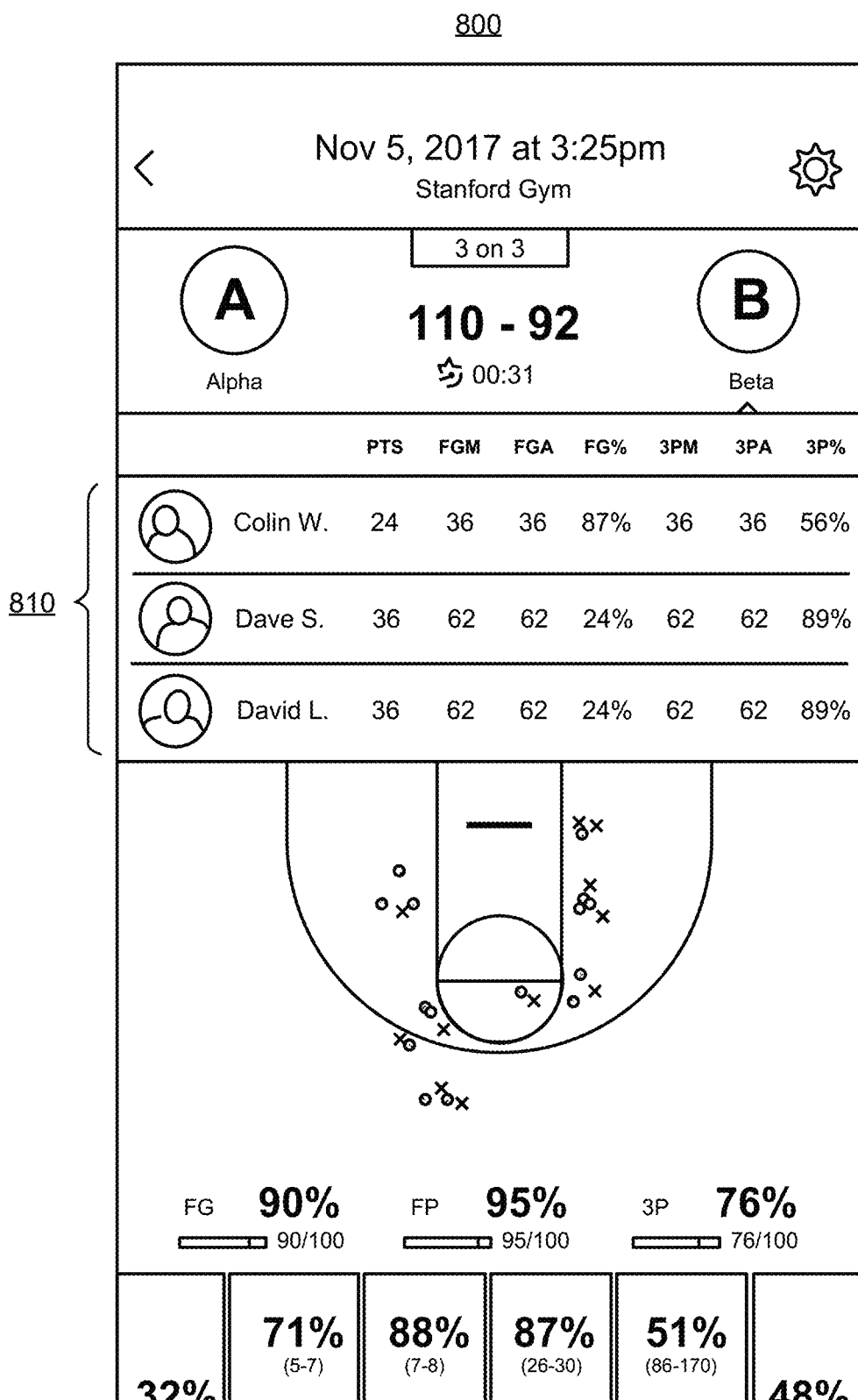
FIG. 8 is a screen capture of a result chart showing game performance by individual players of a team, according to one embodiment of the present invention.

FIG. 8 is a screen capture 800 of a result chart showing game performance by players of a team, according to one embodiment of the present invention. In this example, game scores are displayed on top for a three-on-three game, when 31 seconds remain in the game, and points collected by individual players of the Beta team are displayed in a tabular window 810. With one or both manual input and automatically detected statistics, the NEX system constructs aggregated statistics at game, team and player levels. Game highlight video with only shot attempts may also be generated on a per game and per player basis. Results and statistics as displayed in FIG. 8 may be live updated as a game is in progress, and a user may optionally choose to view such a live result screen rather than the video capture screen, such as shown in FIGS. 25-29.

FIG. 9 is a screen capture 900 of leaderboards showing best performances among multiple players, according to one embodiment of the present invention. In this example, the displayed statistics are collected over multiple shooting practice or competitive game sessions.

NEX System Architecture

This section provides implementation details of the NEX system, according to various exemplary embodiments of the present invention.

Figure 10:
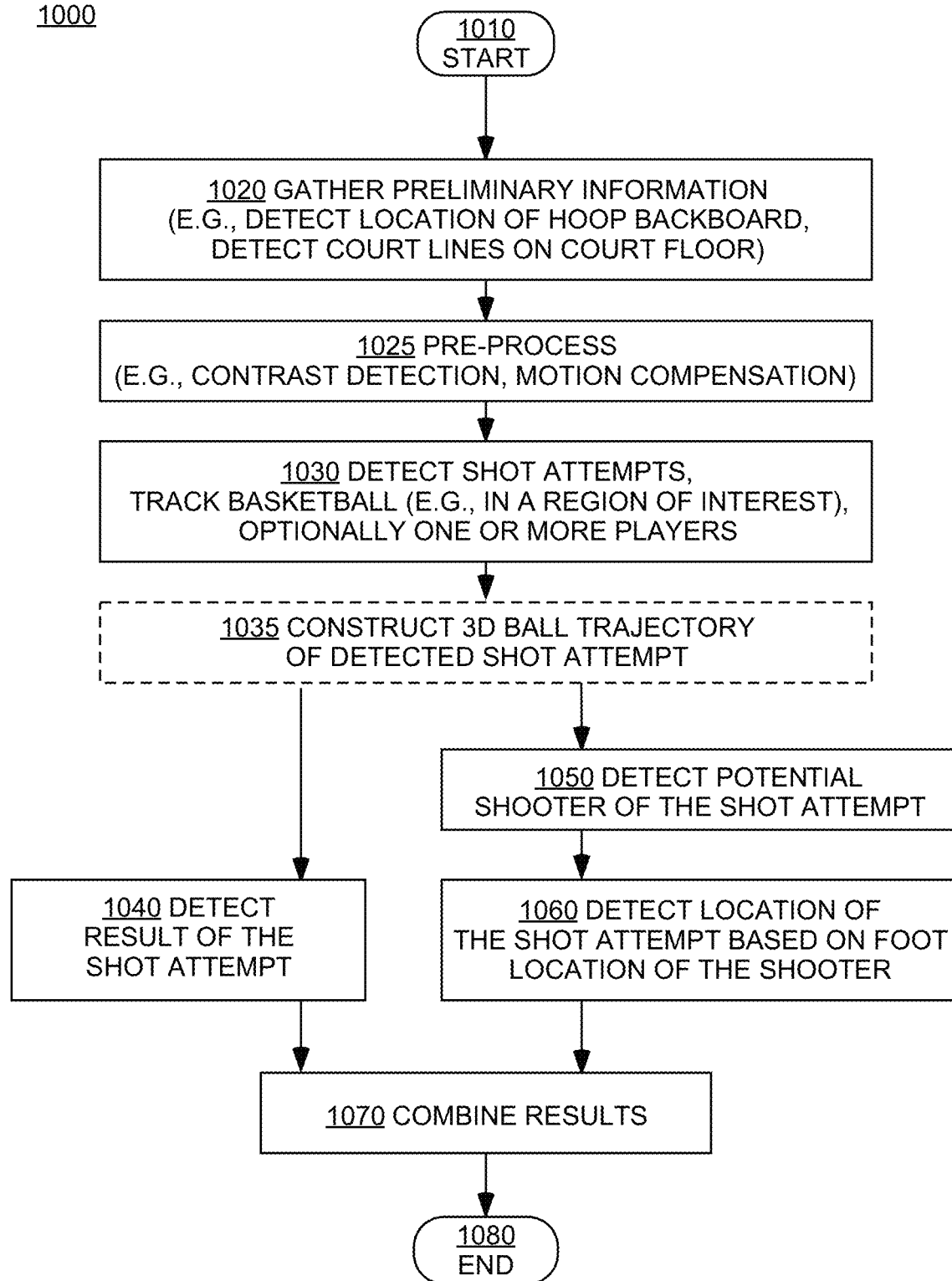
FIG. 10 is a flow diagram of a process for detection and analysis of basketball shot attempts, according to one embodiment of the present invention.

FIG. 10 is a flow diagram 1000 of a process for detection and analysis of basketball shot attempts, according to one embodiment of the present invention. FIG. 10 illustrates individual steps in an exemplary process for identifying and classifying shot attempts, and identifying shooters and corresponding shot attempt foot location, optionally by constructing a 3D ball trajectory. The process begins at step 1010. In this illustrative example, a basketball game played on a basketball court is considered. In other embodiments of the present invention, similar processes may be performed on other ball games such as a soccer game on a soccer field. In addition, the basketball court may be of standard size, or customized size, with or without full court lines.

At step 1020, from an input video or image recording of a ball gameplay, captured through a mobile device, the system first gathers preliminary information for further analysis and shot attempt detection. In some embodiments, the mobile device and a camera situated therein remain stationary during the video capturing process. For example, a tripod may be used, or the mobile device may be hand-held, where motion compensation may be applied to the video recording to reduce minor motion effects such as blur and jitter. In some embodiments, the mobile device and camera situated therein may be non-stationary, by moving through a trajectory during the video capturing process to capture more than one perspective of the gameplay scene. In either case, some or all frames of the input video may comprise a goal, which refers to an area, basket, or other structure towards or into which players attempt to throw or drive a ball, puck, or a similar object to score points.

In some embodiments, the NEX system identifies a Region of Interest (ROI) surrounding the goal by performing a first computer vision algorithm on the input video. For example, the NEX system may first detect multiple feature points relevant to understanding the geometries of the court or relevant to shot attempts, including the corners of a hoop backboard and the inside rectangle, location and geometries of the hoop, and major court lines including but not limited to the intersection of end lines and free throw lines with two free throw lanes.

When step 1020 is first started, the system may scan, using a sliding window, a frame of a captured game video and send windowed portions of the image to a trained CNN for hoop detection. When the CNN detects a likely hoop, it may give a score based on how confident the detection is. After scanning is completed, the NEX system may compare the scores of all likely hoops, apply location weighting to the scores, such that a likely hoop found near the center of the scanned video frame is awarded a higher weight, and determine which likely hoop is indeed a hoop on a basketball court. The NEX system may also look for all backboards appearing in the image, find feature points in each of them, all using a trained convolutional neural network (CNN), and use a perspective-n-point approach to yield an initial estimation of a camera projection model, which may be used to orient and rectify the ground plane, to be provided to another trained CNN to locate major court line intersections. With these identified feature points, the system may estimate multiple camera projection and court model with varying confidence and internal consistency, and finally apply a scoring mechanism to find the most likely model that is relevant to the shooting. In this process, the system may also take additional input from the mobile device's operation system such as the camera's current focal length and optical center, and the device's rotation with respect to gravity, in order to refine the models or reject invalid ones. In performing perspective-n-point, the system may make assumptions of the relative positions of the feature points in the real world, which depend on the type of backboard and basketball courts. The system may use CNN to detect and classify the backboard and basketball courts into different types, or generate multiple models by brute-forcing the different types and use the aforementioned scoring mechanism to select the most likely combination. The system may also involve the users in selecting the right model, by visualizing the detected court model through overlaying lines on the camera image, and allow users to correct any errors through nudging the relevant feature points used in the perspective-n-point calculation. Because the mobile device is not fixed to a solid structure, it is possible that it may be moved or there may be significant vibration happening during and after the detection. Correspondingly, the system may run the aforementioned detection process continuously so that the result is up-to-date, and perform detection only on when the camera provides a stable and sharp image input, through image contrast detection and reading the mobile device's motion sensors.

The aforementioned approach works when the camera has a good view of the backboard and the court lines, which is true when the mobile device is placed above ground, such as on a tripod. In some embodiments, when the mobile device is placed on the ground, the camera may not be able to see the court lines, and the system may estimate the court and camera projection from the detected backboard feature points and the mobile device's motion sensor readings, if the mobile device's placement is restricted at the sidelines.

After obtaining the court and camera projection model relevant to shooting, the system may then remember the hoop, its bounding box and create a region of interest (ROI) around it.

The hoop's bounding box and ROI, and the court projection may be used for make/miss detection, ball tracking and shooting location estimation.

At step 1025, the system is ready to take images in real-time from the camera input and perform various detections. However, because the mobile device is subject to movement and vibration, the system may pre-process the images to eliminate noises due to vibration and to compensate the movements of the device. For example, the system may perform contrast detection on image, and reject blurry images caused by vibration when the contrast is lower than a running average by a certain pre-set threshold. Other motion compensation techniques are also possible. The system may also detect feature points in the image, using general feature detectors such as Binary Robust Independent Elementary Features (BRIEF), to detect how the camera has moved between sibling images or with respect to the initial image over which the original court detection process was performed, and compensate for this movement with a homographic transformation so effects of the camera movement could be eliminated from the input image sequence, before the images are fed into the next stage.

At step 1030, the system may detect one or more shot attempts by tracking all balls in a dynamically-enlarged region of interest called a ball tracking ROI, the size of which is subject to the device's processing power, using another computer vision algorithm. Basketballs detected in the ball tracking ROI over successive frames of the captured video may be grouped into ball trajectories. Each ball trajectory may be independently tracked to identify a potential shot attempt. As the name implies, a shot attempt is the process or action of attempting to shoot or drive a ball into a goal, and the result of a shot attempt may or may not be successful. The ROI created during hoop detection at step 1020 may be divided into 9 zones, as discussed with reference to FIG. 18. When a ball trajectory enters then exits the ROI through various zones, a shot attempt may be detected through heuristics. For example, in some embodiments, the system may apply motion differential to the ball tracking ROI and corresponding moving objects, and identify the basketball based on extracted features from said moving objects. In various embodiments, machine learning methods may be used to learn one or more features relevant to the basketball, such as changes in size or color of the basketball depending on angle and light settings. For instance, statistics of the color of the basketball may be collected across varying angle and light settings. In some embodiments, the system may identify a ball trajectory as a shot attempt when the basketball is determined to be at a vertical location higher than the hoop in the ROI and which falls towards the court ground afterwards. Upon identification of a shot attempt, the system may progress directly to steps 1040 and/or 1050 to analyze the shot, or to an optional step 1035 for 3D ball trajectory construction.

At step 1030, frames may optionally be sampled to track players as well, where various techniques may be applied to track and identify players. One illustrative example is provided with reference to FIG. 22.

In an optional step 1035, the system may use the shot attempt's detected ball locations, changing ball sizes detected along its 2D ball trajectory in step 1030, and a projection matrix derived in step 1020 to construct a three dimensional (3D) ball trajectory. To compute the 3D ball trajectory, each detected ball's X, Y coordinates and width in the image may be transformed by the projected matrix into a 3D coordinate. All such 3D coordinates of balls in the shot attempt's ball trajectory may then be fed into a curve fitting algorithm such as RANSAC to fit a free-fall quadratic curve as the 3D ball trajectory. This fitted 3D ball trajectory may be used to discard a shot attempt if it is determined not having been thrown towards the goal or basketball hoop, and is further illustrated in FIGS. 20A to 20C.

In step 1040, the system may detect the result of a shot attempt by following the basketball trajectory and observe pixel changes near the basketball hoop net area, which may be referred to as yet another Region of Interest (ROI). One or more heuristic conditions may be applied to determine the result of the shot attempt. Using a background subtractor such as MOG, the system may detect whether the ball passes through a hoop net and determine the result of the attempt being made or missed, also referred to as a make/miss. Depending on whether the ball has bounced at the basketball hoop, a different threshold for detecting pixel changes inside basketball hoop net area may be used. Similarly, the threshold may be affected by whether the ball is clearly detected in a hoop net region to handle scenes in which the hoop net area is blurry, resulting in less pixel changes than other scenes. In some embodiments, the system may determine that the shot attempt was a "miss" when the basketball falls below or to the side of the hoop, yet the system does not detect sufficient movements in the basketball hoop net. In some embodiments, the system may determine that the shot attempt was not yet finished if the basketball hoop net did move, but the basketball bounces above the hoop based on the identified basketball trajectory. In some embodiments, the system may determine that the shot attempt was a "make" when sufficient or substantial basketball hoop net movements are present to conclude that the ball must have passed through the hoop rim based on its estimated trajectory even though the system cannot clearly detect the basketball since it has been occluded. In different embodiments, the 3D trajectories may or may not be used for determining the result of a shot attempt. In yet some embodiments, Step 1040 may reject an identified shot attempt as a false identification, if upon further analysis of the ball trajectory it is determined that the identified ball motion was not made towards the basketball hoop.

In step 1050, the system may track the shooter that made the identified shot attempt. In some embodiments, the system may refrain from real-time tracking of all players on the court to preserve computation power and reduce energy consumption. In some embodiments, once a shot attempt is detected, the system may backtrack the basketball trajectory during a time duration, such as the previous two or three seconds, to identify one or more potential shooters who may have made the shot attempt. In some embodiments, the recorded frames of this backtracking time duration may be down-sampled or down-scaled sparsely or significantly to optimize memory usage. The system may run the given time backtracking duration of frames in reverse order of time, and use MOG background subtraction and various image filters to detect one or more moving objects from the scene, including but not limited to one or more balls and/or one or more active players. To identify the ball from all moving objects detected by the MOG detector, the system may further examine information such as the 2D trajectory, including the size, position and shape of the contour. For example, the ball should travel to the top portion of the image during a shooting action.

Furthermore, to identify a potential shooter from all moving objects as detected by the MOG detector, the system may consider information such as size, position, and whether the bottom of the moving object is at a valid court position. When the system tracks back the ball to overlap with a potential shooter's bounding box, the system may skip another time duration such as 0.5 seconds of frames before identifying shooter location, because it is very likely that after 0.5 seconds the shooter's foot is landed on the ground instead of still being in the air. In some embodiments, the system may apply motion differential to another region of interest and a corresponding moving object, to identify the potential shooter based on extracted features from said moving object. In various embodiments, machine learning methods may be used to learn various features relevant to the basketball players. In some embodiments, the 3D ball trajectory in step 1035 may be used to estimate a region of the court where the shooter should be in for the shot attempt, again by backtracking the ball trajectory. With such methods, the system may estimate a rough location of the shot attempt even without accurately identifying the basketball player that attempted the shot attempt at this step. The system then progresses to step 1060 to determine the location of the shot attempt.

In step 1060, the system may determine a foot location of the basketball player who attempted the shot, prior to taking the shot or before the shot is taken. In some embodiments, the system may use real-time object detection methods such as Tiny YOLO to detect a bounding box of a potential shooter during a given number of time frames, such as between 0.5 to 0.7 seconds before the basketball comes into contact with this potential shooter, or between 0.5 to 1 second. In particular, the system may sample a number of frames, such as 3 frames, between 0.5 to 0.7 seconds before the ball comes in contact with the potential shooter, crop the full scene image with a ROI based on the potential shooter identified from MOG detector, then feed to Tiny YOLO (a CNN algorithm) to identify the foot position of the potential shooter. Images extracted from various shooting videos may be used to train Tiny YOLO to identify foot of a person. In further embodiments, the system may limit the analysis to three to four frames for the time of interest and use an average result to further preserve computation resources and lower power consumption. In some embodiments, heuristic information extracted from a player's feature profile may be used to identify the basketball player that attempted the shot attempt among multiple potential shooters. In some embodiments, historic shooting data such as a player's preferred shooting zones may be used to identify the basketball player who attempted the shot among multiple potential shooters. Sometimes multiple feet may be identified by Tiny YOLO, which could be from the rebounder or another player in the court of the scene. The system may use a scoring system to determine who is the most probable shooter. In various embodiments, the scoring system may use the following information to compute a score for each of the players identified from Tiny YOLO:

1. A 2D ball trajectory to bias against players who are not in a ball moving direction.
2. A 3D ball trajectory to bias against players who are not within a projected shooter region.
3. A distance between a ball and a top of a player bounding box, where a shorter distance returns a higher score.
4. A distance between a center of a player bounding box and a center of a cropped image, where a shorter the distance returns a higher score.
5. A historical shooting zone to bias for a player identified in the same or neighbor zone as previous shots.
6. Bias against a player identified in a paint area if the last shot was not in the paint area.

In some embodiments, one or more sampled frames for a chosen shooter in the shot attempt is passed to player tracking technology to associate the shooter to a player identity cluster.

At Step 1070, the system may combine the result of the shot attempt result from step 1040 and the shot and shooter foot location determined via Steps 1050 and 1060. In some embodiments, if the system detects multiple shooters, or a NEX system user manually identifies multiple shooters in the recording gameplay session, the system may perform a re-clustering of all player clusters identified by player tracking technique in consideration of the timeline of each cluster and numerical representation of visual features of the players in each cluster. Finally, the process ends at step 1080.

Figure 11:
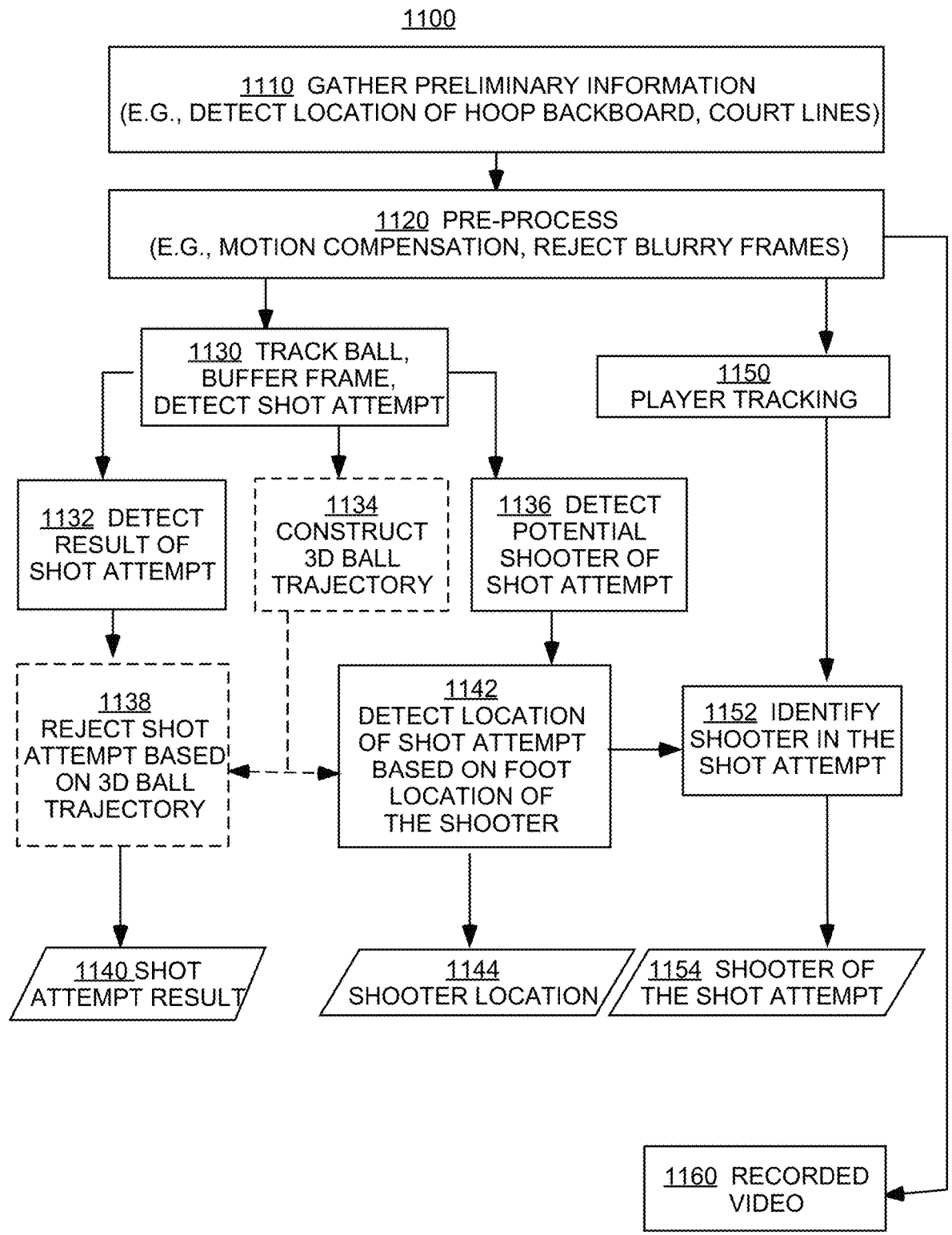
FIG. 11 is a flow diagram of another process for detection and analysis of basketball shot attempts, according to some embodiments of the present invention.

Similar to FIG. 10, FIG. 11 is a flow diagram 1100 of another process for detection and analysis of basketball shot attempts, according to some embodiments of the present invention. In particular, the embodiment illustrated by FIG. 11 optionally utilizes a 3D ball trajectory for rejecting shot attempts and detecting location of shot attempts based on foot locations of the shooter. Upon initialization, preliminary information is first collected via one or more computer vision algorithms at Step 1110. For example, various feature points of the hoop backboard and court lines may be identified to establish a visual framework for further use in shot attempt identification and analysis. Similar to Step 1025 in FIG. 10, at Step 1120 in FIG. 11, pre-processing of the input video recording may be performed, for example, to compensate for minor camera motions and to reject blurry image frames. In some embodiments, such pre-processed video may be provided as an output 1160 as shown in FIG. 11.

Next, steps 1130 and 1150 may be performed individually to track or backtrack, starting from a ROI surrounding the basketball hoop, the trajectory of a moving ball of interest and one or more players who may have made the shot attempt. While Steps 1130 and 1150 are shown as parallel process steps in FIG. 11, it would be understood by persons of ordinary skill in the art that they may be executed in parallel or in series, depending on specific NEX system implementations.

In Step 1130, a ball detected in a hoop ROI may be used as a starting point for backtracking its trajectory in air, by examining buffered image frames in a pre-determined time duration, such as two seconds, to identify whether the ball and its trajectory constitute a shot attempt. Result of the shot attempt may be identified or detected in Step 1132, using hardware modules and processes similar to that utilized by Step 1040 in FIG. 10. An optional 3D ball trajectory may be constructed in Step 1134, which in turn may be used to reject a shot attempt in Step 1138. The shot attempt result may be provided as an output 1140 to the overall process disclosed in FIG. 11, where exemplary shot attempt result may include a make or miss, or indication of an invalid shot attempt.

In parallel or subsequently, Step 1136 may be carried out to detect one or more potential shooters of the shot attempt, with a location of the shot attempted determined in Step 1142 based on a foot location of the identified shooter. The shot attempt location or shooter foot location may be provided as an output 1144 to the overall process disclosed in FIG. 11. With player cluster tracking performed in Step 1150 and shot location determined in Step 1142, the identity of the shooter who made the shot attempt may be determined in Step 1152, and provided as an output 1154 to the process disclosed in FIG. 11.

Figure 12:
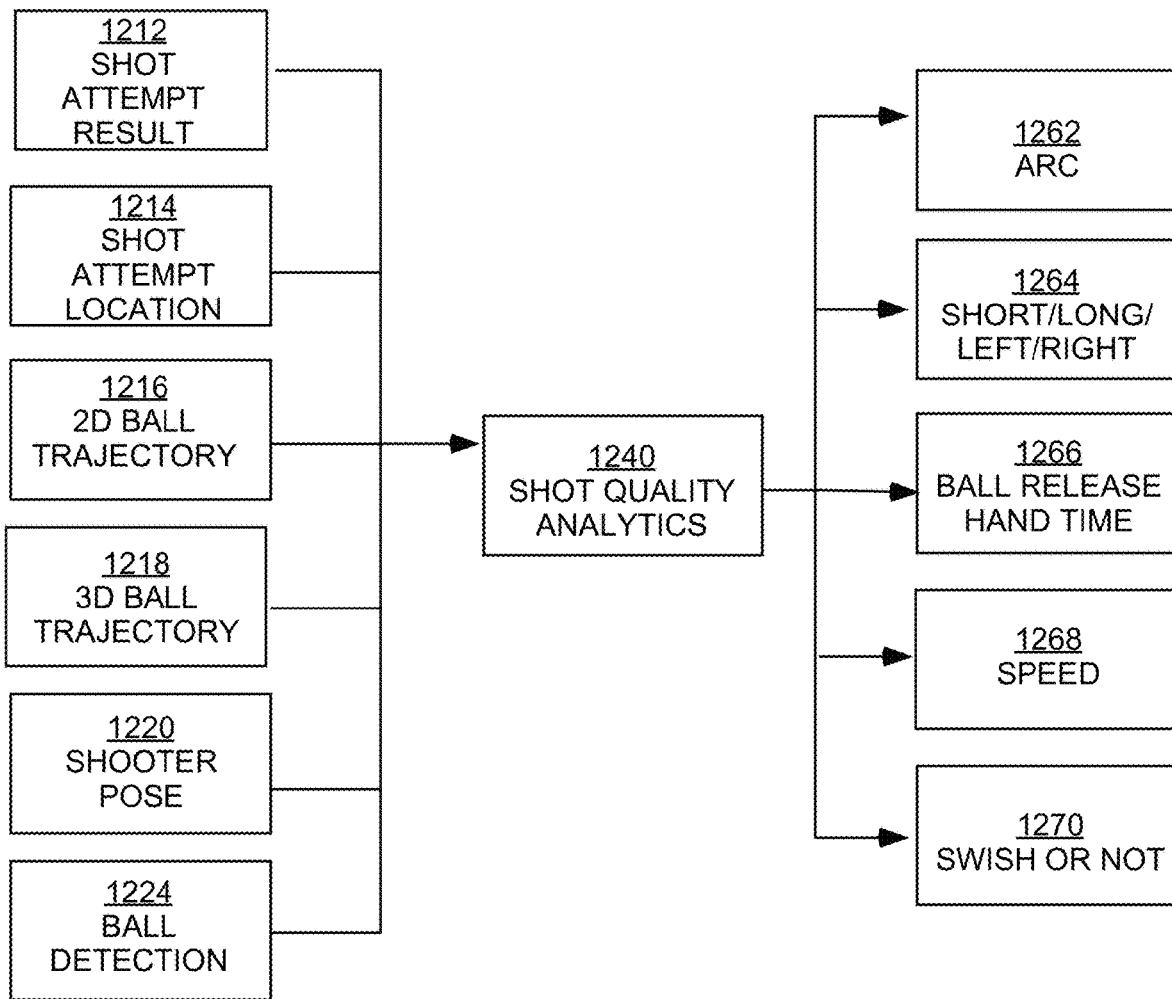
FIG. 12 is a flow diagram of a process for shot quality analysis, according to some embodiments of the present invention.

In addition to individual shot attempt detection and analysis, after each game or practice session, in some embodiments, shot quality analytic statistics and game analytics may be generated, using individual shot attempt information including 3D ball trajectories and 2D ball trajectories. FIG. 12 is a flow diagram of a process for shot quality analysis, according to some embodiments of the present invention. On the left of the diagram, various inputs for the analysis process are listed, including but not limited to, shot attempt result 1212, shot attempt location 1214, 2D ball trajectory 1216, 3D ball trajectory 1218, shooter pose 1220, and ball detection 1224. A shot quality analytics module 1240 may be implemented as part of the NEX system, on the same mobile device for video capturing or remotely on a processing server. On the right side of the diagram, exemplary shot analytics are listed, including but not limited to shot arc or ball arc 1262 (e.g., enter hoop angle, release hand angle), missed attempt reason or how a shot attempt has been missed (e.g. too short/long/left/right 1264, or is a rim rattler), shot or ball release hand time 1266, speed 1268, and swish or not 1270.

FIGS. 13 to 24 are illustrative flow diagrams and images showing exemplary embodiments to individual steps discussed in FIGS. 10 and 12. Although not indicated explicitly, some process steps represented in these figures may be optional, in different embodiments of the present invention. Similarly, each step in FIGS. 10 and 11 may be optional.

Figure 13:
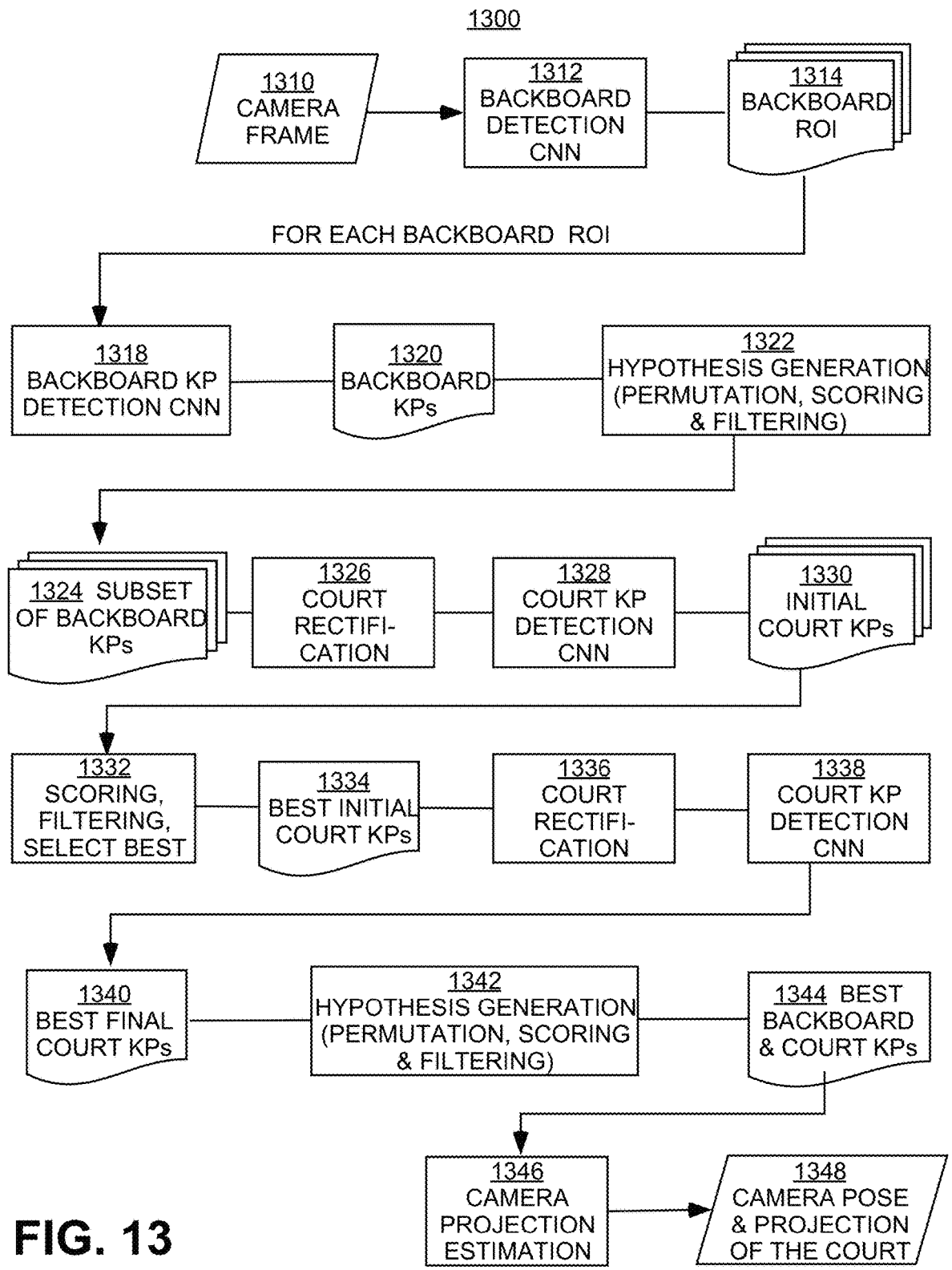
FIG. 13 is an illustrative diagram of a process for hoop and court line detection, according to some embodiments of the present invention.

FIG. 13 is an illustrative diagram of a process for hoop and court line detection, according to some embodiments of the present invention. This exemplary process flow discloses the use of multiple specialized convolutional neural networks (CNN) to detect the location of the hoop backboard and court lines by identifying key points (KPs) or key feature points within individual image frames of the input video.

More specifically, in this illustrative embodiment shown in FIG. 13, one or more input camera frames 1310 are first sent to a backboard detection CNN module 1312, which identifies a portion of each video frame likely to be surrounding a backboard region as a backboard Region of Interest (ROI) 1314. For each such backboard ROI, a backboard KP detection CNN module 1318 may be further applied to identify backboard KPs 1320. For example, as illustrated by FIG. 14B, five KPs indicating top left (TL), top right (TR), inner left (IL), inner right (IR), and a center of the hoop (CH) location may be identified as backboard KPs 1320. Note here process Step 1318 is also referred to as a backboard KP detection CNN module, which is an implementation of the process step. In this disclosure, process steps and its implementation may be used interchangeably.

Next, one or more hypotheses are generated for testing in Step 1322. For example, all subset combinations of the identified KPs may be considered under some constraints, where an exemplary set of constraints be the following, where variables m, p, n, q, and r are integers:
1. m backboard key points, m>p, for some p>=2;
2. n backboard key points, n>q, for some q>=1;
3. m+n>r, for some r>=4.

For each combination of the KPs, a camera projection may be estimated, to calculate the sum of confidence values of all KPs in the combination, to determine a re-projection error of each KP in each source combination, and to find any errors in the vertical direction indicated by the estimated camera projection from a vertical direction as measured by the camera's inertia measurement unit (IMU). From these, the hypotheses may be scored and filtered and rejected by one or more thresholds, and remaining hypotheses ranked using some objective function that put hypotheses with the best internal consistency and highest overall confidence on top. The result of the hypothesis generation and testing step 1322 is a subset 1324 of the backboard KPs 1320.

Next, court detection may be carried out similar to backboard detection. At step 1326, court rectification is performed, so that court lines as shown in FIG. 14A are rectified into a perspective such as shown in FIG. 14C. Specifically, court rectification refers to the process of determining camera pose and projection of the court, in terms of a linear transform having a projection matrix, and is performed for determining and displaying shot attempt locations as an analysis result. A court KP detection CNN module 1328 may be used to identify court KPs, such as the four top left (TL), top right (TR), bottom left (BL), and bottom right (BR) KPs in FIG. 14C. This initial set of court KPs 1330 may be passed to a module 1332 for scoring, filtering, and selection of one or more best initial court KPs 1334 with high confidence values. Court rectification and KP detection may be applied again on the selected subsets at Steps 1336 and 1338, providing one or more best final court KPs 1340 for hypothesis generation and testing in Step 1342. Collectively, the best backboard and court KPs 1344 may be used for camera projection estimation in Step 1346, where camera pose and an accurate projection of the court 1348 are provided as an output to the overall process shown in FIG. 13.

FIGS. 14A to 14C are corresponding images for backboard and court detection, according to some embodiments of the present invention. FIG. 14A is an illustrative camera frame 1400 for region of interest (ROI) identification; FIG. 14B is an illustrative backboard ROI 1420 with detected backboard key points (KPs); FIG. 14C is an illustrative rectified court 1460 with detected court KPs. For each detected KP illustrated in FIGS. 14B and 14C, a confidence value is provided on the accuracy of the estimation. Such confidence values are passed together with the estimated KP locations to the CNNs shown in FIG. 13 for hypothesis testing. While there are 9 total KPs shown in FIGS. 14B and 14C, in some embodiments, fewer number of KPs may be needed for generating the desired projection matrix. Thus, as illustrated in FIG. 13, multiple passes through the CNNs and hypothesis testing steps may be carried out to iteratively determine one or more best subjects of the KPs.

FIG. 15 is an illustrative screen capture 1500 showing several identified ROIs, according to some embodiments of the present invention. While FIG. 14B illustrates a backboard ROI encompassing a whole basketball backboard, three different ROIs are shown in FIG. 15, respectively, for hoop detection, shot attempt detection, and ball tracking. In some embodiments, shot attempt ROI 1520 may be referred to as the backboard ROI. As the name implies, hoop ROI 1530 encloses the basketball hoop, and ball tracking ROI 1510 encloses a larger area including the backboard ROI for tracking the movement of a ball around the backboard. In different embodiments of the present invention, the size of each ROI may depend on the available processing power, where a larger ROI is utilized when more computation resources are available. The use of ROIs limits the computer vision and image recognition processes to only portions of the video that are highly relevant to shot attempt detections.

FIG. 16 is a flow diagram 1600 of a process for ball tracking, frame buffering, and initial shot attempt detection, according to some embodiments of the present invention. In this illustrative example where tracking may be viewed as performed in the forward direction, given input video frames 1610, one or more balls may be first detected in Step 1620, using one or more computer vision algorithms such as background subtraction, color histogram matching, convolutional neural networks and the like may be applied for ball detection. In Step 1624, one or more 2D ball trajectories may be identified by following the motion of the detected balls in air. A detected ball may be assigned to an on-going 2D trajectory if the ball is close enough to an expected "next ball" location of the ball trajectory. If none of on-going 2D ball trajectories matches a detected ball, a new 2D ball trajectory may be created and the detected ball may be assigned to the new 2D trajectory. In Step 1628, a shot attempt for a newly detected ball's trajectory may be determined, detected, or declared if one or more conditions are satisfied by the trajectory. For example, if any downward motion in the upper regions of a shot attempt ROI is detected, a shot attempt may be declared. The declared initial shot attempts 1640, including corresponding ball trajectories, may then be passed together with buffered frames 1626 to the process shown in FIG. 17.

FIG. 17 is a flow diagram 1700 of a process for shot attempt result determination, according to some embodiments of the present invention. An input declared shot attempt 1710 may include positions of a newly detected ball in a shot attempt ROI, and its corresponding 2D ball trajectory. In Step 1720, the NEX system may determine whether movement in a hoop region is to be measured. If the ball is detected in a non-hoop region, movement in the hoop's region does not need to be considered. Here hoop movement refers to the movement of the basketball hoop and net, which when present may indicate contact of the ball with the hoop, either in a make or miss shot action. In Step 1730, hoop movement threshold may be adjusted, depending on scene and previously ball movement if needed. In Step 1740, movement in hoop region or hoop movement may be detected, using computer vision algorithms such as background subtraction, CNN, and the like. At step 1750, a shot attempt result may be decided, taking into account the detected hoop movement, if the ball is detected in the bottom regions of a shot attempt ROI or when the ball trajectory is finished. The shot attempt result is then provided as an output 1760.

FIG. 18 is a diagram 1800 illustrating ROIs for shot attempt detection, according to some embodiments of the present invention. In this illustrative example, a shot attempt ROI 1810 enclosing backboard 1805 is divided into 9 different regions, with division lines 1820, 1822, 1824, and 1826 bounding the detected hoop inside hoop ROI 1830, where the top horizontal division line 1820 is positioned slightly below a top boundary of the detected hoop. By tracking the movement of the ball throughout this shot attempt ROI, in and out individual regions, and/or by optionally analyzing hoop net movements, the embodiment of the present invention allow accurate classification of a shot attempt as a make, a miss, or as having other characteristics.

FIG. 19 is a flow diagram 1900 of a process for constructing a 3D ball trajectory, according to some embodiments of the present invention. Correspondingly, FIGS. 20A, 20B, and 20C are respective diagrams showing different views of a 3D ball trajectory, according to some embodiments of the present invention.

Note that the detected size of a ball becomes smaller as it travels further away from the camera. Thus, the size of the ball may be viewed as providing depth information, and positions of the ball in the captured video may be used to calculate where the ball should be in 3D space. Together with identified 2D coordinates, such depth information may be used for projection onto 3D coordinates. With input 1910 including 2D ball trajectory and calculated projection matrix, in Step 1920, the NEX system may calculate ball location in 3D coordinates for each ball in the 2D ball trajectory by applying the projection matrix to each ball's (X, Y, size) coordinates in 2D image space. Curve fitting may then be performed in Step 1930. For example, a free-fall, parabolic, quadratic curve may be fitted with the 3D ball coordinates to generates an output 3D ball trajectory 1960. Some information, such as the depth of a ball, may be less accurate than others, such as the (X, Y) coordinates. The process shown in FIG. 17 may be tuned to accommodate the precision of each parameter in curve fitting to get better results.

Figure 20A:
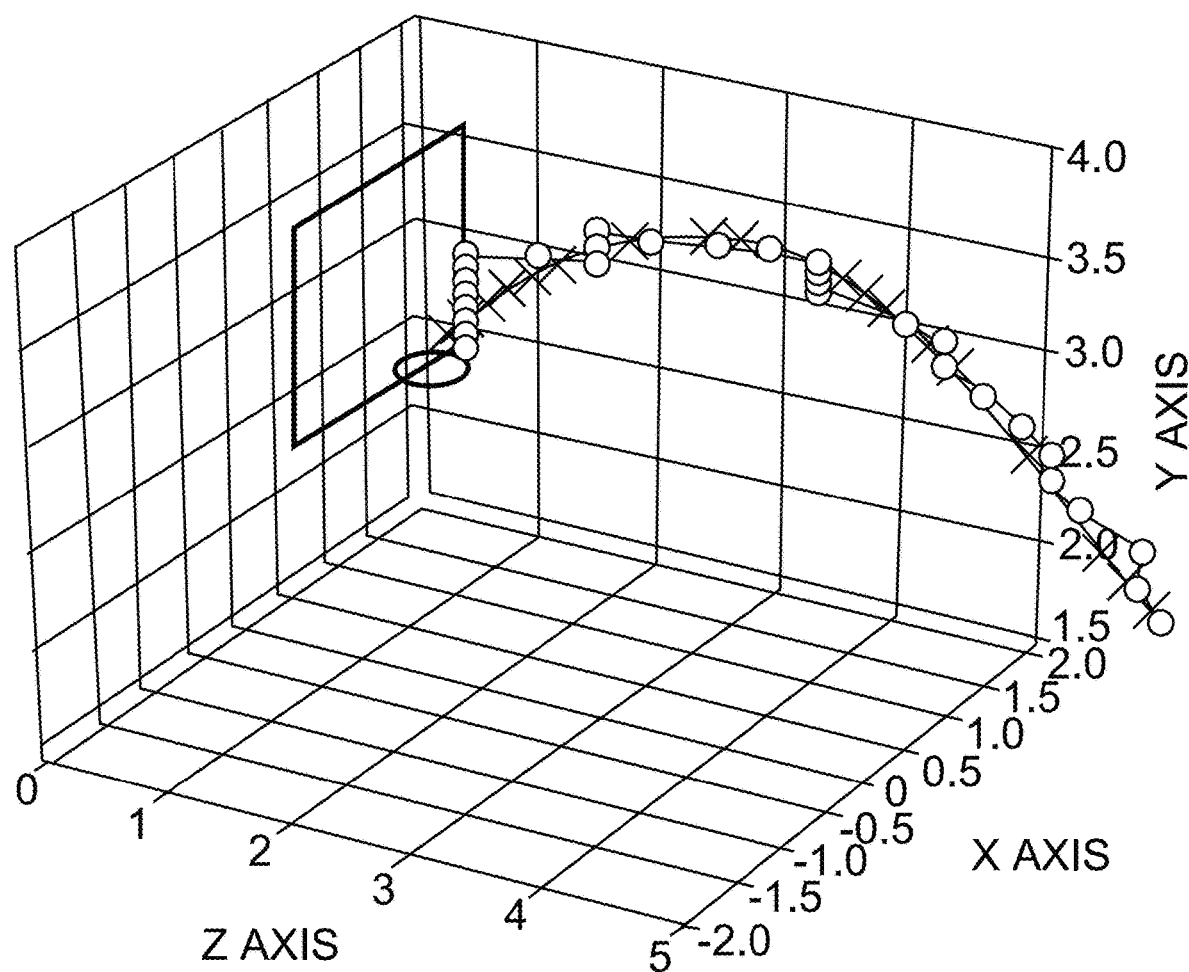
FIGS. 20A, 20B, and 20C are respective diagrams showing different views of a 3D ball trajectory, according to some embodiments of the present invention.
Figure 20B:
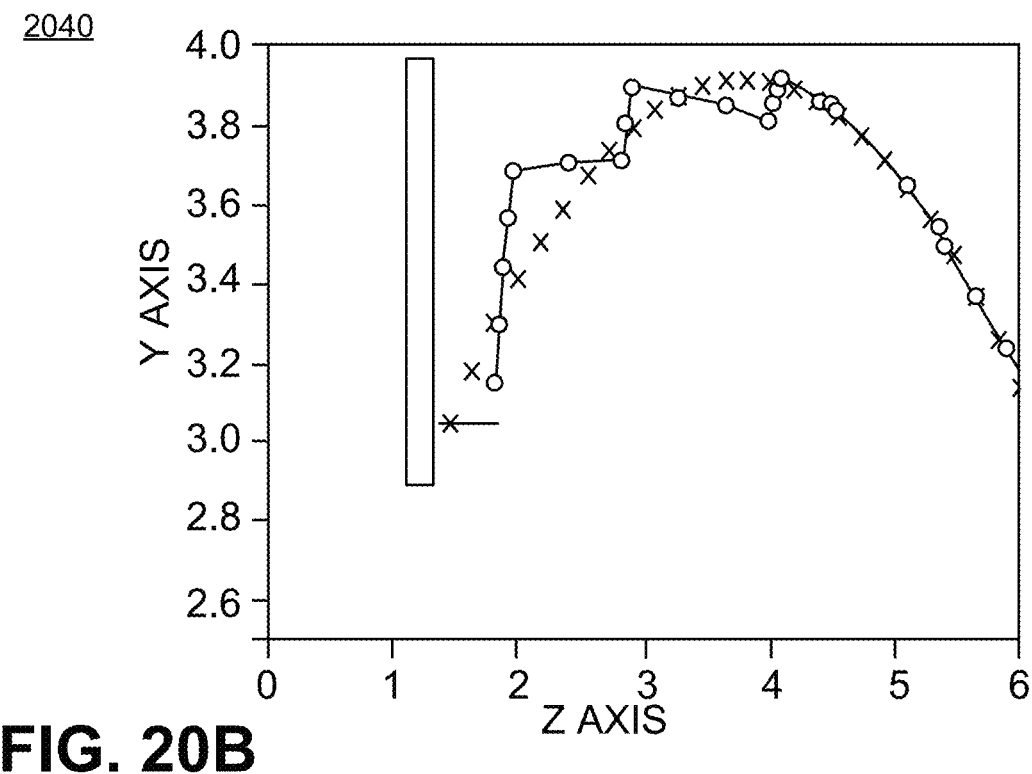
Figure 20C:
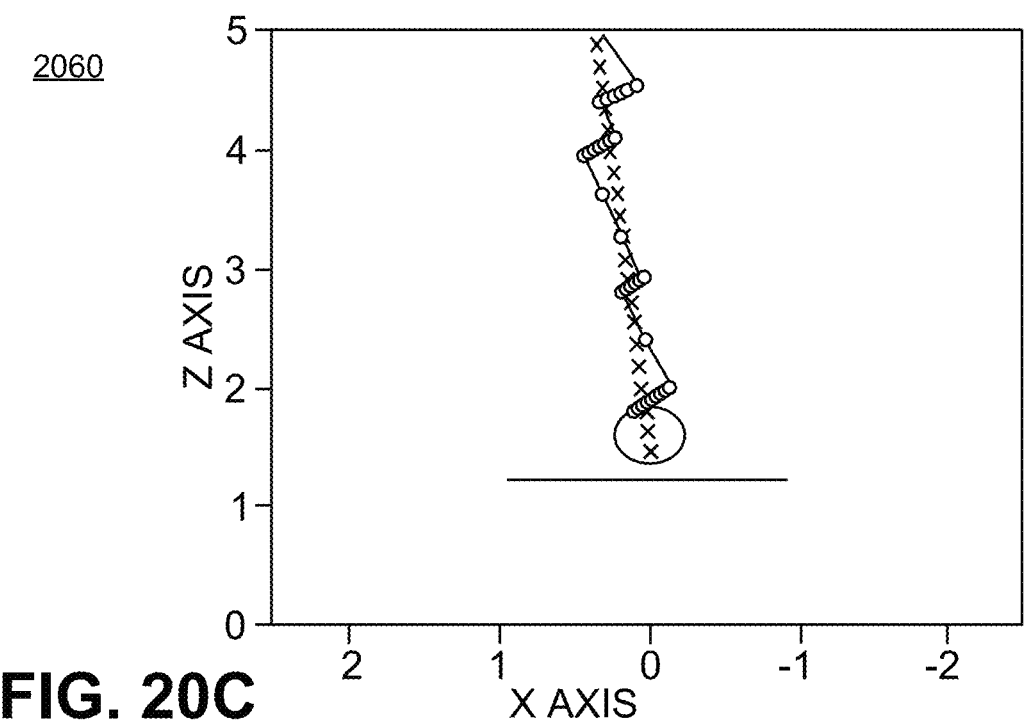

Illustrative 3D coordinates are shown as circular dots in FIG. 20A as an example. Again, as the ball travels further away from the camera, its width or size becomes very narrow or small. Therefore, when projected into 3D space, the estimates become less accurate, and the circular dots shown are "jittery" in nature. As a further refinement, a parabolic curve may be fitted to estimate the 3D trajectory of the ball, which is shown with crosses in FIG. 20A. Two different side and top perspective views of the 3D trajectory are shown respectively in FIGS. 20B and 20C, illustrating the data points and the fitted 3D trajectory relative to the backboard. The use of 3D trajectories is advantageous. 3D trajectories may be used to distinguish shot attempt and passing by whether the ball is moving towards the hoop. In addition, 3D trajectories may be used to assist in the determination of shooter identities: a 3D trajectory may provide an estimated region of shooter location using backward tracking.

Figure 21:
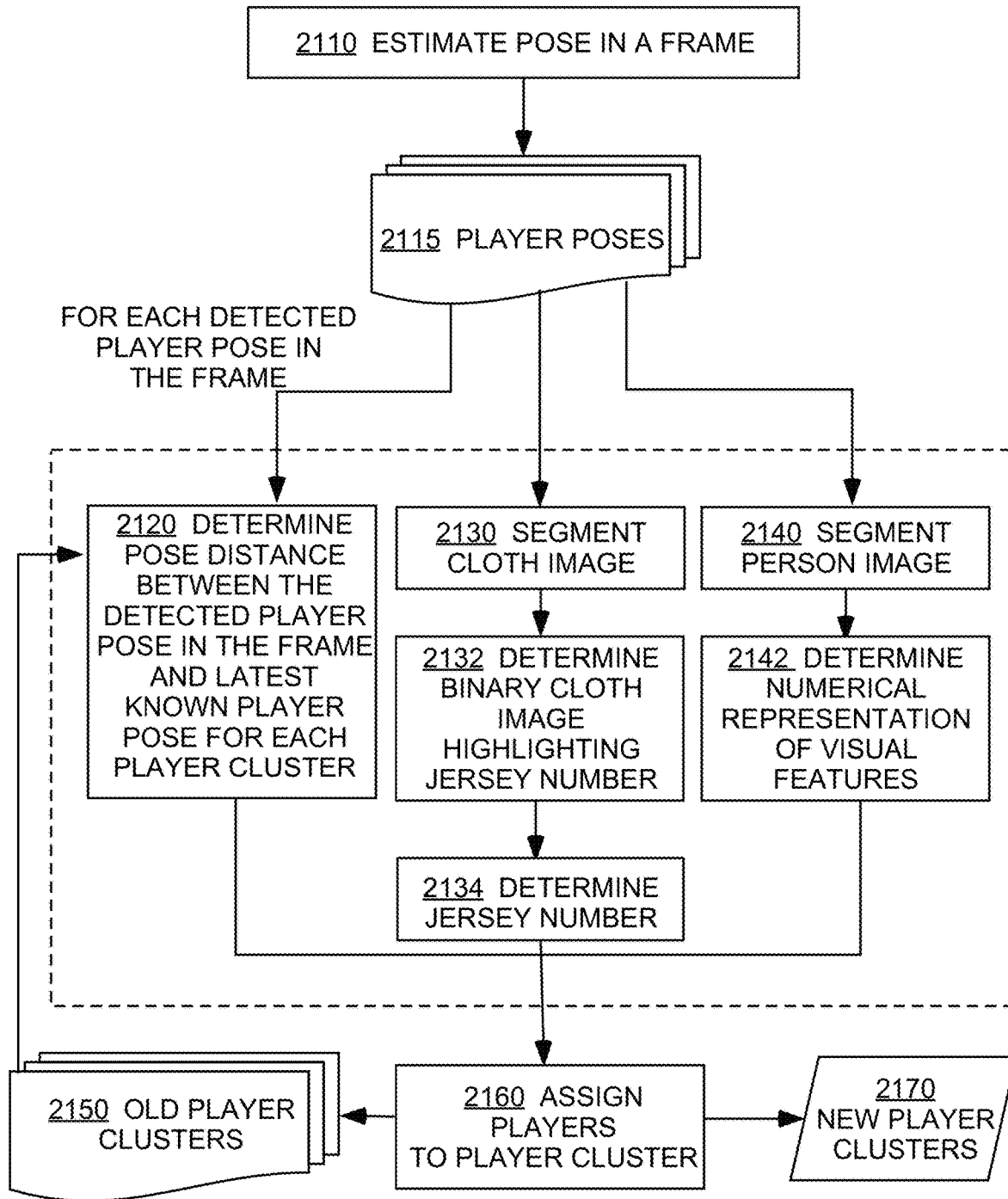
FIG. 21 is a flow diagram of a process for player tracking, according to some embodiments of the present invention.

FIG. 21 is a flow diagram 2100 of a process for player tracking, according to some embodiments of the present invention. Correspondingly, FIG. 22 is a diagram 2200 showing exemplary player clusters for player identification and tracking. When more than one player is present, the player tracking process may be viewed as an image classification process, where individual images 2220 of players cropped from individual video frames are correlated and assigned to different "player clusters" 2240 and 2260. Such correlation may be conducted over various visual features including but not limited to pose, clothing (e.g., color, jersey number), and facial features. As the name "tracking" implies, this classification process is performed on individual frames, and is cumulative, where a newly identified player image or numerical representation may be assigned to and update an existing player cluster. In some embodiments, player identification/classification is not performed every frame, but rather, for example, every other frame or every 3 to 5 frames. Such temporal down-sampling allows a reduction in computation complexity. In addition, spatial down-sampling is also possible, where a frame may be down-sized or down-sampled first.

More specifically, tracking players involves clustering players detected in different sampled frames into groups. All players in the same group may be considered as having the same player identity. Deciding whether to group a detected player A in a latest sampled frame into a cluster C or create a new cluster may depend on one or more of the following factors:

1. Distance (may be aggregated/weighted, e.g., hand/leg) between a player in the latest frame in a cluster C (Cluster C player) and player A. Each cluster refers to a possible player. (e.g., Frame 1: Players A and B, Frame 2: may be Players A and B, may be B and C). FORWARD: group players together if very confident.
2. Similarity in terms of visual features (e.g., hair, facial feature, the look of the player) of player A and visual features of players in cluster C. Neural networks that understand the visual look of people may be used. Machine Learning (ML) network may be used to extract the features of a player, to represent it numerically, for example, as a vector of 1000 numbers. This numerical representation may be used to identify the difference (some norm).
3. Jersey number of player A and players in cluster C.

In some embodiments, the NEX system may first estimate pose in a sampled frame by applying a special mobile device-optimized pose estimation convolutional neural network to detect all players' pose 2115 in the sampled frame. For each detected player pose in the frame, at step 2120, a pose distance may be determined between the detected player pose in the sampled frame and latest known player pose for each player cluster. A distance between cluster C player and player A may be computed by weighting an average of distance between each body part of cluster C player and player A. In some embodiments, if the computed distance is larger than a threshold, player A may not be added to cluster C. In some embodiments, if any body part moves significantly more than the other body parts, player A may not be added to cluster C.

To extract visual features of a player for comparison, detected pose of each player may be used to segment the player from the image in step 2140. In Step 2142, the segmented player image may be passed to a specially trained convolutional neural network to extract a numerical representation of visual features of the player in the form of vector of floating point numbers. Similarity of visual feature of the two players is computed by numerical technique such as an L2 norm distance of the two vectors. In some embodiments, similarity of visual features of the player A and players in the cluster C may be ranked against other clusters to determine which cluster player A should be added to. If the similarity is too low, a new cluster may be created for player A.

While individual players on the court may be continuously recognized during a live game play, and corresponding shot attempts made by the players may be detected as well, in some embodiments, player identification may be performed at the end of a given session or the end of a video recording. Correspondingly, individual shot or game statistics are computed after player identification.

In Step 2130, to detect jersey number of each player, the NEX system may extract a segmented cloth image of the player based on detected pose of the player. Statistical clustering techniques like K-means or more advanced techniques like GrabCut may be adopted to segment foreground and background of the player's cloth to produce a binary representation of cloth image highlighting the jersey number in Step 2132. Geometry transformation may then be applied to the binary image to make the jersey number upright. A geometric analysis may then be applied to split multiple numbers on cloth into individual numbers. Each such binary image containing one number may be passed to a number recognition convolutional neural network to extract the jersey number in Step 2134. If player A has the same jersey number as players in cluster C, player A has a higher chance of being added to cluster C.

To accommodate limited computational power of mobile devices, frames may be sampled and downsized and may be sent to the cloud to perform all or some of the aforementioned techniques to assist player tracking.

While steps 2120, 2130 and 2140 are states as parallel processes in FIG. 21, they may be performed in parallel or in sequence, depending on specific implementation details of the NEX system.

Once pose distance, jersey number, and numerical representation of visual features are identified, players may be assigned to player clusters in Step 2160, where old player clusters 2150 may be reprocessed or updated, and new player clusters 2170 may be generated.

In addition to automatic player image clustering, in some embodiments, the NEX system may allow prior player name and/or feature input for one or more players to assist the clustering process. In some embodiments, manual tagging of a sampled set of player images may be allowed to improve clustering accuracy. An illustrative implementation is discussed with reference to FIGS. 32 to 34.

Figure 23:
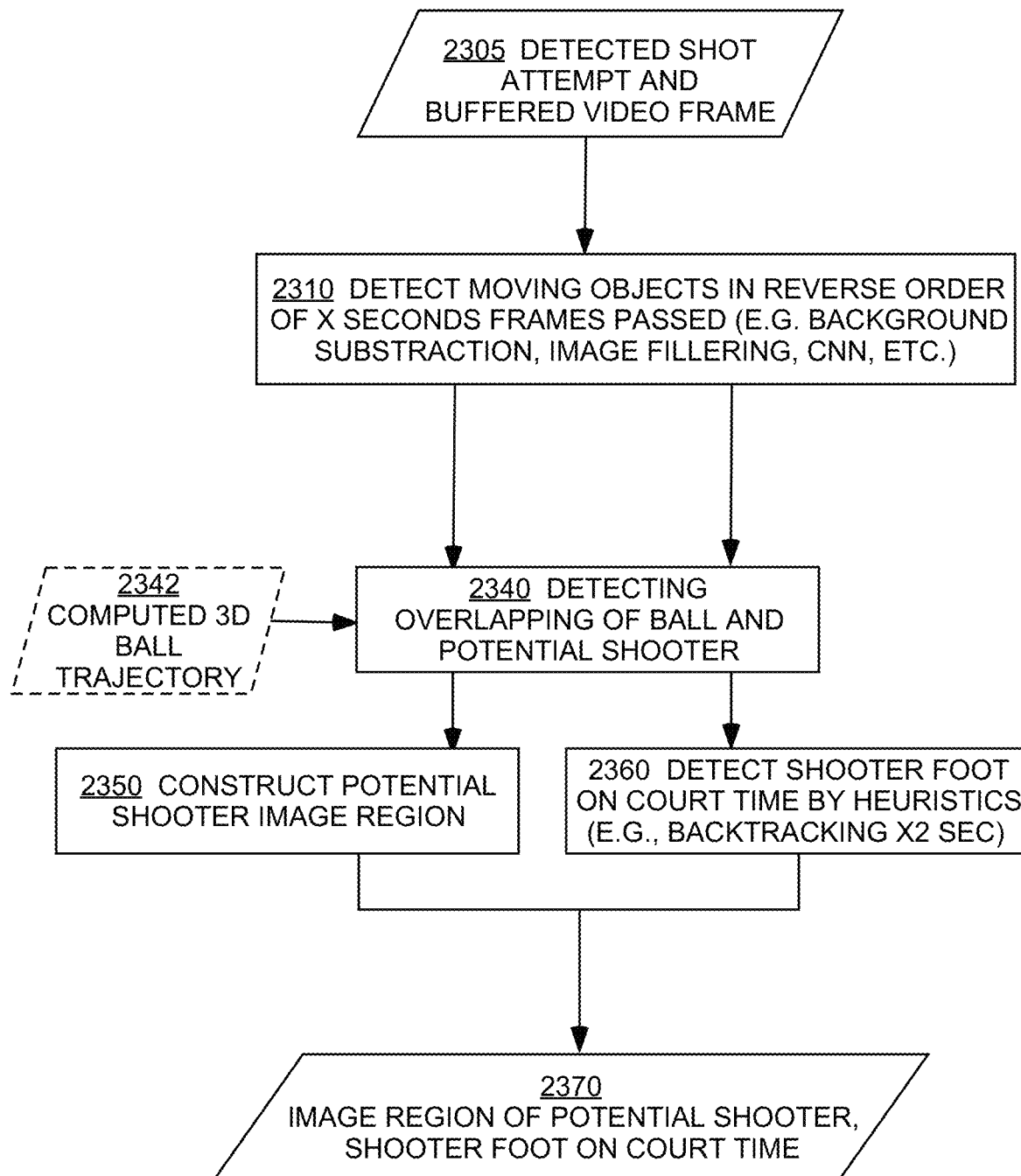
FIG. 23 is a flow diagram of a process for detecting potential shooters and shot attempt, according to some embodiments of the present invention.

FIG. 23 is a flow diagram 2300 of a process for detecting potential shooters and shot attempt, according to some embodiments of the present invention. Instead of forward processing, detecting the shooter and its foot location may require frame buffering and a "backtracking" process, possibly using the 3D trajectory computed previously. In addition, when more than one player is present, 2D and 3D trajectories as estimated previously may be used to differentiate the different players.

More specifically, triggered by a detected shot attempt and using one or more buffered video frames as input 2305, in Step 2310, moving objects such as one or more balls may be detected in reverse order of X seconds frames passed, using computer vision techniques such as background subtraction, image filtering, CNN, and the like. Next at Step 2340, overlapping regions of ball and potential shooter is detected, again using computer vision techniques such as background subtraction, image filtering, CNN, and the like. An optional computed 3D ball trajectory 2342 may be used as input for this process step. At Step 2350, a potential shooter image region is constructed, while at step 2360, shooter foot location on the court may be detected by using heuristics. For example, the buffered video frames may be backtracked for X2 seconds, where X2 may equal to 0.5, 1 or some other appropriate number. Further backtracking of the video frames may also be performed to detect the shooter by a CNN, and pick the image where the foot location becomes more stable vertically. The image region of the potential shooter and the shooter foot on court time may be provided as output 2370.

Figure 24:
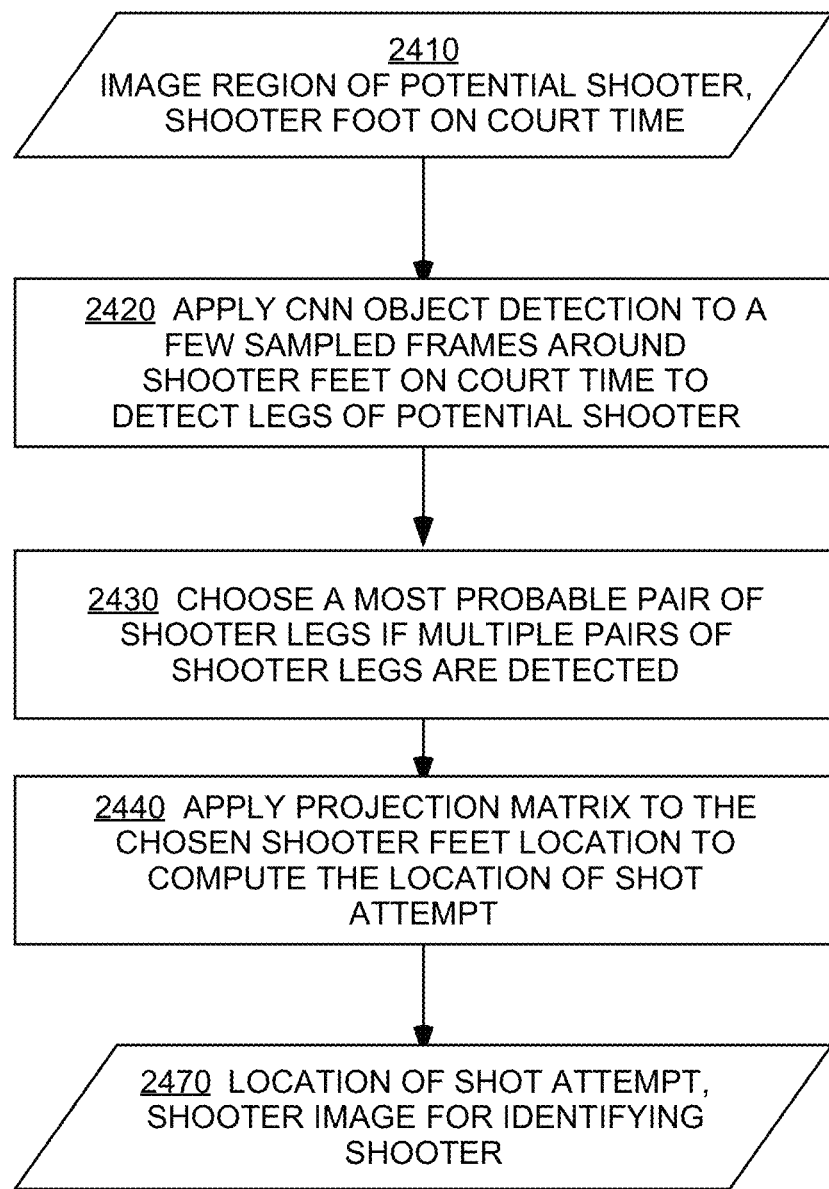
FIG. 24 is a flow diagram of a process for detecting location of a shot attempt based on foot location of a shooter, according to some embodiments of the present invention.

FIG. 24 is a flow diagram 2400 of a process for detecting location of a shot attempt based on foot location of a shooter, according to some embodiments of the present invention. The image region of the potential shooter and shooter foot on court time may be used as input 2410.

At Step 2420, a CNN object detection may be applied to a few sampled frames around the shooter's feet on court time to detect legs of potential shooter. At step 2430, a most probable pair of shooter legs is chosen if multiple pairs of shooter legs are detected. In some embodiments, detected legs may be scored based on one or more of the following factors: a 2D ball trajectory to bias against players who are not in the ball moving direction; a 3D ball trajectory to bias against players who are not within the projected shooter region; a distance between the ball and the top of the player bound, where a shorter distance returns a higher score; a distance between the center of the player bound and center of the cropped image, where a shorter distance returns a higher score; a historical shooting zone to bias for a player identified in the same or neighbor zone as the previous shots; bias against a player identified in the paint area if the last shot was not in the paint area. Next, in Step 2440, the projection matrix as previously computed may be applied to the chosen shooter feet location to compute the location of the shot attempt. Both the identified shot attempt location and the shooter image for identifying the shooter may then be provided as output 2470.

As another example, FIGS. 25 to 29 provide a sequence of exemplary screen captures for the overall game analytics generation process.

Figure 25:
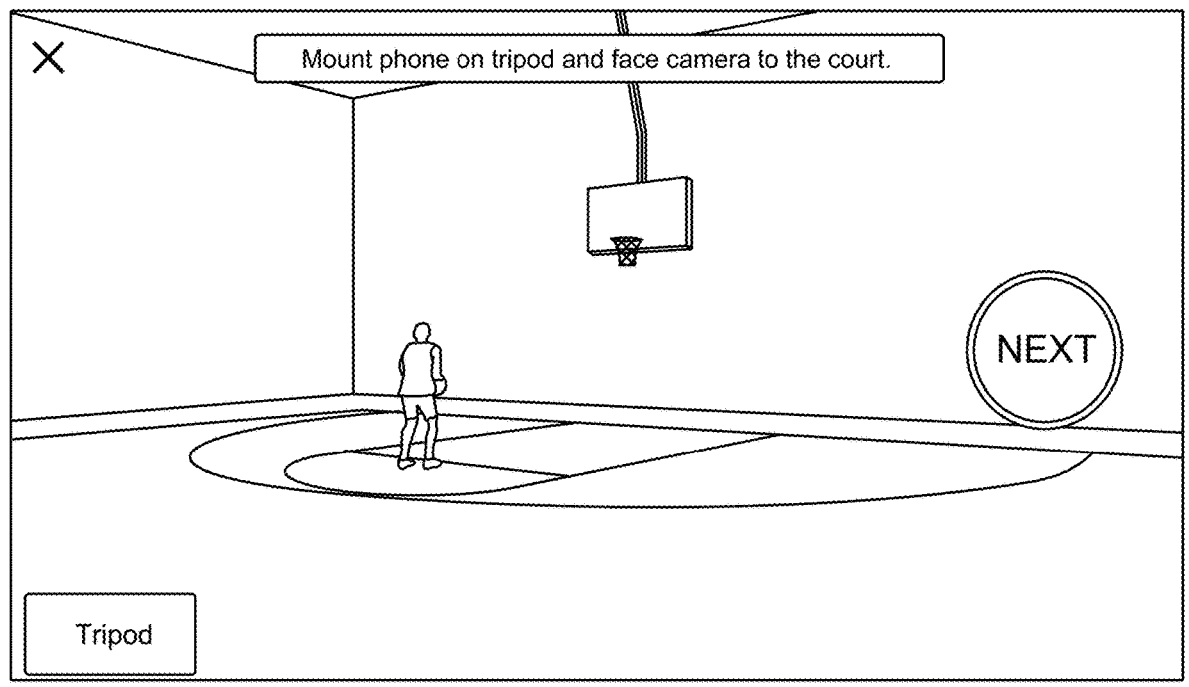
FIG. 25 is a screen capture of the basketball analytics system upon initialization, according to some embodiments of the present invention.
Figure 26:
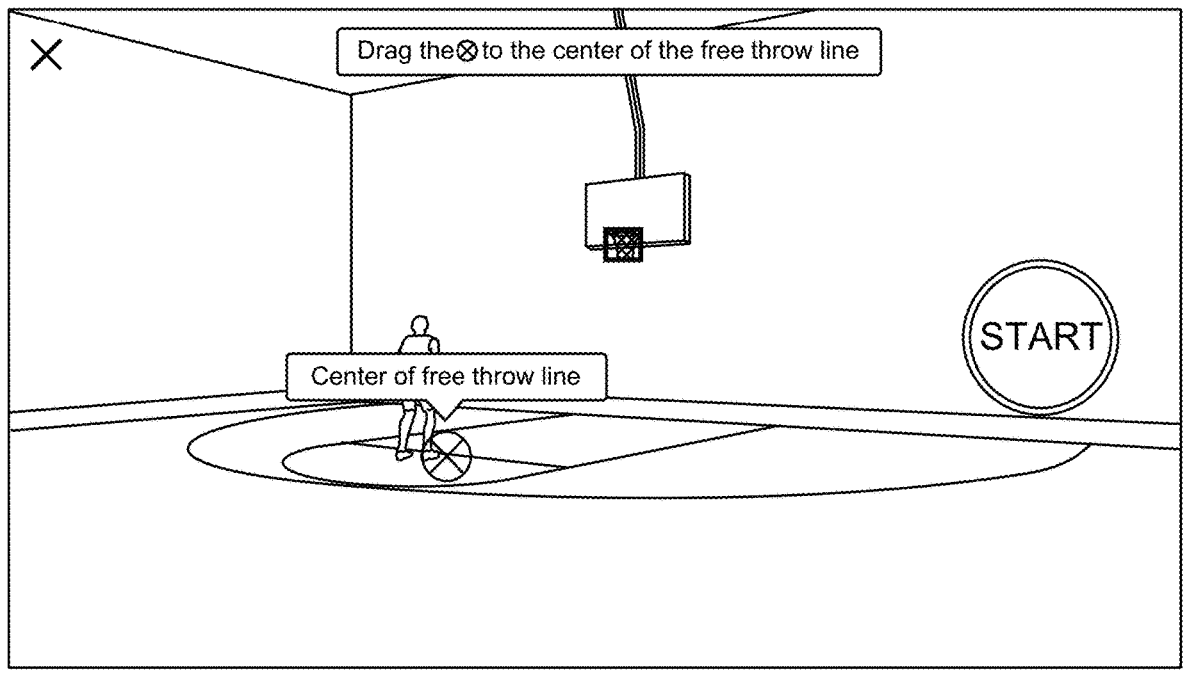
FIG. 26 is another screen capture of the basketball analytics system upon initialization, according to some embodiments of the present invention.

FIGS. 25 and 26 are two screen captures of the basketball analytics system upon initialization, respectively, according to some embodiments of the present invention. In FIG. 25, an instruction is provided to the user to stabilize and locate the camera on a tripod. In FIG. 26, the system not only automatically locates court lines and positions such as the center of the free throw line and the hoop, but also provides the option of having the user identify or verify these locations visually and adjust if necessary.

Figure 27:
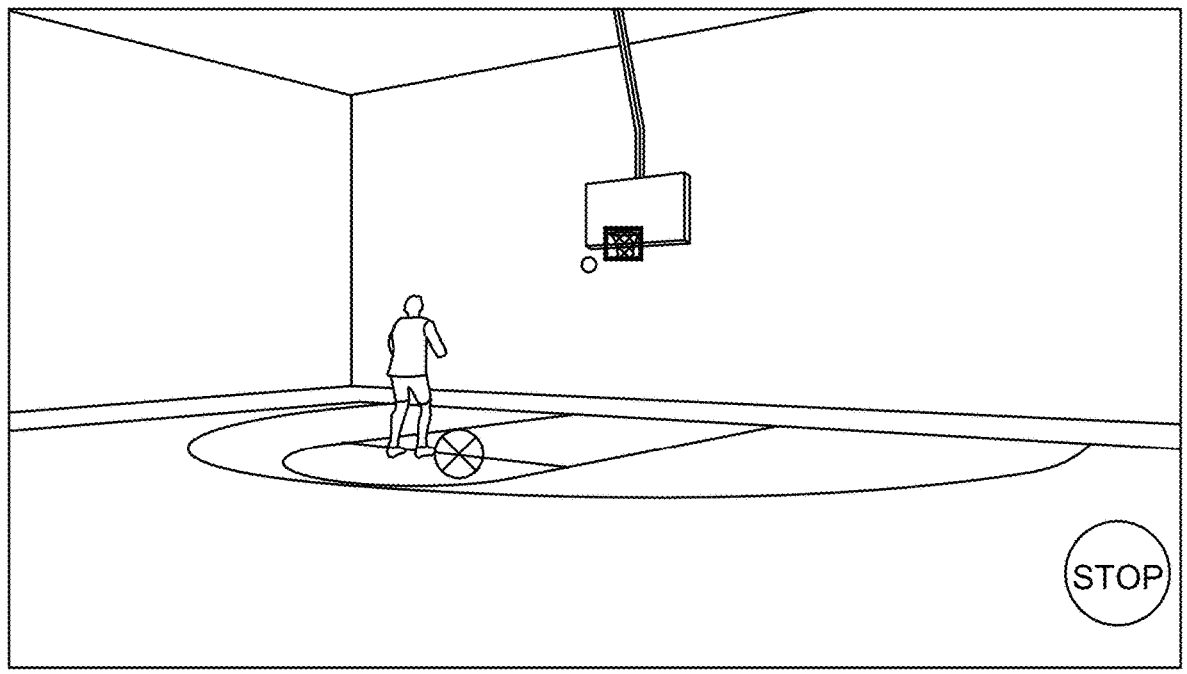
FIG. 27 is a screen capture of a real-time recording of a successful shot attempt, according to some embodiments of the present invention.

FIG. 27 is a screen capture of a real-time recording of a successful shot attempt, according to some embodiments of the present invention. In this example, the shot attempt has been identified through the processes discussed with reference to FIGS. 10 to 24. Although not shown explicitly, in some embodiments, the successful shot attempt result may be indicated or displayed on screen as well. In addition, a "stop" button is provided for the user to terminate the current recording session. In some embodiments, other options may be provided to pause the recording session, to reinitialize the court and hoop detection process, or to continue the recording process but display game statistics instead of game recordings on the screen.

Figure 28:
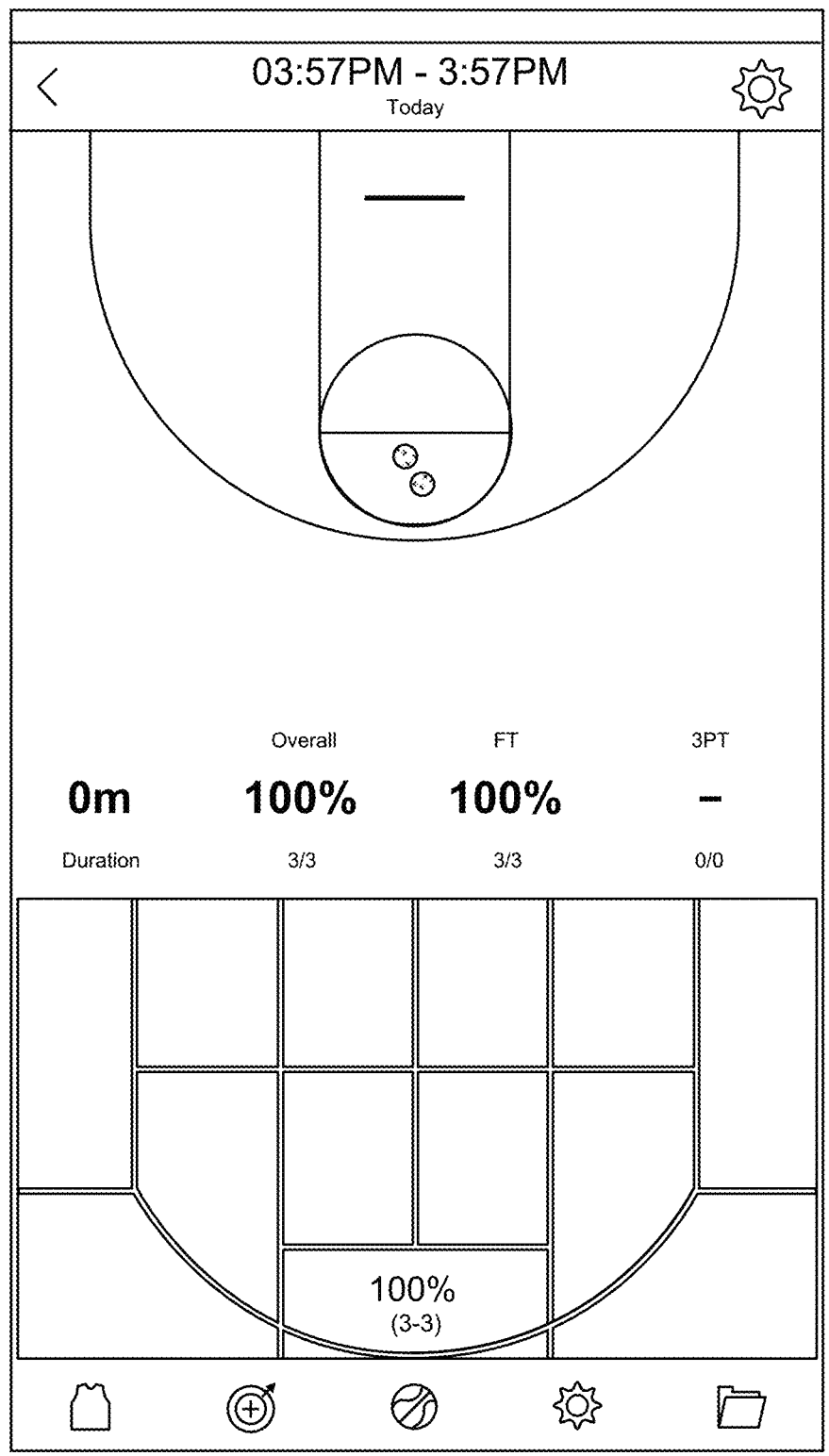
FIG. 28 is a screen capture of a result chart for the game shown in FIG. 24, according to some embodiments of the present invention.
Figure 29:
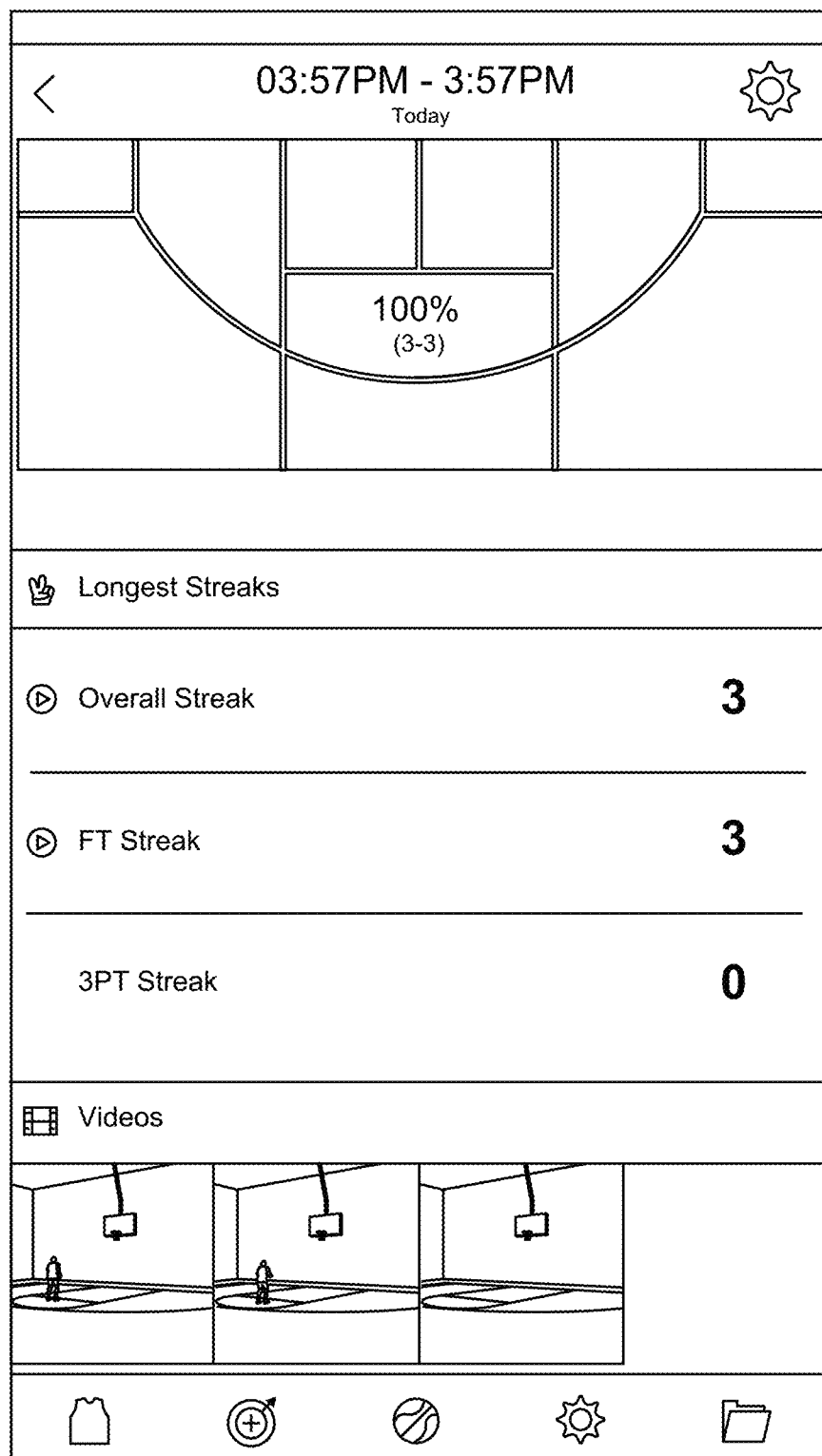
FIG. 29 is a table of game statistics for the game shown in FIG. 24, according to some embodiments of the present invention.

FIGS. 28 and 29 are screen captures of a result chart and statistics for the game shown in FIG. 24, respectively, after three successful shots have been made from the center of the free throw line, according to some embodiments of the present invention. Individual per-shot video clips may be selected on the screen shown in FIG. 29 for further review by the user.

User Tagging for Player Image Clustering

As another exemplary embodiment of the present invention, FIGS. 30 to 32 illustrate a process and associated screenshots from a device for manual tagging of a sampled set or subset of player images, which may help improve the accuracy of player image clustering, for example, when multiple players are present in a gaming area such as a ball court.

FIG. 30 is an illustrative diagram of a process for player clustering by multiplayer tagging, according to some embodiments of the present invention.

For a given game, each player-related game event such as a ball shot can be associated with at least one player. As noted, while certain embodiments below are describe a ball game such as basketball, one of ordinary skill in the art will recognize that the embodiments below can be adapted for other games and activities in which users (e.g., players) are participating. As used herein, player recognition and/or player detection can refer to the process of determining the presence of one or more players in a video frame, as well as determining one or more player locations in the video frame based on, for example, respective player bounding boxes.

In the field of object detection, a bounding box can refer to a rectangular box that can be generated via a computer-based algorithm (e.g., via a machine learning algorithm) and that at least substantially visually borders, encloses and/or confines predetermined parts or features of one or more objects. It is understood that other regions (e.g., circular, polygonal, irregular, etc.) other than boxes can also be used for player recognition and/or detection as described herein. A bounding box can, in some respects, define a spatial range of pixels (or other components that make up the representation of the object) associated with the object within the image plane of the video frame. The bounding box can further provide a reduced search space for determining object features while conserving computing resources, since a computer algorithm implementing a function such as object analysis can focus the analysis within the bounding box region rather than on a larger space. For example, a computer algorithm, such as a convolutional neural network, can be performed more computationally efficiently by bounding a feature search space by significantly limiting the number of times that convolution computations with a given kernel are performed. As used herein in the context of neural networks, a kernel can refer to a computational filter that can be used to detect features, for example, from an image.

First, a reference is made to some previously described figures in order to provide additional context for the embodiments described herein. As discussed with reference to FIG. 21, in this disclosure, an image of a single player within a bounding box or a particular region of interest can be referred to as a "sample," a "player image," a "person image," or a "player person image." That is, a player image can include a locally cropped, segmented, or extracted patch of a video frame. In some embodiments, one or more process steps similar, but not necessarily identical to, the process steps shown and described in connection with FIGS. 10 and 11 may be applied to extract player images from a detected game (e.g., basketball) shot attempt. In some respects, a player image can include the whole body or a substantial portion of the body of a single (e.g., main) player. However, one or more video frames may contain one or more players in action. Accordingly, in cases where the video frames include frames with players being occluded and/or players standing closer than a given threshold distance, a player image may contain a significant portion of the main player's body, plus a partial or full portion of another player's body. As will be described further below, both the user and the machine learning techniques can identify players by tagging them with an identifier (e.g., a name or identity) despite such occlusion or partial portions. Over time, with increased training, the disclosed systems can identify players with an accuracy beyond a predetermined (e.g., user configurable) threshold (e.g., 95%, 97%, etc.), in which case, the disclosed systems may not need additional training, at least for a period time. If the accuracy later falls below the threshold (e.g., new players join or a new game is played, or a similar game is played in a new environment, combinations thereof, and/or the like), the disclosed systems can be at least partially retrained by obtaining user identification and selection results for the players.

As previously discussed in reference to FIGS. 21 and 22, player clustering can refer to an image classification process where observed samples (e.g., player image representations as used herein) can be assigned to sample-specific (e.g., player-specific) clusters, such that a given cluster represents an individual sample (e.g., player). For example, if there are N players in a given scene shown in a video frame, a player clustering process can provide a total of N clusters of associated samples, where the N clusters represent the N players spatial locations. Accuracy in determining a total number of players or player clusters can affect the accuracy of classifying, by the disclosed systems, the extracted player images into individual clusters. Accordingly, as described further below, a manual tagging process can be used in connection with the disclosed systems to improve the accuracy of clustering process. In particular, the disclosed systems can use the results of manual tagging the players with an identifier which differentiates the images subset into a plurality of players. That is, by manually tagging the player identities for a small set of images (e.g., a first subset of images in the video frames of the game video), the disclosed systems can use the small set tagging to infer the identities for a larger set of images (e.g., a second subset that includes additional images in the video frames). Accordingly, the disclosed systems do not necessarily have to have the user identify all players in the game in various frames. Rather, the disclosed systems can infer the identities of other game players based on the selection of the user of certain subsets of the game. As explained further herein, the disclosed systems can perform a mathematical technique to determine other clusters from a given identified reference cluster based on the similarity between the clusters. The similarity can be quantified by using any suitable similarity metric (also referred to as affinity herein).

Turning now to figures that describe the image clustering for multiplayer tagging, the illustrative embodiment of FIG. 30 shows that manual multiplayer tagging can be performed by the user in order to initialize and assist a computer-implemented technique in performing player clustering. In some embodiments, the user can manually tag a predetermined number of player images (e.g., two to ten player images), and these tagged player images can be used, by the computer-implemented technique to increase the accuracy of clustering other player images in the same game video.

More specifically, given a set of player images 3010 (e.g., player images as extracted from a video of a player game), at a first "feature extraction" Step 1, the disclosed systems can first convert each player image to a numerical representation of visual features of the player, in the form of a vector, which can be referred to as a "feature vector." In some embodiments, the feature vectors can be determined and/or extracted using any suitable computer-based technique including, but not limited to, a machine learning technique. In another embodiment, the feature vectors can be determined based on a shape associated with a player (e.g., a human shape), a color associated with pixels representing the player (e.g., skin-colored pixels, jersey-colored pixels, etc.), and/or the like. In an embodiment, any suitable image processing technique can be used to generate the feature vectors from the player images, including techniques based on edge detection, corner detection, blob detection, ridge detection, motion detection, and/or the like. In another embodiment, a template-based technique (e.g., template matching) can be used to extract feature vectors corresponding to at least portions of the player's body. In another embodiment, a Hough transformation process can be used to extract the feature vectors from the player images. In particular, imperfect instances of objects within a certain class of shapes (e.g., idealized body images) can be detected by a voting procedure. In some examples, the voting procedure can be carried out in a parameter space, from which object candidates are obtained as local maxima in an accumulator space that is explicitly constructed by the algorithm for computing the Hough transform. It is noted that one of ordinary skill in the art will recognize that a wide variety of techniques can be used to extract features from the images and the disclosure is not limited by the specific technique(s) used for feature extraction.

In some embodiments, the disclosed systems can reduce the dimensionality of the feature vectors, thereby reducing the number of resources required to represent the image data. This can be performed, for example, to reduce the amount of memory and computation power used to analyze the data. Alternatively or additionally, the dimensionality reduction can be performed such that the disclosed systems do not necessarily overfit to training data. Any suitable dimensionality reduction technique can be used including, but not limited to, thresholding, motion-detection-based techniques, area-based techniques, optical-flow based techniques, autocorrelation-based techniques, template matching techniques, combinations thereof, and/or the like. In some embodiments, the disclosed systems may implement pose estimation and image segmentation to extract one or more key colors (e.g., colors associated with the jerseys or skin of the players) from pixels associated with the player in the player image. In some embodiments, the disclosed systems can use a pose estimation technique to find the location of certain body parts of the player, extract several pixels (e.g., red, green, blue (RGB) values) directly from the image based on the body locations, and use the RGB values as feature (e.g., an appearance feature) of the player. One of ordinary skill in the art will recognize that the above represents one possible implementation. In another embodiment, for feature extraction, the disclosed systems can use any suitable technique including, but not limited to, a neural network to extract the visual feature from the person image directly by using a Siamese/triplet loss training associated with the field of face recognition technology. As noted, any suitable feature extraction method can be used, and should not be construed as limiting the scope of applicability of the disclosure.

In some embodiments, the disclosed systems can input the player image may be to an artificial-intelligence (AI) based methodology such as a deep neural network specially trained with a person re-identification process to extract the feature vector. In particular, the person re-identification process can refer to one or more techniques in the field of computer vision. Further, the re-identification process can also be referred to as a metric learning technique which can be used to train a network to learn how to compare two images. Accordingly, such a technique can be used to determine whether two players in two images are of the same player or to quantify the degree to which the two players resemble one another. Thus, by using such a technique, given two images, a neural network may be able to output a distance value between the two images. This can be useful for the disclosed systems in determining the number of players and associated clusters, as discussed variously herein. Further, the disclosed systems can use colors extracted from the image based on the pose estimation detection, to define the distance between two samples. As noted, the disclosed systems can use any person re-identification technique to define the distance. For example, in some example embodiments, a triplet loss or a Siamese loss technique can be used to train a neural network so that the network can compute the feature distance between two face images. Accordingly, in some aspects, the disclosed systems can use a neural network trained based on Siamese loss or triplet loss to define the distance between two images, or to extract visual features from the images. It is notable that triplet loss and/or Siamese loss are not the only ways for person re-identification task, and any suitable technique can be used.

In various embodiments, the disclosed systems can determine a distance or similarity between two or more feature vectors so that a distance between feature vectors for different players exceeds a predetermined threshold, while a distance between feature vectors of the same player does not exceed the predetermined threshold. For example, similarity of two player images may be computed as a normalized distance (e.g., an L2 norm distance) of the two corresponding feature vectors. The similarity metric can be determined using any suitable similarity calculation. In some embodiments, the disclosed systems can perform the calculation of feature vectors and distances by using any suitable computer-based technique including, but not limited to, deep neural networks or other algorithms. Some further examples include, but are not limited to, a Siamese/triplet-loss neural network technique, a direct low-level image feature extraction technique (e.g., a handcrafted technique that uses for example, color, gradients, and/or the like) which can, for example, be used as opposed to high-level image feature extraction techniques using learned features, for example, using machine learning. Further, in some aspects, the low-level image feature extraction may be based on predetermined information such as location information associated with the players. In another embodiment, the disclosed systems can obtain the predetermined information using, for example, a human pose estimation technique, an image segmentation technique, an object detection technique, and/or the like.

In Step 2, a small subset 3030 (e.g., a subset having a number below a given threshold amount) of representative player images or image samples can be selected from the samples. Further, the representative player images or image samples can include corresponding representative feature vectors selected from the feature vectors 3020. In some embodiments, subset 3030 can include at least one image of each player present in the collection of player images 3010. This can, in certain aspects, ensure that subsequent manual tagging of subset 3030 provides at least one tagging result for each player having an accuracy greater than a given threshold. Thus, the disclosed systems can perform a preliminary player clustering process prior to Step 2. The preliminary player clustering process can include any suitable clustering methods. Examples include, but are not limited to, k-means, affinity propagation, a density-based spatial clustering of applications with noise (DBSCAN), combinations thereof, and/or the like. In some embodiments, the clustering method may require a number of player clusters (e.g. k-means); accordingly, an estimate of the number of player clusters may be made by applying a user-based (e.g., human-based) detection on one or more sampled video frames or player images 3010. In some embodiments, the user-based estimation of the number of players can be performed periodically (e.g., after a predetermined duration, number of frames, or based on an accuracy threshold of the clustering technique falling below a given threshold).

In Step 3, manual tagging can be performed by a user to tag representative samples 3030 obtained in Step 2. That is, the user of the disclosed systems may manually tag one or more player images to different player clusters that represent different players. Such player identity tags may be associated with particular player identities (e.g., names or jersey numbers, for instance), or may enumerate individual players without identifying each player with a player identity. In some embodiments, a page-by-page tagging user interface (UI) or a palette-like UI (or any other suitable UI) may be used. An exemplary tagging interface is shown in FIGS. 31A to 31L, discussed further below.

In the last Step 4, the disclosed systems can propagate the user tags and/or player identity tags to one or more of the remaining samples in order to assign the player images 3010 to different clusters 3050. For example, the disclosed systems can assign a manually assigned player identity tag for a first player image to a second player image having a feature vector close in distance to that of the first sample image. The disclosed systems can use any suitable method such as a k-nearest neighbors (kNN) method, an affinity propagation method, a density-based spatial clustering of applications with noise (DBSCAN), and/or the like. In some embodiments, any suitable clustering algorithm can be used, and it is understood that the disclosed systems are not limited by the choice of clustering algorithm, which may vary in computational complexity, accuracy, and other performance factors. For example, different variations on a DBSCAN algorithm may be used including methods for parallelization, parameter estimation, and support for noisy data (e.g., grainy images obtained from lower-quality videos, for example, from certain mobile devices). In some embodiments, propagating the identifier and/or tags, can be based on a distance measure associated with the feature vectors. As noted, the disclosed systems can use a nearest neighbor approach between the feature vectors in the feature space. That is, for each sample in a second subset of images, the disclosed systems can find the sample's nearest neighbor (in the feature space), and assign the identifier of the neighbor to the current sample. This can represent a first methodology of implementing the disclosed technique. However, one of ordinary skill in the art will recognize that there can be other ways for propagating the identity tags (also referred to as identifiers herein) from a smaller set to a larger set. For example, the disclosed systems can determine a predetermined number of nearest neighbors (e.g., ten nearest neighbors) in the first subset, and can select the most likely (e.g., the most popular) identifier among the predetermined number of neighbors.

To illustrate the user tagging process in Step 3, FIGS. 31A to 31M show respective diagrams representing an exemplary NEX application running on a mobile computing device, in which two players are tagged to generate game analytics and statistics, according to some embodiments of the present invention.

While the figures below describe particular representative user-interfacing screens running a mobile device, it is understood that any suitable input method (e.g., voice activated, touch activated, eye-tracking activated, etc.) can be used to allow users to identify the players. Further, the device can include any suitable device including, but not limited to, a tablet, a laptop, a desktop, a smartwatch, etc. Further, the figures below can be used to describe an example UI for users to tag the identifiers associated with layers for a relatively small set of images (e.g., having an image number below a given threshold). While the figures below can be described as have a page-by-page and/or palette-like UI, the disclosure is understood to be limited to these UIs to enable user tagging. In particular, non-limiting examples, of the UIs that can be used to implement user-tagging of players can include in addition to page-by-page tagging and palette-like tagging, UIs that allow for the user to drag and drop the users into groups, UIs that provide a scrollable list of players and allow the users to tag the players one by one, and/or UIs that provide a scrollable list of players and allow the users to select multiple frames/images/and/or samples and tag respective players therein, combinations thereof, and/or the like.

FIGS. 31A and 31B show a first view or interface, herein referred to as a setup view or interface, for identifying one or more players as participating in a game to be recorded, in accordance with example embodiments of the disclosure. In some embodiments, the disclosed systems can receive an implicit user input to indicate a number of players participating in the game to be recorded. In particular, FIG. 31A shows potential players for the user to select. Further, the user can invite additional players, for example, to join the game at a later time. FIG. 31B shows a screen in which the user selects a player that has just made a shot attempt (or in which the user adds another player that is not shown). In some embodiments, the players shown can be determined by the computer-based algorithm as being the most likely candidate, in order to save the user's time in making the selection. As noted, the screen can be shown periodically to train the computer-based methods in improving the accuracy of player determination.

FIGS. 31C and 31D show another example view or interface, herein referred to as a recording view, associated with a game or workout in action, in accordance with example embodiments of the disclosure. In the particular example shown, two players are participating in a shooting workout, with shot attempt results and foot locations displayed and overlapping the game video being recorded. Further shown are player avatars on the bottom left of the screen. When more than one player is added to the workout, avatars may be badged with the total number of players in the setup view shown and described in connection with FIGS. 31A and 31B, and the recording view shown and described in connection with FIGS. 31C and 31D. In some embodiments, the user may tap on a player settings button at any time during setup or recording to make changes. For example, if a user has indicated additional players, but the disclosed systems detect more than that number of players, the disclosed systems can add a "+" sign to the avatar badging.

FIG. 31E shows yet another example interface or view that can be used, by the user to confirm, after the recording of game actions has been paused or completed, the players to be tracked, in accordance with example embodiments of the disclosure. In some embodiments, if the disclosed systems detect more than the selected players in a scene associated with the game, the disclosed systems can trigger a player settings view automatically to open when the user pauses or stops recording. The user can then update the player identities to include the additional players.

FIGS. 31F to 31J illustrate a player tagging UI that may be automatically displayed when the user pauses or stops recording, in accordance with example embodiments of the disclosure. As two players have been confirmed as participating in the game, FIGS. 31F and 31G show how the first player (e.g., Laurel) may be tagged manually, and FIGS. 31H to 31J show how the second player (e.g., Steve) may be tagged manually. In particular, as shown in FIG. 31F, several frames from a video of the game can be shown to the user along with a suggestion of the player's identity in the frames. The user is then able to confirm the identity or select a different identity of a different player. Further, as shown in FIG. 31G, the user can specifically identify frames associated with a given player. In some embodiments, the user may also tap on a "select all" button to select all thumbnails on the screen, even if they are scrolled out of view. Moreover, when tapped, the button may become "deselect all". In some embodiments, tapping on an "Edit" button may open the player settings view so the user may adjust the number of players in the workout.

FIG. 31H illustrates another player tagging view, in accordance with example embodiments of the disclosure. In some embodiments, the user can indicate to the NEX system that only a predetermined number (e.g., two) players are shooting. Accordingly, after the "next" button on a tagging view for a given player (e.g., the first player) is tapped by the user, the disclosed systems can show the remaining thumbnails as all being pre-selected. This pre-selection of the remaining thumbnails may save the user from having to manually select the thumbnails presented. Furthermore, the user may go back to edit a given player's tags (e.g., Player 1's tags), or may tap "X" to close and go to another view such as a workout details view (not shown), in which the user can view and edit given workout drill or metrics associated with a given workout.

Continuing with the example described above, the NEX system can detects a predetermined number of players that exceeds two players. As shown in FIGS. 31J and 31K, in that situation, when the user advances to tag the second player (e.g., Player 2), no default selection may be provided, since the disclosed systems may not be able to determine the number of total players. Nonetheless, once each assigned player is tagged, the disclosed systems can change the status of the primary button to an approval request (e.g., an "OK" button), which can also save the user time in interacting with the UI.

FIGS. 31L and 31M show a game analytics and statistics screen for each of the two selected players in the workout, in accordance with example embodiments of the disclosure. At any point in the flow, the user may tap on a "restart" button to immediately resume or restart recording again, or the user may tap "X" to end recording mode and go to the workout details view. In particular, FIGS. 31L and 31M shows various information associated with the workout or game, including, but not limited to, a number of shot attempts and scores and respective shot locations associated with a given player (e.g., Laurel and Steve) and/or game. The view can further include the location and time in which the workout and/or game occurred.

FIG. 32 shows a diagram representing an exemplary application running on a mobile computing device, in which multiple avatars are shown for a multiplayer workout in a feed card, according to some embodiments of the present disclosure. In the feed, a multiplayer workout is shown with multiple avatars, and only the first two or three names of the players in the workout may be displayed, depending on space constraints. In particular, the feed can be shared on a social media platform in order to display the results of the game to other users and/or social media connections. In some embodiments, the users can determine what portions of the game to share and which details to hide from the feed. For example, the users of the disclosed systems can determine to share the details of the overall game (e.g., winner and total score), while hiding one or more player identities, game location time or location, and/or the like.

FIG. 33 shows a flow for example operations for player clustering by multiplayer tagging, in accordance with example embodiments of the disclosure. At step 3302, the disclosed systems can determine a plurality images from a video of a game, the video captured by a camera on a mobile device, where at least one image of the plurality of images is segmented from a video frame of the video. In particular, the images can represent frames of the video of the game, which can be captured at any suitable rate. In some embodiments, the frame rate can be dependent on the capability of the mobile device's camera and can be adjusted based on any suitable parameter, including, but not limited to, a device memory, a camera resolution, a user setting, an expected length of the game, a type of game, combinations thereof, and/or the like. In some embodiments, the image segmentation can be performed using any suitable image segmentation technique and/or using machine learning, computer vision, and/or related techniques and processes. In some embodiments, the video and/or the resulting images can be sub sampled, cropped, reformatted, transcoded, filtered, or otherwise processed, for example, to facilitate and/or otherwise improve the efficiency of the image segmentation techniques or other related techniques discussed herein. In some embodiments, different videos can be captured by more than one device (e.g., two mobile devices) which can be placed at different locations, and the video of the game can represent a combination of the videos which may be filtered or otherwise processed prior to image segmentation.

At step 3304, the disclosed systems can determine a feature vector from the at least one image. In some examples, the feature vector can include aspects of the image related to curves and/or boundaries associated with different portions of the image. In some embodiments, while a vector can be used to represent the features, other representations including, but not limited to, matrices, tensors, combinations thereof, and/or the like can be used to represent the features. In some embodiments, the accuracy of the representation of the feature vector can determine the resulting accuracy of downstream processes such as player tagging. The representation of the feature vector can be limited based at least in part on the amount of compute or memory available to the disclosed systems (e.g., amount of memory and processing capability associated with the mobile device). In another embodiment, at least a portion of the processing and/or storage associated with feature vector determination (or downstream processing) can be offloaded to a second device (e.g., a server on an edge network). In particular, the disclosed systems can offload computations beyond a certain threshold complexity to the second device, and the second device can return results for use by the disclosed systems (e.g., determined feature vectors).

At step 3306, the disclosed systems can divide the plurality of images into a first subset and a second subset based on the feature vector. In some embodiments, the disclosed systems can divide the images into the subsets in order to distinguish frames of the video having different players. In particular, the disclosed systems can perform the division based on a computationally determined parameter between feature vectors. The divided subsets can be used by the disclosed systems to present before a user and allow the user to select images corresponding to a given player in order to train the disclosed system (e.g., train various machine learning techniques used by the disclosed systems in performing player tagging).

At step 3308, the disclosed systems can tag a first player in a first image of the first subset with an identifier, wherein the identifier differentiates the plurality of images in the first subset to a plurality of players. In some embodiments, the identifier can include a name associated with the first player. That is, the disclosed systems can associate a given tag (e.g., name) with a given player depicted in an image of the subset. In some embodiments, the disclosed systems can perform the tagging in order to aid the user in confirming the tagging of the players in order to train the system. In another embodiment, the disclosed systems can present the identifier to the user in a user interface of an application for selection and/or confirmation of the player.

At step 3310, the disclosed systems can identify a second player in a second image in the second subset by propagating the identifier of the first subset, based on a distance measure associated with the feature vector. In an embodiment, the disclosed systems can use any suitable method to propagate the identifier from one subset to another, including, but not limited to, a k-nearest neighbors (kNN) method, an affinity propagation method, a density-based spatial clustering of applications with noise (DBSCAN), and/or the like. In some embodiments, the distance measure associated with the feature vectors can use a nearest neighbor approach between the feature vectors in the feature space. That is, for each sample in a second subset of images, the disclosed systems can find the sample's nearest neighbor (in the feature space), and assign the identifier of the neighbor to the current sample. In this way, the system can identify additional players beyond the number of users explicitly tagged by the user.

NEX Platform

FIG. 34 is a schematic diagram illustrating functionalities provided by an extended NEX platform 3400, according to one embodiment of the present invention. Discussions within the present application have emphasized on the real-time analytics 3470 of a ball game at play, where live game plays 3420 are processed in real-time by NEX smartphone or NEX mobile device 3450. In some embodiments, NEX platform 3400 may capture basketball games 3430 and provide later replay 3480 with game analytics. Furthermore, NEX platform 3400 may receive on-demand capture and recordings 3410 of past games, such as professional games, for post-processing within NEX computing device 3450, and/or instant or on-demand replay and content sharing 3460.

Although NEX computing device 3450 as shown in FIG. 34 serves as the core for NEX platform 3400, in some embodiments, NEX platform 3400 may be networked among multiple user devices, where a NEX server 3450 may be connected to multiple camera-enabled user computing devices, each used to capture user or play data, and for providing play analytics. Such game video and/or analytics data may be uploaded to the NEX server, which in turn may store and facilitate sharing of such data among individual players/users, or participants of an online game analytics and training community.

FIG. 35 is a schematic diagram 3500 of a computing device, such as a smartphone, tablet, or laptop, in which the variously disclosed embodiments may be implemented, according to some embodiments of the present invention. A computing device, such as a smartphone, comprises a hardware processor 3502 for executing program code, an operating system 3514, an application software 3516, which may implement the various embodiments of the present invention described herein, a physical memory 3504, at least one input device 3506, at least one output device 3508, a mass storage device 3510, and a network 3512. The network 3512 comprises a wired or wireless network to communicate to remote servers and databases via the Internet. The program code utilized by the computing device may be provided on a non-transitory physical storage medium, such as a local hard-disk, a hard-disk in the cloud, or any other physical storage medium (not shown). Input device 3506 may comprise one or more imaging capturing devices, such as front-facing or back-facing optical cameras, thermal imaging cameras, and infrared cameras.

Conclusions

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for image clustering, comprising:
receiving a plurality of images from a video of a game;
determining a first feature vector of a first player from the plurality of images by inputting the plurality of images to an artificial intelligence (AI)-based process;
determining a location information associated with the first player using a pose-estimation technique;
dividing the plurality of images into a first subset of images and a second subset of images based on the first feature vector;
receiving a first identifier tagging the first player in a first image of the first subset; and
identifying a second player in a second image in the second subset by propagating the first identifier of the first subset, based on a distance measure associated with the first feature vector from the AI-based process, wherein the AI-based process is based on the location information.

2. The method of claim 1, wherein the determination of the first feature vector further comprises:
performing pose estimation on the plurality of images in order to determine one or more colors associated with pixels of the first player in the plurality of images.

3. The method of claim 1, wherein the AI-based process comprises a person re-identification technique.

4. The method of claim 1, wherein the AI-based process is selected from the group consisting of a deep neural network, a Siamese/triplet-loss neural network, and a direct low-level image feature extraction technique.

5. The method of claim 1, wherein the location information is further determined using at least one of an image-segmentation technique and an object-detection technique.

6. The method of claim 1, wherein the first identifier tagging the first player in the first image is determined based on a clustering process, the clustering process including at least one of a k-means, an affinity propagation, and a density-based spatial clustering of applications with noise (DBSCAN).

7. The method of claim 1, wherein the propagating the first identifier of the first subset comprises propagating the first identifier of the first subset using a clustering process.

8. The method of claim 1, wherein the dividing the plurality of images into the first subset of images and the second subset of images further comprises:
determining the first subset of images based on a second feature vector determined from a second plurality of images selected from the first plurality of images.

9. A non-transitory computer-readable medium storing computer-executable instructions which, when executed by a processor, cause the processor to perform operations for image clustering, comprising computer-executable instructions to:
receive a plurality of images from a video of a game;
determine a first feature vector of a first player from the plurality of images by inputting the plurality of images to an artificial intelligence (AI)-based process;
determine a location information associated with the first player using a pose-estimation technique;
divide the plurality of images into a first subset of images and a second subset of images based on the first feature vector;
receive a first identifier tagging the first player in a first image of the first subset; and
identify a second player in a second image in the second subset by propagating the first identifier of the first subset, based on a distance measure associated with the first feature vector from the AI-based process, wherein the AI-based process is based on the location information.

10. The non-transitory computer-readable medium of claim 9, wherein the computer-executable instructions to determine the first feature vector further comprise computer-executable instructions to:
perform pose estimation on the plurality of images in order to determine one or more colors associated with pixels of the first player in the plurality of images.

11. The non-transitory computer-readable medium of claim 9, wherein the AI-based process comprises a person re-identification technique.

12. The non-transitory computer-readable medium of claim 9, wherein the AI-based process is selected from the group consisting of a deep neural network, a Siamese/triplet-loss neural network, and a direct low-level image feature extraction technique.

13. The non-transitory computer-readable medium of claim 9, wherein the location information is further determined using at least one of an image-segmentation technique and an object-detection technique.

14. The non-transitory computer-readable medium of claim 9, wherein the computer-executable instructions to receive the first identifier tagging the first player in the first image is determined based on a clustering process, the clustering process including at least one of a k-means, an affinity propagation, or a density-based spatial clustering of applications with noise (DBSCAN).

15. The non-transitory computer-readable medium of claim 9, wherein the propagating the first identifier of the first subset comprises propagating the first identifier of the first subset using a clustering process.

16. The non-transitory computer-readable medium of claim 9, wherein the computer-executable instructions to divide the plurality of images into the first subset of images and the second subset of images further comprises computer-executable instructions to:
determine the first subset of images based on a second feature vector determined from a second plurality of images selected from the first plurality of images.

17. A device for image clustering, comprising:
at least one memory device that stores computer-executable instructions; and
at least one processor configured to access the at least one memory device, wherein the at least one processor is configured to execute the computer-executable instructions to:
receive a plurality of images from a video of a game;
determine a first feature vector of a first player from the plurality of images by inputting the plurality of images to an artificial intelligence (AI)-based process;
determine a location information associated with the first player using a pose-estimation technique;
divide the plurality of images into a first subset of images and a second subset of images based on the first feature vector;
receive a first identifier tagging the first player in a first image of the first subset; and
identify a second player in a second image in the second subset by propagating the first identifier of the first subset, based on a distance measure associated with the first feature vector from the AI-based process, wherein the AI-based process is based on the location information.

18. The device of claim 17, wherein the computer-executable instructions to determine the first feature vector further comprise computer-executable instructions to:
perform pose estimation on the plurality of images in order to determine one or more colors associated with pixels of the first player in the plurality of images.

19. The device of claim 17, wherein the AI-based process comprises a person re-identification technique.

20. The device of claim 17, wherein the AI-based process is selected from the group consisting of a deep neural network, a Siamese/triplet-loss neural network, and a direct low-level image feature extraction technique.

* * * * *